(12) United States Patent
Nogi et al.

(10) Patent No.: US 10,493,429 B2
(45) Date of Patent: Dec. 3, 2019

(54) METHOD FOR PRODUCING POLYACRYLIC ACID (SALT)-BASED WATER ABSORBENT RESIN POWDER

(75) Inventors: Kozo Nogi, Kanagawa (JP); Masatoshi Nakamura, Hyogo (JP); Hirofumi Shibata, Hyogo (JP); Koji Honda, Hyogo (JP); Yusuke Watanabe, Hyogo (JP); Satoshi Matsumoto, Hyogo (JP); Reiko Nakatsuru, Hyogo (JP); Kunihiko Ishizaki, Hyogo (JP)

(73) Assignee: NIPPON SHOKUBAI CO., LTD., Osaka (JP)

( * ) Notice: Subject to any disclaimer, the term of this patent is extended or adjusted under 35 U.S.C. 154(b) by 635 days.

(21) Appl. No.: 13/982,147

(22) PCT Filed: Jan. 30, 2012

(86) PCT No.: PCT/JP2012/052043
§ 371 (c)(1),
(2), (4) Date: Oct. 11, 2013

(87) PCT Pub. No.: WO2012/102406
PCT Pub. Date: Aug. 2, 2012

(65) Prior Publication Data
US 2014/0042364 A1    Feb. 13, 2014

(30) Foreign Application Priority Data

Jan. 28, 2011  (JP) ................................. 2011-017183
Jan. 28, 2011  (JP) ................................. 2011-017184
(Continued)

(51) Int. Cl.
*C08J 3/24*      (2006.01)
*B01J 20/26*     (2006.01)
(Continued)

(52) U.S. Cl.
CPC ......... *B01J 20/3085* (2013.01); *B01J 20/267* (2013.01); *B01J 20/28085* (2013.01);
(Continued)

(58) Field of Classification Search
CPC ........................................................ B01J 20/30
See application file for complete search history.

(56) References Cited

U.S. PATENT DOCUMENTS

| 4,734,478 A | 3/1988 | Tsubakimoto et al. |
| 4,755,562 A | 7/1988 | Alexander et al. |

(Continued)

FOREIGN PATENT DOCUMENTS

| EP | 0940149 | 9/1999 |
| EP | 1824910 | 8/2007 |

(Continued)

OTHER PUBLICATIONS

International Preliminary Report on Patentability for PCT/JP2012/052043, dated Aug. 8, 2013, and English translation thereof.

(Continued)

*Primary Examiner* — Peter F Godenschwager
(74) *Attorney, Agent, or Firm* — Dickinson Wright PLLC

(57) ABSTRACT

From a view pint of decreasing an out of spec product after surface crosslinking, particularly, when an alkylene carbonate compound is used as a surface crosslinking agent, influence due to an air temperature is great, and it is necessary to reduce ethylene glycol which is produced as a byproduct.

There is provided a process for producing a polyacrylic acid (salt)-based water absorbent resin powder, comprising storing a non-polymerized organic compound being a raw material (modified raw material) of a water absorbent resin powder in a heated state, thereafter, mixing the non-polymerized organic compound with other compound at a predetermined ratio and, further, mixing the mixture into a water absorbent resin powder.

22 Claims, 5 Drawing Sheets

Constant temperature tank for elevating temperature of aqueous monomer solutio

(30) Foreign Application Priority Data

Sep. 9, 2011 (JP) ................................ 2011-196699
Sep. 9, 2011 (JP) ................................ 2011-196700

(51) Int. Cl.
  *B01J 20/28* (2006.01)
  *B01J 20/30* (2006.01)

(52) U.S. Cl.
  CPC ............ *C08J 3/245* (2013.01); *B01J 2220/68* (2013.01); *C08J 2333/02* (2013.01)

(56) References Cited

U.S. PATENT DOCUMENTS

| | | | |
|---|---|---|---|
| 4,783,510 A | 11/1988 | Saotome | |
| 4,824,901 A | 4/1989 | Alexander et al. | |
| 4,985,518 A | 1/1991 | Alexander et al. | |
| 5,610,208 A | 3/1997 | Dairoku et al. | |
| 5,672,633 A | 9/1997 | Brehm et al. | |
| 6,164,455 A | 12/2000 | Kakita et al. | |
| 6,239,230 B1 | 5/2001 | Eckert et al. | |
| 6,265,488 B1 | 7/2001 | Fujino et al. | |
| 6,291,635 B1 | 9/2001 | Maeda et al. | |
| 6,297,319 B1 | 10/2001 | Nagasuna et al. | |
| 6,372,852 B2 | 4/2002 | Hitomi et al. | |
| 6,472,478 B1 | 10/2002 | Funk et al. | |
| 6,559,239 B1 | 5/2003 | Riegel et al. | |
| 6,605,673 B1 | 8/2003 | Mertens et al. | |
| 6,620,899 B1 | 9/2003 | Morken et al. | |
| 6,641,064 B1 | 11/2003 | Dentler et al. | |
| 6,657,015 B1 | 12/2003 | Riegel et al. | |
| 6,716,894 B2 | 4/2004 | Kajikawa et al. | |
| 6,727,345 B2 | 4/2004 | Kajikawa et al. | |
| 6,809,158 B2 | 10/2004 | Ikeuchi et al. | |
| 6,817,557 B2 | 11/2004 | Kakita et al. | |
| 7,193,006 B2 | 3/2007 | Ishizaki et al. | |
| 7,357,330 B2 | 4/2008 | Watanabe et al. | |
| 7,638,570 B2 * | 12/2009 | Torii ....................... | A61L 15/60 502/400 |
| 2004/0106745 A1 | 9/2004 | Nakashima et al. | |
| 2005/0048221 A1 | 3/2005 | Irie et al. | |
| 2007/0149760 A1 | 6/2007 | Kadonaga et al. | |
| 2008/0227932 A1 | 9/2008 | Funk et al. | |
| 2008/0287631 A1 | 11/2008 | Nitschke | |
| 2010/0056739 A1 | 3/2010 | Funk et al. | |
| 2011/0003926 A1 | 1/2011 | Nogi et al. | |
| 2011/0021725 A1 | 1/2011 | Takaai et al. | |
| 2011/0042612 A1 | 2/2011 | Riegel et al. | |
| 2013/0101851 A1 * | 4/2013 | Takaai ....................... | C08J 9/20 428/402 |

FOREIGN PATENT DOCUMENTS

| | | | |
|---|---|---|---|
| EP | 1949011 | 2/2010 | |
| JP | 2004-352941 | 12/2004 | |
| JP | 2006-045498 | 2/2006 | |
| JP | 2010-516882 | 5/2010 | |
| JP | 2010-521580 | 6/2010 | |
| JP | WO 2012002455 A1 * | 1/2012 | ................ C08J 9/20 |
| WO | 2006/033477 | 3/2006 | |
| WO | 2007/023097 | 3/2007 | |
| WO | WO 2008092842 A1 * | 8/2008 | .............. C08F 20/06 |
| WO | 2008/123477 | 10/2008 | |
| WO | 2009/001954 | 12/2008 | |
| WO | 2009/113671 | 9/2009 | |
| WO | 2009/113672 | 9/2009 | |
| WO | 2009/113673 | 9/2009 | |
| WO | 2009/113678 | 9/2009 | |
| WO | 2009/113679 | 9/2009 | |
| WO | 2009/119754 | 10/2009 | |
| WO | 2009/123193 | 10/2009 | |
| WO | 2009/123197 | 10/2009 | |

OTHER PUBLICATIONS

Modern Superabsorbent Polymer Technology (1998) pp. 39-44, pp. 197-199.
International Search Report for PCT/JP2012/052043, dated Apr. 17, 2012.
Extended European Search Report dated Oct. 23, 2017 which issued in the corresponding European Patent Application No. 12739428.6.

* cited by examiner

Supply of aqueous monomer solution
Drawing out of aqueous monomer solution
Constant temperature tank for elevating temperature of aqueous monomer solutio Closed-gas bubbles
Open cells 300-500μm          45μm or less

METHOD FOR PRODUCING POLYACRYLIC ACID (SALT)-BASED WATER ABSORBENT RESIN POWDER

TECHNICAL FIELD

The present invention relates to a method for producing a polyacrylic acid (salt)-based water absorbent resin powder. More particularly, the present invention relates to a polyacrylic acid (salt)-based water absorbent resin powder which contains a little residual raw material (particularly, a surface crosslinking agent or a byproduct thereof), and is of high physical properties, and a method for continuously producing the same stably.

BACKGROUND ART

In recent years, in a hygiene material such as a paper diaper, sanitary napkin, an incontinence pad, a water absorbent resin has been widely utilized as a constituent material thereof, from a view point of being excellent in body fluid absorbability. The water absorbent resin is produced via many steps such as polymerization, drying, pulverization, classification, and surface crosslinking (Non-Patent Literature 1). A process for producing a water absorbent resin including such the steps is disclosed in Patent Literatures 1 to 14 etc.

A water absorbent resin is produced by controlling many physical properties (e.g. water absorption capacity, water absorption capacity under load, free swelling rate, liquid permeability, gel stability etc.) as standard, depending on the use purpose thereof (e.g. paper diaper, sanitary napkin etc.). However, in continuous production of a water absorbent resin at a large scale, improvement in productivity, improvement in physical properties and stabilization of physical properties are difficult, even fine variation in physical properties results in deterioration in physical properties of a final product (e.g. paper diaper etc.) and consumer complaint, in some cases. In addition, with increase in a production amount, in a production process including many steps, a small trouble and delay at a part of steps including preparation and carry-in of raw materials cause a great trouble and delay of production, increase in impurities and byproducts, and deterioration in physical properties in a whole production step, in some cases. Then, maintenance of high physical properties and stable continuous operation were a great problem. Further, with increase in a production amount of a water absorbent resin, improvement in productivity thereof was an important problem.

In order to overcome the aforementioned problems, Patent Literature 15 discloses the technique of removing a water absorbent resin having physical properties which is too high or too low, followed by remixing. Patent Literatures 16 and 17 disclose the technique of using a plurality of hoppers at an intermediate step and a polymerization step. And, Patent Literature 17 discloses the technique of performing polymerization in two series and performing a latter half in one series. Further, Patent Literature 19 discloses the technique of adopting at least any one step of a drying step and steps thereafter in two or more series, while a polymerization step is one series, in order to improve or stabilize physical properties. Many techniques of improving or stabilizing physical properties of a water absorbent resin have been proposed by change or impartation of an intermediate step of Patent Literatures 15 to 17 etc., or by use in combination of a plurality of production apparatuses of Patent Literatures 20 to 22 etc., but there was sufficient room for improvement. In addition, in order to improve physical properties, the technique of removing again fine powders, or recycling fine powders after surface crosslinking has been proposed in Patent Literature 23 etc., but removal of fine powders has a problem of reduction in a yield.

And, since as a production amount of a water absorbent resin grows greater, a size of a production apparatus at each step has a limit, this naturally results in that a water absorbent resin is produced in combination in a plurality of production lines. However, in this case, variation in physical properties between respective lines has become a problem. Particularly, in recent years, control of many physical properties, such as not only a water absorption capacity (CRC), but also a water absorption capacity under load (AAP), liquid permeability (SFC, GBP) is required, but in the case of increase in a production amount, or particularly, production in combination of a water absorbent resin with a plurality of production facilities (production lines), control of physical properties is very difficult, many spec out products (off-specification products) are produced, and this is not preferable from a view point of increase in the cost and an environmental burden due to disposal.

And, also in a water absorbent resin including many production steps, a surface crosslinking step is an important step from a view point of improvement and stabilization of physical properties, and reduction in a production trouble, and many improvement techniques have been proposed.

And, various surface crosslinking agents have been proposed, and an oxazoline compound (Patent Literature 24), a vinyl ether compound (Patent Literature 25), an epoxy compound (Patent Literature 26), an oxetane compound (Patent Literature 27), a polyhydric alcohol compound (Patent Literature 28), a polyamidopolyamine-epihalo adduct (Patent Literatures 29 and 30), a hydroxyacrylamide compound (Patent Literature 31), an oxazolidinone compound (Patent Literature 32), a bis or poly-oxazolidinone compound (Patent Literature 33), a 2-oxotetrahydro-1,3-oxazolidine compound (Patent Literature 34), an alkylene carbonate compound (Patent Literature 35), and a polyvalent alkylene carbonate compound (Patent Literature 36) have been proposed. Further, a surface crosslinking method which reduces a volatile alcohol or residual ethylene glycol after surface crosslinking, particularly, after surface crosslinking with an alkylene carbonate compound (Patent Literature 37) has been also proposed.

And, the technique of polymerizing a monomer to crosslink a surface (Patent Literature 38) and the technique of performing radical crosslinking with persulfate (Patent Literatures 39 and 40) have been also known. Further, the technique of using an additive in combination in mixing of a surface crosslinking agent has been also proposed and, as an additive, a water-soluble cation such as an aluminum salt (Patent Literatures 41 and 42), an alkali (Patent Literature 43), an organic acid and an inorganic acid (Patent Literature 44) and the like have been known.

However, although these surface crosslinking methods are a most important production step in a water absorbent resin, in production at continuous operation or a huge scale, there remains room for stabilization and simplification of a production step. Further, in the aforementioned variation in physical properties and generation of spec out, there was a problem of a raw material remaining in a water absorbent resin and a byproduct, for example, a volatile alcohol and residual ethylene glycol described in Patent Literature 37, reduction in them necessitates a complicated step, and the effect thereof was not sufficient.

Main use of a water absorbent resin is a hygiene material such as a paper diaper and a sanitary napkin under the current circumstances, and reduction in a residual raw material (particularly, surface treating agent) and a byproduct is important.

And, particularly when an alkylene carbonate compound is used as a surface crosslinking agent, or a solid non-polymerized organic compound, a representative of which is alkylene carbonate, is used as a surface crosslinking agent, in improvement in productivity of a water absorbent resin, it was necessary to more simplify handleability of a surface crosslinking agent at a production step, and it was necessary to reduce residual ethylene glycol which is generated as a by-product. Particularly, with increase in a production amount of a water absorbent resin, and requirement of higher physical properties, simplification and stabilization of a production step and, further, a problem of a residual byproduct (e.g. volatile alcohol and residual ethylene glycol described in Patent Literature 37) has been viewed as important.

Further, also in a problem of improvement and stabilization of physical properties, a problem of a free swelling rate and liquid permeability is great and, particularly, as a production scale of a water absorbent resin grows greater, maintenance and improvement of a free swelling rate, or realization of both of a free swelling rate and liquid permeability become more difficult, in reality. For maintenance of a free swelling rate and liquid permeability, spec out and reduction in productivity are caused in some cases and, particularly, in the case of improvement in a free swelling rate and liquid permeability, particularly, when an alkylene carbonate compound is used as a surface crosslinking agent, or when a solid non-polymerized organic compound, a representative of which is alkylene carbonate, is used as a surface crosslinking agent, solution thereof was important.

CITATION LIST

Patent Literatures

Patent Literature 1: International Publication No. WO 2009/123193 pamphlet
Patent Literature 2: International Publication No. WO 2009/113679 pamphlet
Patent Literature 3: International Publication No. WO 2009/113678 pamphlet
Patent Literature 4: International Publication No. WO 2009/113671 pamphlet
Patent Literature 5: International Publication No. WO 2009/113672 pamphlet
Patent Literature 6: International Publication No. WO 2009/119754 pamphlet
Patent Literature 7: International Publication No. WO 2009/123197 pamphlet
Patent Literature 8: U.S. Pat. No. 6,716,894
Patent Literature 9: U.S. Pat. No. 6,727,345
Patent Literature 10: U.S. Pat. No. 6,164,455
Patent Literature 11: U.S. Pat. No. 6,817,557
Patent Literature 12: U.S. Pat. No. 6,641,064
Patent Literature 13: U.S. Pat. No. 6,291,635
Patent Literature 14: EP No. 1949011
Patent Literature 15: U.S. Pat. No. 7,193,006
Patent Literature 16: U.S. Pat. No. 6,727,345
Patent Literature 17: U.S. Pat. No. 4,985,518
Patent Literature 18: International Publication No. WO 2007/023097 pamphlet
Patent Literature 19: International Publication No. WO 2009/113673 pamphlet
Patent Literature 20: U.S. Patent Application Publication No. 2007/149760
Patent Literature 21: International Publication No. WO 2009/001954 pamphlet
Patent Literature 22: International Publication No. WO 2008/123477 pamphlet
Patent Literature 23: U.S. Pat. No. 7,357,330
Patent Literature 24: U.S. Pat. No. 6,297,319
Patent Literature 25: U.S. Pat. No. 6,372,852
Patent Literature 26: U.S. Pat. No. 6,265,488
Patent Literature 27: U.S. Pat. No. 6,809,158
Patent Literature 28: U.S. Pat. No. 4,734,478
Patent Literature 29: U.S. Pat. No. 4,755,562
Patent Literature 30: U.S. Pat. No. 4,824,901
Patent Literature 31: U.S. Pat. No. 6,239,230
Patent Literature 32: U.S. Pat. No. 6,559,239
Patent Literature 33: U.S. Pat. No. 6,472,478
Patent Literature 34: U.S. Pat. No. 6,657,015
Patent Literature 35: U.S. Pat. No. 5,672,633
Patent Literature 36: EP No. 0940149 A
Patent Literature 37: International Publication No. WO 2006/033477 pamphlet
Patent Literature 38: U.S. Patent Application Publication No. 2005/48221
Patent Literature 39: U.S. Pat. No. 4,783,510
Patent Literature 40: EP No. 1824910
Patent Literature 41: U.S. Pat. No. 6,605,673
Patent Literature 42: U.S. Pat. No. 6,620,899
Patent Literature 43: U.S. Patent No. 2004/106745
Patent Literature 44: U.S. Pat. No. 5,610,208

Non-Patent Literatures

Non-Patent Literature 1: Modern Superabsorbent Polymer Technology (1998) (particularly, p. 39-44, p. 197-199 etc.)

SUMMARY OF INVENTION

Technical Problem

Productivity, workability and physical properties (particularly, liquid permeability and water absorption capacity under load) of a water absorbent resin are improved, and stabilized. And, a residual raw material (particularly, surface treating agent and sub-raw material thereof) in a water absorbent resin is reduced. The method of the present invention is suitably applied to a non-polymerized organic compound which is a solid at a normal temperature (particularly, surface crosslinking with alkylene carbonate compound and reduction in residual ethylene glycol), in a method for producing a water absorbent resin.

That is, in a process for producing a water absorbent resin including many steps as in Patent Literatures 1 to 13 etc., the technique of improving or stabilizing physical properties of a water absorbent resin is known as in Patent Literatures 14 to 22, but the technique is still not sufficient, and particularly, in continuous production at an industrial scale, it is necessary to reduce variation or spec out of physical properties of a water absorbent resin, or simplify a production step. And, from greatness of influence on physical properties and productivity, in a process for producing a water absorbent resin, influence of a surface crosslinking step is great, many surface crosslinking methods have been proposed as in Patent Literatures 23 to 44 etc., but those methods are still not sufficient, and it is necessary to provide a water absorbent resin which is of high physical properties, and is stable. As a surface crosslinking agent, an alkylene carbonate compound, particularly, ethylene carbonate described in Patent Literatures 36 to 38 is generally used, but there was a problem of production of residual ethylene glycol as a byproduct described in Patent Literature 37.

Further, from a view point of reduction in a spec out product after surface crosslinking, particularly, when a non-polymerized organic compound which is a solid at a normal temperature and, among it, an alkylene carbonate compound is used as a surface crosslinking agent, operation of dissolving it greatly reduces productivity, and influence of flowability thereof due to an air temperature is great, and it is necessary to reduce ethylene glycol which is produced as a byproduct. And, particularly, in stabilization of physical properties, stabilization of a free swelling rate, and realization of both of a free swelling rate and liquid permeability, while maintaining workability, were necessary.

Solution to Problem

In order to solve the aforementioned problems, the present inventors paid attention to handleability of a modifier (non-polymerized organic compound) to be added to a water absorbent resin, and found out that, by heating, particularly, heating to melt a non-polymerized organic compound, particularly, a surface crosslinking agent, further, alkylene carbonate, workability can be considerably improved, there is no influence on flowability due to variation of an air temperature, and a water absorbent resin which shows high physical properties and includes little impurities (particularly, residual ethylene glycol) is stably obtained at high productivity, resulting in completion of the present invention. Further, the present inventors found out that, by such procedure, a water absorbent resin which is high in liquid permeability and a free swelling rate can be stably provided, resulting in completion of the present invention.

That is, it was found out that, when a non-polymerized organic compound which is a solid at a normal temperature is used as a raw material of a water absorbent resin, not only workability is lowered depending on handling of it, but also operation of dissolving it leads to decrease in productivity and variation in physical properties, resulting in completion of the present invention. Many techniques of stabilizing physical properties of a water absorbent resin and improving physical properties in surface crosslinking have been proposed as in Patent Literatures 1 to 44 etc., but no attention is paid to handleability of a solid non-polymerized organic compound.

And, the present inventors found out that one cause of variation and lowering in physical properties of a water absorbent resin is caused by subtle variation in a concentration and a ratio of a modifier mixture to be mixed with a water absorbent resin, particularly, an aqueous surface crosslinking agent solution and, particularly, is caused by subtle variation in a concentration and a ratio of a modifier mixture, particularly, an aqueous surface crosslinking agent solution due to change in an air temperature of every day or every season.

The present inventors paid attention to that a trouble in a production step and lowering in productivity (workability, handleability of a raw material) are caused by change in an air temperature of every day or every season. It was found out that such problem is remarkable in a solid raw material having a relatively low melting point (particularly, a melting point of 15 to 100° C.). And, it was found out that, when alkylene carbonate is used as a surface crosslinking agent, ethylene glycol is produced in a water absorbent resin as a byproduct, and the cause is from degradation in an aqueous alkylene carbonate solution before mixing with a water absorbent resin, and degradation of alkylene carbonate used in such surface crosslinking agent also leads to variation and lowering in physical properties after surface crosslinking, resulting in completion of the present invention.

Further, it was found out that a contributory factor of variation in water absorbent resin physical properties (particularly, physical properties after surface crosslinking) is caused by subtle variation in a mixing ratio when an organic compound used in an additive (modifier, particularly, surface crosslinking agent of water absorbent resin) to a water absorbent resin powder and water are mixed, and such problem was solved by using a particular flowmeter upon mixing at a predetermined ratio.

That is, in order to solve the aforementioned problems, a method for producing a water absorbent resin (first method) provides a method for producing a polyacrylic acid (salt)-based water absorbent resin comprising storing a non-polymerized organic compound (particularly, surface treating agent, among it, alkylene carbonate compound) being a raw material (modifying raw material) of a water absorbent resin in a heated state, thereafter, mixing the non-polymerized organic compound and one or more of other compounds (particular, water, further, water and polyhydric alcohol) at a predetermined ratio, and further mixing this into a water absorbent resin.

And, in order to solve the aforementioned problems, a method for producing a water absorbent resin (second method) provides a method for producing a polyacrylic acid (salt)-based water absorbent resin powder comprising mixing a mixture of a non-polymerized organic compound and one or more of other compounds, the mixture being controlled with amass flowmeter at a predetermined ratio, into a polyacrylic acid (salt)-based water absorbent resin particle. The first method and the second method, and the following third method may be carried out separately, it is more preferable that arbitrary two kinds are carried out by combining them, and it is more preferable that all are carried out by combining them.

Further, in order to solve the aforementioned problems, there is provided a method for producing a polyacrylic acid (salt)-based water absorbent resin powder comprising predetermined amounts of three of ethylene glycol, a polyhydric alcohol other than ethylene glycol, and an ion crosslinking agent.

And, there is provided a method for producing a polyacrylic acid (salt)-based water absorbent resin powder (third method) comprising mixing a non-polymerized organic compound in a heat-melted state, and one or more of other compounds at a predetermined ratio and, further, mixing this into a polyacrylic acid (salt)-based water absorbent resin powder.

And, in the present invention, there is also provided a polyacrylic acid (salt)-based water absorbent resin which has been surface-crosslinked with ethylene carbonate, wherein an internal gas bubble ratio is 0.5% or more, and residual ethylene glycol as defined in the description (measuring method (2) of the following (5-16)) is 1000 ppm or less, a water absorption capacity to a 0.9 weight % of an aqueous sodium chloride solution against pressure of 4.8 kPa (AAP) is 20 [g/g], a water absorption capacity without load (CRC) is 25 [g/g] or more, 0.69 weight % saline flow conductivity (SFC) is 1[×10$^{-7}$·cm$^3$·s·g$^{-1}$] or more.

Advantageous Effects of Invention

According to the process for producing a polyacrylic acid (salt)-based water absorbent resin powder of the present invention, a water absorbent resin powder which is of high productivity, and is of effectively high physical properties (particularly, high liquid permeability and high free swelling rate) can be stably produced. Further, the following (1) to (7) effects are also exerted.

(1) By storing•transporting a non-polymerized organic compound (ethylene carbonate etc.) which is a raw material of a water absorbent resin, in the heated state, the process does not undergo influence of change in an air temperature, and is excellent in workability and stability of a mixing ratio.

(2) By using a polyhydric alcohol and a cyclic compound (preferably, alkylene carbonate, particularly ethylene carbonate) in combination as a surface crosslinking agent, preservation stability of an aqueous surface crosslinking agent solution is improved, and a residual byproduct (ethylene carbonate-derived ethylene glycol) can be also reduced.

(3) By using a polyhydric alcohol (particularly, C3-C6 polyhydric alcohol) and alkylene carbonate (particularly, ethylene carbonate) in combination as a surface crosslinking agent, a reaction time can be shortened or a reaction temperature can be lowered and, further, a residual byproduct (ethylene glycol) can be also reduced. Since a reaction time can be shortened or a reaction temperature can be lowered, degradation of β-hydroxypropionic acid in a water absorbent resin is less frequent and, as a result, a residual monomer can be also reduced.

(4) By using three kinds of a polyhydric alcohol, alkylene carbonate (particularly, ethylene carbonate) and an ionic crosslinking agent in combination as a surface crosslinking agent, physical properties (particularly, liquid permeability) is also improved. Further, conveyability of the resulting water absorbent resin is also excellent.

(5) Since by using a mass flowmeter, influence of change in a specific gravity due to change in an air temperature or a liquid temperature disappears, a mixing ratio of a solution containing a non-polymerized organic compound can be more precisely adjusted and, even when many components (3 or more components) are mixed, since a mixing ratio is stabilized, physical properties of a water absorbent resin is stabilized.

(6) By storing•transporting a non-polymerized organic compound (ethylene carbonate etc.) which is a raw material of a water absorbent resin, since a specific gravity becomes constant, and a mixing ratio is stabilized, physical properties of a water absorbent resin is stabilized.

(7) By using three kinds of a polyhydric alcohol other than ethylene glycol, ethylene carbonate and an ionic crosslinking agent in combination in surface crosslinking, a novel water absorbent resin containing predetermined amounts of an ethylene carbonate-derived ethylene glycol, a polyhydric alcohol other than ethylene glycol, and an ionic crosslinking agent is provided. Conveyability and physical properties (particularly, liquid permeability and water absorption capacity without load) of such the powder are also excellent, and the powder is suitable for a hygiene material.

Figure 5:
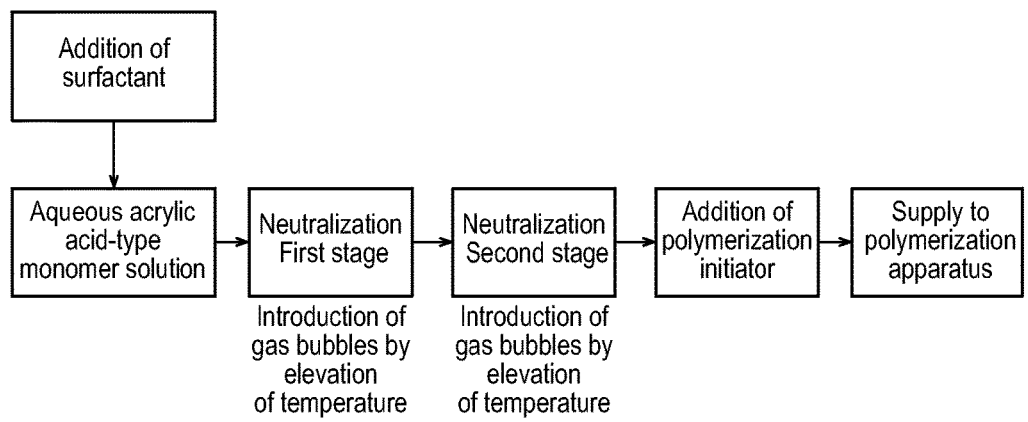
FIG. 5 is a flow diagram showing an outline of a method of elevating a temperature and generating gas bubbles by neutralization of an aqueous acrylic acid-based monomer solution, in the presence of a surfactant.
Figure 7:
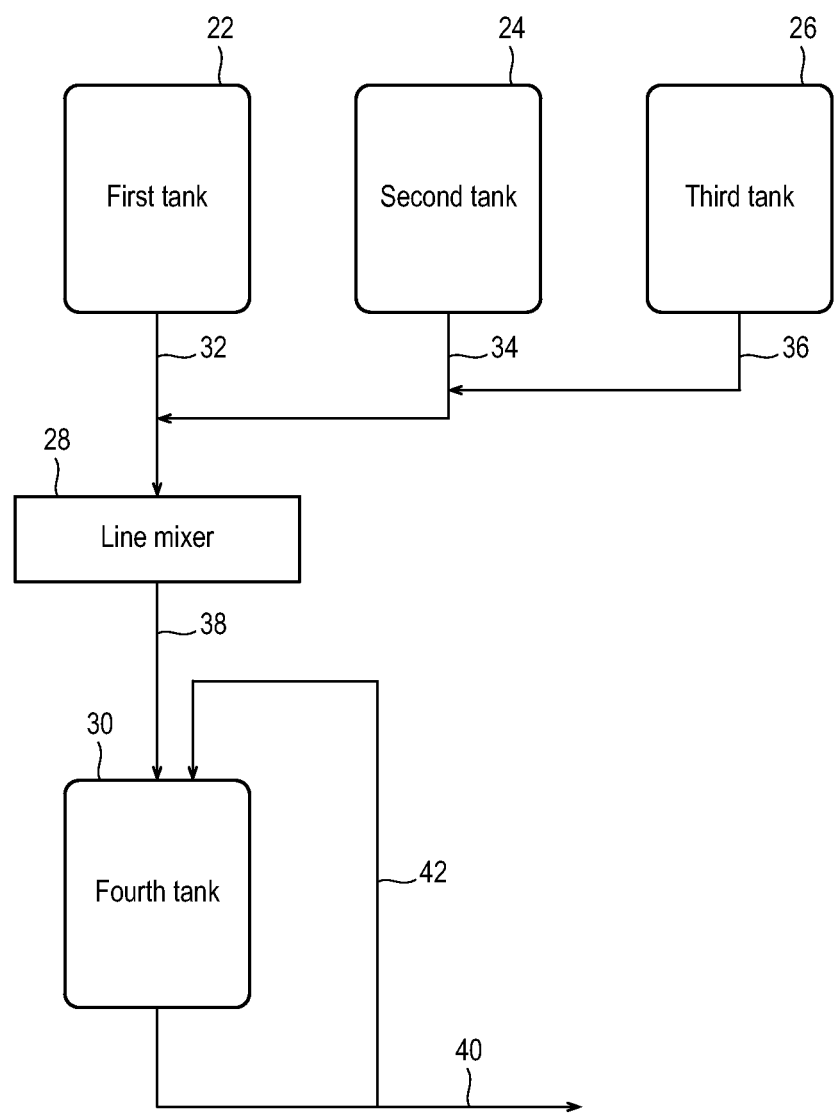
FIG. 7 is a flow diagram of mixing a non-polymerized organic compound and other compound.

In addition, in the production process of the present invention, as other method of making gas bubbles contained, conceptional flow diagrams of [FIG. 5], [FIG. 7] to [FIG. 11] and [FIG. 15] described in International Publication No. WO 2011/078298 can be also applied.

DESCRIPTION OF EMBODIMENTS

A method for producing a polyacrylic acid (salt)-based water absorbent resin powder of the present invention will be explained in detail below, but the scope of the present invention is not constricted by these explanations, and those other than the following exemplification can be carried out by appropriately changing them within such the range that the gist of the present invention is not deteriorated. Specifically, the present invention is not limited to the following each embodiment, but can be variously changed within the scope shown in claims, and an embodiment obtained by appropriately combining technical means which are disclosed in different embodiments, respectively, is included in the technical scope of the present invention.

[1] DEFINITION OF TERMS (1-1) "Water Absorbent Resin"

A water absorbent resin in the present invention means a water-swellable water-insoluble polymer gelling agent. In addition, "water-swellable" refers to that CRC (water absorption capacity without load) defined in ERT441.2-02 is 5 [g/g] or more, and "water-insoluble" refers to that Ext (extractables) defined in ERT470.2-02 is 0 to 50% by weight.

The water absorbent resin is not limited to that an all amount (100% by weight) is a polymer, but it may contain an additive or the like within the aforementioned range that performance is maintained, and a water absorbent resin composition containing a small amount of an additive is also collectively named as a water absorbent resin in the present invention, whether surface crosslinking is present or absent. In addition, as a shape of the water absorbent resin, there are a sheet-like shape, a fibrous shape, a film-like shape, a powder-like shape and the like, a nature thereof may be a dried product or a gel-like product, preferably a powder-like shape and, particularly preferably, a powder-like water absorbent resin having a particle size and a moisture content described later is good, and is referred to as water absorbent resin powder. In addition, herein, a water absorbent resin (hydrogel or dried product thereof) before surface crosslinking is conveniently named as water absorbent resin particle (or base polymer), and a water absorbent resin after surface crosslinking is named as "surface-crosslinked water absorbent resin", in some cases.

(1-2) "Polyacrylic Acid (Salt)"

"Polyacrylic acid (salt)" in the present invention means a polymer which optionally contains a graft component, and contains, as a repetition unit, mainly acrylic acid and/or a salt thereof (hereinafter, referred to as acrylic acid (salt)). Specifically, it refers to a polymer containing 50 to 100 mole % of acrylic acid (salt), among a total monomer (except for a crosslinking agent) used in polymerization, and refers to a water absorbent resin containing preferably 70 to 100 mole %, more preferably 90 to 100 mole %, particularly preferably substantially 100 mole % of acrylic acid (salt).

(1-3) "EDANA" and "ERT"

"EDANA" is abbreviation of European Disposables and Nonwovens Associations, and "ERT" is abbreviation of a method of measuring a water absorbent resin which is European standard (approximately world standard) (EDANA Recommended Test Methods). In addition, in the present invention, unless otherwise is indicated, physical properties of a water absorbent resin is measured in accordance with the ERT original (known reference: revised in 2002).

(a) "CRC" (ERT441. 2-02)

"CRC" is abbreviation of Centrifuge Retention Capacity, and means a water absorption capacity without load (hereinafter, referred to as "water absorption capacity" in some cases). Specifically, it is a water absorption capacity (unit; [g/g]) after 0.200 g of a water absorbent resin in a nonwoven fabric is freely swollen in a largely excessive 0.9 weight % aqueous sodium chloride solution for 30 minutes and, thereafter, water is removed with a centrifuge.

(b) "AAP" (ERT442.2-02)

"AAP" is abbreviation of Absorption Against Pressure, and means a water absorption capacity under load. Specifically, AAP is a water absorption capacity (unit; [g/g]) after 0.900 g of a water absorbent resin is swollen in a 0.9 weight % aqueous sodium chloride solution for 1 hour under a load of 2.06 kPa (0.3 psi). In addition, ERT442.2-02, there is expressed as Absorption Under Pressure, but this is substantially the same content. Alternatively, measurement is performed by changing load condition to 4.83 kPa (0.7 psi) in some cases.

(c) "Ext" (ERT470.2-02)

"Ext" is abbreviation of Extractables, and means extractables (extractable polymer content). Specifically, Ext is a value (unit; % by weight) obtained by measuring an amount of a dissolved polymer by pH titration, after 1.000 g of a water absorbent resin is stirred in 200 g of a 0.9 weight % aqueous sodium chloride solution for 16 hours.

(d) "PSD" (ERT420.2-02)

"PSD" is abbreviation of Particle Size Distribution, and means a particle size distribution measured by sieve classification. In addition, a weight average particle diameter (D50) and a particle diameter distribution width are measured by the similar method to "(1) Average Particle Diameter and Distribution of Particle Diameter" described in U.S. Patent No. 2006-204755.

(1-4) "Liquid Permeability"

Flowability of a liquid which flows between particles of a water absorbent resin swollen under load or without load is referred to as "liquid permeability". As a representative method of measuring this "liquid permeability", there are SFC (Saline Flow Conductivity) and GBP (Gel Bed Permeability).

"SFC (Saline Flow Conductivity)" refers to liquid permeability of a 0.69 weight % aqueous sodium chloride solution relative to 0.9 g of a water absorbent resin under a load of 2.07 kPa. SFC is measured in accordance with the SFC test method described in U.S. Pat. No. 5,669,894. And, "GBP" refers to liquid permeability of a 0.69 weight % aqueous sodium chloride solution relative to a water absorbent resin under a load or under free swelling. GBP is measured in accordance with the GPB test method described in International Publication No. WO 2005/016393.

(1-5) Others

Herein, "X to Y" indicating a range means X or more and Y or less". And, "t (ton)" which is a unit of a weight means "Metric ton" and, further, unless particularly remarked, "ppm" means "weight ppm". And, "weight" and "mass", "% by weight" and "% by mass" or "part by weight" and "part by mass" are handled as synonym. Further, " . . . acid (salt)" means " . . . acid and/or a salt thereof", and "(meth)acryl" means "acryl and/or methacryl". And, regarding measurement of physical properties or the like, unless otherwise is indicated, it is measured at room temperature (20 to 25° C.) and a relative humidity of 40 to 50% RH.

[2] A PROCESS FOR PRODUCING A POLYACRYLIC ACID (SALT)-BASED WATER ABSORBENT RESIN POWDER (GENERAL)

Hereinafter, the process for producing a water absorbent resin powder of the present invention, particularly, a general process thereof will be stated in [2] and, further, particularly, characteristic parts of first, second and third production processes (heating of a non-polymerized organic compound, a mass flowmeter, a non-polymerized organic compound in the heat-melted state) will be stated in [3].

(2-1) A Step of Preparing an Aqueous Acrylic Acid (Salt)-Based Monomer Solution

Herein, an "aqueous acrylic acid (salt)-based monomer solution" refers to an aqueous solution of a monomer containing an acrylic acid (salt)-based monomer as a main component, in which optionally components constituting a water absorbent resin powder such as a crosslinking agent, a graft component and a minor component (chelating agent, surfactant, dispersant etc.) are blended, and refers to one which is subjected to polymerization in the state as it is by adding a polymerization initiator.

Acrylic acid (salt) used in the aqueous acrylic acid (salt)-based monomer solution may be unneutralized, or may be a salt-type (completely neutralized type or partially neutralized type).

The aqueous acrylic acid (salt) monomer solution includes not only an aqueous solution in which whole solute components are completely dissolved, but also a water dispersion in which apart of solute components are dispersed without being dissolved and/or the state of a water dispersion in which a part of solute components are not dissolved. In addition, from a view point of physical properties of the resulting water absorbent resin powder, it is preferable that, at least, a concentration of acrylic acid (salt) is a saturated concentration or lower.

A solvent of the aqueous monomer solution is preferably such that a main component is water. Herein, "a main component of a solvent is water" is not limited to that 100% by weight of a solvent is water, but 0 to 30% by weight, preferably 0 to 5% by weight of a water-soluble organic solvent (e.g. alcohol etc.) may be used in combination, and these are handled as an aqueous solution in the present invention.

(Monomer)

The acrylic acid (salt)-based monomer of the present invention is not particularly limited, as far as it becomes a water absorbent resin by polymerization, and examples include anionic unsaturated monomers (salts) such as (meth)acrylic acid, (anhydrous) maleic acid, itaconic acid, cinnamic acid, vinylsulfonic acid, allyltoluenesulfonic acid, vinyltoluenesulfonic acid, styrenesulfonic acid, 2-(meth)acrylamide-2-methylpropanesulfonic acid, 2-(meth)acryloylethanesulfonic acid, 2-(meth)acryloylpropanesulfonic acid, 2-hydroxyethyl(meth)acryloyl phosphate; mercapto group-containing unsaturated monomer; phenolic hydroxyl group-containing unsaturated monomer; amide group-containing unsaturated monomers such as (meth)acrylamide, N-ethyl (meth)acrylamide, N,N-dimethyl(meth)acrylamide; amino group-containing unsaturated monomers such as N,N-dimethylaminoethyl(meth)acrylate, N,N-dimethylaminopropyl (meth)acrylate, N,N-dimethylaminopropyl(meth)acrylamide; and the like.

A content (use amount) of the acrylic acid (salt)-based monomer is usually 50 mole % or more, preferably 70 mole % or more, more preferably 80 mole % or more, still more preferably 90 mole % or more, particularly preferably 95 mole % or more (upper limit is 100 mole %) relative to a whole monomer (except for an internal crosslinking agent). In addition, in the present invention, polyacrylic acid (salt) is not limited to unneutralized (neutralization rate is 0 mole %), but is a concept including partially neutralized or completely neutralized (neutralization rate 100 mole %).

In the present invention, a neutralization rate of an acrylic acid (salt)-based monomer or a water-containing gel-like crosslinked polymer after polymerization is not particularly limited, but from a view point of physical properties of the resulting water absorbent resin powder and reactivity of a surface crosslinking agent, the neutralization rate is preferably 40 to 90 mole %, more preferably 50 to 80 mole %, still more preferably 60 to 74 mole %.

When the neutralization rate is low, there is a tendency that a water absorbent speed (e.g. FSR) is reduced and, conversely, when the neutralization rate is high, since there is a tendency that reactivity of a polyacrylic acid (salt)-based water absorbent resin powder and a surface crosslinking agent, particularly a dehydration reactive surface crosslinking agent described later, further, alkylene carbonate is reduced, productivity is reduced, and liquid permeability (e.g. SFC) and a water absorption capacity under load (e.g. AAP) are reduced, the neutralization rate within the aforementioned range is preferable. In addition, in use that there is a possibility of contact with a human body, such as a paper diaper, neutralization after polymerization is not required.

And, from a view point of a water absorption capacity without load (CRC) and a free swelling rate (FSR) of a water absorbent resin powder obtained as a final product, a part or all of an acrylic acid (salt)-based monomer or a water-containing gel-like crosslinked polymer after polymerization may be a salt-type, and a monovalent salt such as a sodium salt, a lithium salt, a potassium salt, an ammonium salt and amines is preferable and, among them, an alkali metal salt is more preferable, a sodium salt and/or a potassium salt are further preferable and, from a view point of the cost and physical properties, a sodium salt is particularly preferable.

(Polymerization Inhibitor)

It is preferable that an acrylic acid (salt)-based monomer contains a polymerization inhibitor. The polymerization inhibitor is not particularly limited, but examples include an N-oxyl compound, a manganese compound, a substituted phenol compound and the like disclosed in International Publication No. WO 2008/096713. Among them, substituted phenols are preferable, and methoxyphenols are particularly preferable.

Examples of the methoxyphenols include o, m, p-methoxyphenol, methoxyphenols having one or two or more substituents such as a methyl group, a t-butyl group and a hydroxyl group, and the like, and in the present invention, p-methoxyphenol is particularly preferable.

In addition, a content of methoxyphenols in the acrylic acid (salt)-based monomer is preferably 10 to 200 ppm, hereinafter, 5 to 160 ppm, 10 to 160 ppm, 10 to 100 ppm, and 10 to 80 ppm are preferable in this order, and 10 to 70 ppm is most preferable. When the content exceeds 200 ppm, since there is a possibility that a color tone of the resulting water absorbent resin powder is deteriorated (coloration such as yellowish tint and yellowing), this is not preferable. And, when the content is less than 5 ppm, that is, when p-methoxyphenol is removed by purification such as distillation, since a crisis that polymerization occurs before initiation of intentional polymerization becomes high and, further, weather resistance of the resulting water absorbent resin powder is reduced, this is not preferable. In addition, the "weather resistance" is defined in Example of International Publication No. WO 2011/040530 pamphlet (and (5-14) described later), refers to an absolute amount of increase in extractables due to light, and a smaller value is preferable.

(Minor Component of Monomer)

From a view point of improvement in physical properties and reduction in a residual monomer, an acrylic acid (salt)-based monomer is such that protoanemonin, allyl acrylate, and furfural are preferably 0 to 10 ppm, still more preferably 0 to 5 ppm, particularly preferably ND (detection limit or less), respectively, relative to raw material acrylic acid (salt) and, further, relative to acrylic acid (salt) in a prepared aqueous monomer solution. Similarly, acrylic acid dimer and β-hydroxypropionic acid are preferably 0 to 1000 ppm, 0 to 500 ppm, and 0 to 200 ppm, respectively. Acrylic acid dimer can be removed by crystallization or distillation, and is preferably used in a short time, for example, in 24 hours after purification. β-Hydroxypropionic acid can be controlled low by neutralization at a low temperature (e.g. 70° C. or lower, more preferably 50° C. or lower) or the like.

(Internal Crosslinking Agent)

In the present invention, upon the polymerization, if necessary, an internal crosslinking agent is used. As the internal crosslinking agent, known ones can be used, and examples include N,N'-methylenebis(meth)acrylamide, (poly)ethylene glycol di(meth)acrylate, (poly)propylene glycol di(meth)acrylate, trimethylolpropane tri(meth)acrylate, glycerin tri(meth)acrylate, glycerin acrylate methacrylate, ethylene oxide-modified trimethylolpropane tri(meth)acrylate, pentaerythritol hexa(meth)acrylate, triallyl cyanurate, triallyl isocyanurate, triallyl phosphate, triallylamine, poly(meth)allyloxyalkane, (poly)ethylene glycol diglycidyl ether, glycerol diglycidyl ether, ethylene glycol, polyethylene glycol, propylene glycol, glycerin, 1,4-butanediol, pentaerythritol, ethylenediamine, ethylene carbonate, propylene carbonate, polyethyleneimine, glycidyl(meth)acrylate and the like. Among them, in view of reactivity, one or two or more can be used and, among them, it is preferable to use a compound having two or more polymerizable unsaturated groups.

A use amount of the internal crosslinking agent can be appropriately determined depending on desired physical properties of a water absorbent resin powder, and is preferably 0.001 to 5 mole %, more preferably 0.005 to 2 mole %, still more preferably 0.01 to 1 mole % relative to a whole of the acrylic acid (salt)-based monomer. When the use amount is less than 0.001 mole %, extractables of the resulting water absorbent resin powder are increased, and a water absorption amount under load cannot be sufficiently ensured. On the other hand, when the use amount exceeds 5 mole %, a crosslinking density of the resulting water absorbent resin powder becomes higher, and a water absorption amount becomes insufficient. In addition, the internal crosslinking agent may be added to the acrylic acid (salt)-based monomer at an all amount, or apart may be added to a hydrogel during polymerization or after polymerization and before drying.

(Surfactant•Dispersant)

In the present invention, a surfactant or a dispersant may be optionally added to the aqueous monomer solution and/or the aqueous monomer solution at polymerization and/or after polymerization.

In the present invention, it is preferable that, for the purpose of improving a free swelling rate or the like or controlling an internal gas bubble ratio, a surfactant and/or a dispersant are added to an aqueous acrylic acid (salt)-based monomer solution during preparation or before a polymerization step and after preparation, to stably suspend generated gas bubbles and, further, by appropriately designing a kind, an addition amount or the like of a surfactant and/or a dispersant, a water absorbent resin powder of desired physical properties is obtained. In addition, a surfactant is preferably a non-polymerized compound, and a dispersant is preferably a polymerized compound.

An addition amount of the surfactant and/or the dispersant is appropriately designed depending on a kind thereof, a specific numerical value thereof will be described later, and the surfactant and/or the dispersant are added to an aqueous acrylic acid (salt)-based monomer solution so that, preferably, a surface tension of the resulting water absorbent resin powder becomes 60 [mN/m] or more, more preferably, becomes in a range described in "(4-7) surface tension" described later. When the surface tension is less than 60 [mN/m], since there is a tendency that a rewet is increased at use of a paper diaper, this is not preferable. In addition, in order to prevent reduction in a surface tension, it is preferable to use a surfactant having reactivity or polymerizability with a water absorbent resin powder or an acrylic acid (salt)-based monomer, for example, a surfactant having an unsaturated polymerizable group (particularly, α, β-unsaturated double bond) or a reactive group (hydroxyl group, amino group), and it is also preferable to use a hydrophilic surfactant having high solubility in water (HLB; 1 to 18, particularly 8 to 15).

(Surfactant)

In the present invention, a usable surfactant is not particularly limited, but examples include surfactants, that is, nonionic surfactants, anionic surfactants, cationic surfactants, amphoteric surfactants and the like disclosed in International Publication No. WO 97/017397 and U.S. Pat. No. 6,107,358. These surfactants may have polymerizability or reactivity with an acrylic acid (salt)-based monomer or a water absorbent resin powder.

Examples of the nonionic surfactants include polyoxyalkylene alkyl ethers such as polyoxyethylene lauryl ether, polyoxyethylene cetyl ether, polyoxyethylene stearyl ether and polyoxyethylene oleyl ether; polyoxyalkylene alkyl phenyl ethers such as polyoxyethylene octyl phenyl ether and polyoxyethylene nonyl phenyl ether; polyoxyalkylene alkyl amino ethers such as polyoxyethylene lauryl amino ether and polyoxyethylene stearyl amino ether; sorbitan fatty acid esters such as sorbitan monolaurate, sorbitan monopalmitate, sorbitan monostearate and sorbitan monooleate; polyoxyalkylene sorbitan fatty acid esters such as polyoxyethylene sorbitan monolaurate, polyoxyethylene sorbitan monopalmitate, polyoxyethylene sorbitan monostearate and polyoxyethylene sorbitan monooleate; polyalkylene glycol fatty acid esters such as polyethylene glycol monolaurate, polyethylene glycol monooleate, polyethylene glycol monostearate, polyethylene glycol dilaurate and polyethylene glycol distearate; glycerin fatty acid esters such as lauric acid monoglyceride, stearic acid monoglyceride and oleic acid monoglyceride; and the like.

Examples of the anionic surfactants include sulfuric acid ester salts such as polyoxyethylene lauryl ether sodium sulfate, polyoxyethylene octyl phenyl ether sodium sulfate, polyoxyethylene nonyl phenyl ether sodium sulfate, triethanolamine laurylsulfate, sodium laurylsulfate, potassium laurylsulfate and ammonium laurylsulfate; sulfonic acid salts such as sodium dodecylbenzenesulfate, sodium alkylnaphthalenesulfonate and sodium dialkylsulfosuccinate; phosphoric acid ester salts such as potassium alkylphosphate; and the like.

Examples of the cationic surfactants include quaternary ammonium salts such as lauryltrimethylammonium chloride, stearyltrimethylammonium chloride, cetyltrimethylammonium chloride and stearyltrimethylammonium chloride; and the like.

Further, in addition to the aforementioned surfactants, examples include a silicone-based surfactant. As the silicone-based surfactant, there are a polyoxyalkylene-modified silicone-based surfactant and the like, in addition to anionic, nonionic, and cationic silicone-based surfactants, specifically, examples include polyoxyethylene-modified dimethylpolysiloxane, polyoxyethylene•polyoxypropylene block or random copolymer-modified dimesylpolysiloxane, dimethylpolysiloxane modified with polyoxyethylene having an alkyl group of 1 to 12 carbon atoms on an end, dimethylpolysiloxane modified with a block or random copolymer of polyoxyethylene•polyoxypropylene having an alkyl group of 1 to 12 carbon atoms on an end, the polyoxyalkylene-modified products of a dimethylpolysiloxane derivative having an amino group, an epoxy group or the like on an end and/or in the interior of a molecule of dimethylpolysiloxane, and the like. Among them, polyoxyethylene-modified dimethylpolysiloxane, and polyoxyethylene·polyoxypropylene block or random copolymer-modified dimesylpolysiloxane are preferable, and since polyoxyethylene-modified dimethylpolysiloxane can be obtained industrially at the inexpensive cost, it is more preferable.

Only one kind of these surfactants may be used, two or more kinds may be used in combination, or these surfactants may be used in combination with a dispersant (particularly, polymer dispersant) described later. Among these surfactants, from a view point of the effect, it is preferable to use an anionic surfactant, a nonionic surfactant, or a silicone-based surfactant, and it is further preferable to use a nonionic surfactant or a silicone-based surfactant.

An addition amount of the surfactant to be added at polymerization or after polymerization (particularly, at surface crosslinking) is appropriately determined depending on a kind thereof and objective physical properties (particularly, free swelling rate and surface tension), and the addition amount is preferably more than 0 and 2% by weight or less, more preferably more than 0 and 0.03% by weight or less, still more preferably more than 0 and 0.015% by weight or less, particularly preferably more than 0 and 0.01% by weight or less, most preferably more than 0 and 0.008% by weight or less, relative to an all amount of a monomer used or the resulting water absorbent resin. In addition, the addition amount of the surfactant is similarly applied to a water absorbent resin powder.

Further, the addition amount can be also applied to a water absorbent resin powder as a final product obtained after optional covering with a surfactant described in "(2-9) step of adding additive" described later. In addition, when the addition amount exceeds 2% by weight, since it becomes difficult to control foaming at a polymerization reaction, this is not preferable. And, since a surface tension of a water absorbent resin powder is excessively reduced, a rewet is increased at use in a paper diaper or the like and, therefore, this is not preferable.

Conversely, since an extremely small amount of a surfactant improves conveyability and damage resistance of the resulting water absorbent resin powder and, as a result, improves physical properties of a water absorbent resin powder after surface crosslinking or after powder transport, it is preferable that the amount exceeds 0 ppm, and particularly 0.1 ppm or more, further 1 ppm or more, 5 ppm or more, and 10 ppm or more are preferable in this order.

(Dispersant)

In the present invention, a usable dispersant is not particularly limited, but a hydrophilic polymer dispersant exhibiting water solubility or water absorbability is preferable, and a water-soluble polymer dispersant is more preferable. And, a weight average molecular weight thereof is appropriately determined depending on a kind of a dispersant, and is preferably 500 to 10000000, more preferably 5000 to 5000000, particularly preferably 10000 to 3000000.

A kind of the dispersant is not particularly limited, but examples include a hydrophilic polymer such as starch, starch derivative, cellulose, cellulose derivative, polyvinyl alcohol (PVA), carboxymethylcellulose (sodium), hydroxyethylcellulose, polyacrylic acid (salt) and crosslinked polyacrylic acid (salt). Among them, from a view point of the effect of the present invention, a water-soluble polymer dispersant selected from starch, cellulose and PVA is preferable.

A use amount of these dispersants is preferably more than 0 part by weight and 50 parts by weight or less, and a lower limit is more than 0.001 part by weight, more preferably 0.01 to 20 parts by weight, still more preferably 0.05 to 10 parts by weight, particularly preferably 0.1 to 5 parts by weight, relative to 100 parts by weight of an acrylic acid (salt)-based monomer.

And, the dispersant may be separately added at a polymerization step or thereafter. A content of the aforementioned dispersant relative to a finished water absorbent resin powder is similarly applied in the aforementioned range. When a use amount of the dispersant exceeds 50 parts by weight, since it becomes difficult to control foaming at a polymerization reaction, this is not preferable. In addition, since the water absorbing ability or the like of a water absorbent resin powder is excessively reduced, and a rewet is increased at use in a paper diaper or the like, this is not preferable.

(2-2) Gas Bubbles Generation·Dispersion Step (2-2-1) Control of Ratio of Gas Bubbles In the present invention, preferably, a water absorbent resin powder containing internal gas bubbles is used in surface crosslinking. As a preferable method of controlling gas bubbles, a predetermined amount of gas bubbles are made to be contained at polymerization, thereby, polymerization is performed, and preferably, an internal gas bubbles ratio (defined later) of the resulting water absorbent resin before surface crosslinking is preferably 0.5% or more, 1.0 to 8.0%, 1.3 to 6.7%, 2.8 to 6.6%, preferably 3.0 to 6.5%, still more preferably 3.5 to 6.5%, particularly preferably 3.8 to 6.5%, most preferably 4.0 to 6.5%. Further, a water absorbent resin after surface crosslinking is also in such the range.

When an internal gas bubbles ratio is less than 0.5%, less than 1.0%, further less than 2.8%, the free swelling rate (FSR) improving effect is small and, conversely, when a ratio of internal gas bubbles exceeds 6.6% (particularly, 8.0%), since damage resistance is reduced, and liquid permeability (SFC) is reduced accompanying therewith, this is not preferable. Such the internal content gas bubbles ratio can be appropriately controlled by content of gas bubbles at polymerization, a drying temperature (more swollen at a high temperature) or the like in the production process of the present invention.

Particularly, when a dehydration reactive surface crosslinking agent described later, further, an alkylene carbonate compound (particularly, ethylene carbonate) is used as a surface crosslinking agent, since a surface of a water absorbent resin powder becomes easy to be hydrophobized accompanying with a dehydration reaction, a free swelling rate, particularly, wettability at an initial stage is reduced in some cases and, therefore, control at the aforementioned internal gas bubbles ratio is preferable. Such the hydrophobization is presumed to be due to that a surface is esterified (hydrophilic carboxylic acid is esterified into a hydrophobic carboxylic acid ester) by a dehydration reaction. The ratio of internal gas bubbles is applied to a water absorbent resin powder before surface crosslinking, and is preferably also applied to a water absorbent resin powder after surface crosslinking.

As a method of inclusion of gas bubbles, gas bubbles may be made to be contained in an aqueous monomer solution at polymerization, and examples include introduction of an inert gas, a solid foaming agent such as a carbonate (bicarbonate) salt and a water-soluble azo compound (further, water-soluble azo polymerization initiator), a liquid foaming agent such as a hydrophobic or hydrophilic organic solvent having a boiling point lower than a temperature at polymerization, and a gaseous foaming agent such as various gas bubbles (a compound which is a gas at a normal temperature is dispersed in a monomer).

These foaming agents are appropriately used in a range of 0.001 to 100 mole or the like relative to 100 mole of a monomer at polymerization, preferably, when a ratio of internal gas bubbles is made to be 2.8 to 6.6%, further 3.0 to 6.5%, a gas is dispersed in a monomer, and still more preferably, the process for producing a polyacrylic acid-based water absorbent resin powder of International Publication No. WO 2011/078298 is applied.

When the ratio of internal gas bubbles is controlled in the present invention, as one example of the control method, the method of International Publication No. WO 2011/078298 will be described below. A disclosure content thereof forms a part of a disclosure content of the present application. The description of International Publication No. WO 2011/078298 can be all used as the description and a procedure of the present invention, but control of the ratio of internal gas bubbles is persistently arbitrary, and is not limited to the procedure.

In the production process of the present invention, preferably, gas bubbles may be dispersed by reducing solubility of a dissolved gas in an aqueous acrylic acid-based monomer solution, and as other procedure, a gas is introduced from the outside by mixing a monomer and a gas, thereby, gas bubbles may be dispersed.

Examples of a gas constituting gas bubbles to be dispersed in an aqueous acrylic acid-based monomer solution include oxygen, air, nitrogen, carbonic acid gas, ozone, a mixture thereof and the like, and preferably, an inert gas such as nitrogen and carbonic acid gas is used. Still more preferably, from a view point of polymerizability and the cost, air and nitrogen are particularly preferable. A pressure upon introduction of a gas or after introduction is appropriately determined from a normal pressure, an increased pressure and a reduced pressure. And, a preferable introduction method when a gas is introduced from the outside is the method described in Japanese Patent Application No. 2009-292318 (filing date; Dec. 24, 2009) and an application claiming the priority right of that application, PCT/JP2010/001004, and is described in "(2-1-4) Method of introducing gas" of the PCT application.

(2-2-2) Preferable Surface Crosslinking Agent

When aiming at a free swelling rate or liquid permeability, there is also provided a method for producing a water absorbent resin powder comprising heat-reacting a polyacrylic acid-based water absorbent resin powder having the internal gas bubbles ratio described in (2-2-1) of 0.5% or more, 1.0 to 8.0%, 1.3 to 6.7%, 2.8 to 6.6%, preferably 3.0 to 6.5%, still more preferably 3.5 to 6.5%, particularly preferably 3.8 to 6.5%, most preferably 4.0 to 6.5% with an alkylene carbonate compound, further ethylene carbonate as surface crosslinking. Preferable surface crosslinking is as described later, a covalently binding surface crosslinking agent, among it, an alkylene carbonate compound and a polyhydric alcohol compound are mixed and, thereafter, heat-reacted. Still more preferably, an ion binding surface crosslinking agent is mixed simultaneously or separately. More preferably, control of such the mixing is performed with a mass flowmeter, particularly, a Coriolis-type mass flowmeter. In addition, as the mass flowmeter, those described in a column of the following (3-6) can be used. More still more preferably, before prepared into a surface crosslinking agent at a predetermined ratio, an alkylene carbonate compound (single compound itself) which is a raw material is heated, further heat-melted as in [3] described later.

Surface crosslinking with a suitable alkylene carbonate compound will be explained in (2-8) to (2-10) and [3], particularly (2-8) and [3], and a suitable method of controlling an internal gas bubbles ratio will be described below.

(2-2-3) Foaming by International Publication No. WO 2011/078298

(A Preferable Method of Controlling an Internal Gas Bubbles Ratio)

In the present invention, in order to improve a free swelling rate and liquid permeability, preferably, an internal gas bubbles ratio of a water absorbent resin powder is controlled, various foaming polymerizations and the like can be applied, and as a suitable procedure, for example, the method described in International Publication No. WO 2011/078298 is used.

Specifically, after solubility of a dissolved gas in the aqueous acrylic acid-based monomer solution is reduced to generate gas bubbles which are made to be contained, the monomer is polymerized, in the presence of a surfactant and/or a dispersant.

As one example for controlling the internal gas bubbles ratio in a predetermined range (0.5% or more, particularly 4.0 to 6.5%) in the present invention, as a method of dispersing gas bubbles in an aqueous acrylic acid-based monomer solution, specifically, at least one method of the following method (a) or (b) is used.

Method (a) A Method by Elevating a Temperature of an Aqueous Acrylic Acid-Based Monomer Solution Examples of a method of dispersing gas bubbles in an aqueous acrylic acid-based monomer solution include a method of elevating a temperature of an aqueous acrylic acid-based monomer solution prepared by mixing a monomer and/or a salt thereof and, optionally, an internal crosslinking agent and water, or a method of elevating a temperature at a stage of preparation of an aqueous acrylic acid-based monomer solution to decrease solubility of a gas in an aqueous solution.

When elevation of a temperature of an aqueous acrylic acid-based monomer solution after preparation is performed, examples include a method of passing the aqueous solution through a heat exchanger consisting of piping or a container, a method of irradiating an electron and the like. A temperature of an aqueous monomer solution having an elevated temperature is preferably such a high temperature that solubility of a gas is lowered and, specifically, 40° C. to a boiling point of the aqueous solution is preferable, 50 to 100° C. is more preferable, 60 to 98° C. is further preferable, and 70 to 95° C. is most preferable. And, a time necessary for elevation of a temperature is preferably 60 seconds or shorter, more preferably 30 seconds or shorter, still more preferably 10 seconds or shorter, and it is preferable to rapidly warm an aqueous monomer solution in order to generate as many gas bubbles as possible.

A temperature elevation width is preferably +5° C. or more, more preferably +10 to +100° C., still more preferably +20 to +90° C., particularly preferably +30 to +80° C. from a view point of an amount of generation of gas bubbles.

Since when the temperature elevation width is too great, stability of gas bubbles before polymerization is inferior and, when the temperature elevation width is too small, an amount of generation of gas bubbles before polymerization is small, the effect of improving a free swelling rate is small, sometimes in both cases. Also from a view point of a free swelling rate and other physical properties, a temperature of an aqueous monomer solution before temperature elevation is preferably 0 to 60° C., still more preferably 20 to 50° C.

When temperature elevation is performed at a stage of preparation of an aqueous acrylic acid-based monomer solution, examples include a method of utilizing neutralization heat (13.9 [kcal/mole] (25° C.)) at neutralization of a monomer and/or increase in a neutralization degree (neutralization step) or the like. In addition, neutralization may be performed continuously, or may be performed in a batch manner. And, neutralization may be performed at one stage until a predetermined neutralization rate, or may be performed at a multistage (e.g. two-stage neutralization). Two-stage neutralization is performed by placing a base over two stages, and is shown in FIG. 5, Examples and the like. In addition, in order to further increase an amount of a gas generated at temperature elevation, a gas may be dissolved or dispersed in an aqueous monomer solution before temperature elevation in advance.

Figure 4:
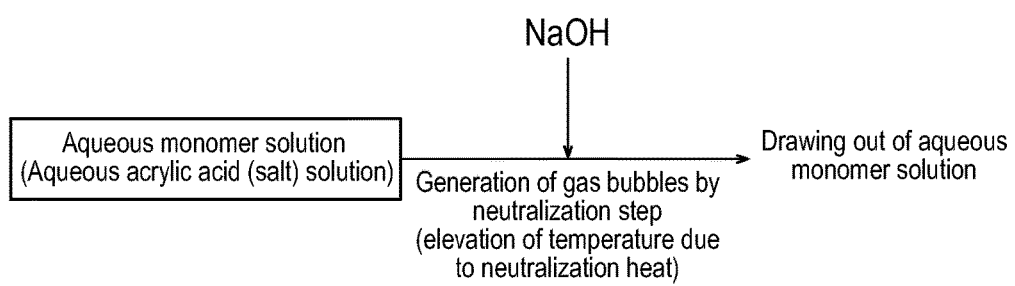
FIG. 4 is a flow diagram showing an outline of a method of elevating a temperature and generating gas bubbles by neutralization of an aqueous acrylic acid-based monomer solution, to which the process of the present invention is applied.

From a view point of simplicity of a step and the effect, it is preferable that temperature elevation is performed utilizing neutralization heat of acrylic acid or an aqueous solution thereof containing a surfactant. FIG. 4 and FIG. 5 show outline flow diagrams showing representative temperature elevation and gas bubble generation with neutralization heat.

And, when a temperature is elevated with neutralization heat of 13.9 [kcal/mole] (25° C.) of acrylic acid, in order to control a width of temperature elevation, heating or cooling may be appropriately performed at a neutralization reaction, or a reaction system may be thermally insulated at a neutralization reaction. Neutralization heat of acrylic acid is 13.9 [kcal/mole] (25° C.), specific heat of water is 1 [cal/° C./g] (25° C.), and specific heat of acrylic acid is 0.66 [cal/° C./g] (25° C.) and, preferably, a temperature of an aqueous acrylic acid solution is elevated by such the neutralization heat of acrylic acid. A temperature elevation width can be also predicted from neutralization heat and specific heat.

And, examples of a temperature elevation method other than a method of elevating a temperature utilizing neutralization heat include a method of performing temperature elevation by heating an aqueous acrylic acid-based monomer solution, and heating may be performed by heating an aqueous acrylic acid-based monomer solution through a jacket or the like.

Figure 1:
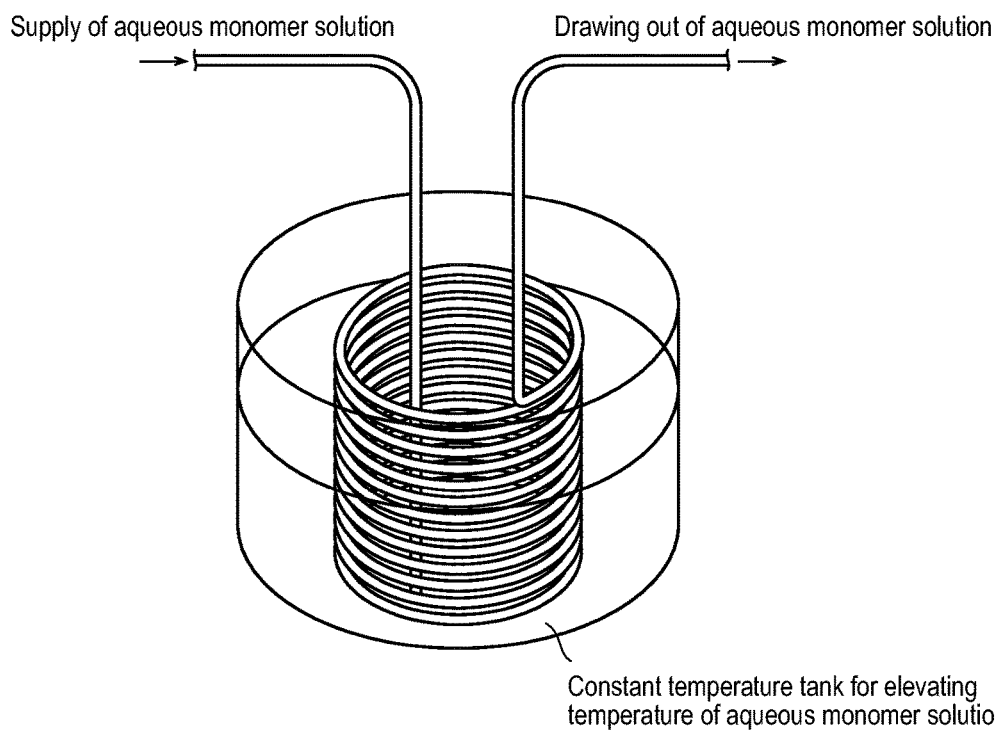
FIG. 1 is a perspective view showing one example of an apparatus used in a continuous temperature elevation method by heating an aqueous acrylic acid-based monomer solution, to which the process of the present invention is applied.

FIG. 1 shows a view of an apparatus for a continuous temperature elevation method (schematic view) by heating an aqueous acrylic acid-based monomer solution, to which the process of the present invention can be applied. The apparatus shown in FIG. 1 is an apparatus which can be used in one procedure of a gas bubble generation method by elevating a temperature of an aqueous acrylic acid-based monomer solution.

Figure 6:
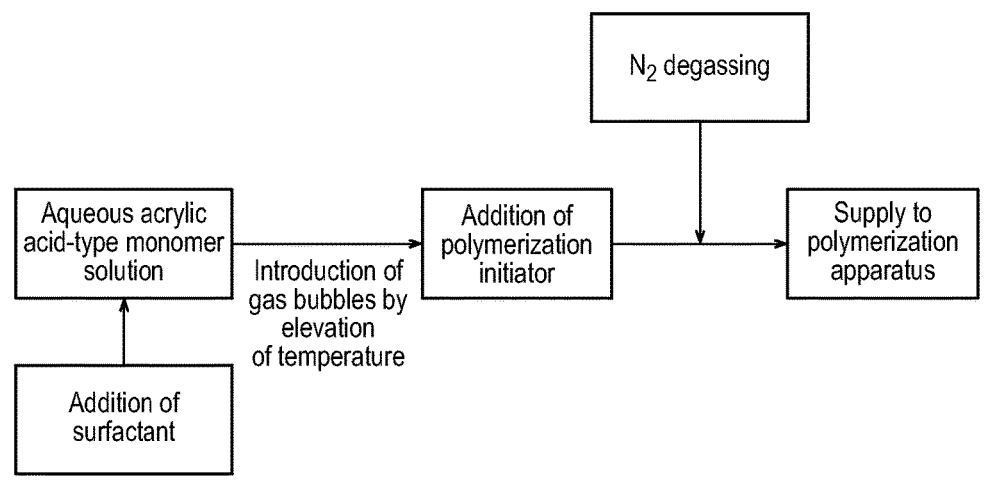
FIG. 6 is a flow diagram showing an outline of an embodiment of further performing deoxygenation before polymerization of an aqueous monomer solution with an inert gas (e.g. nitrogen), in a method of generating gas bubbles by elevating a temperature of an aqueous acrylic acid-based monomer solution, as a preferable embodiment of the present invention which can be applied to the process of the present invention.

And, FIG. 6 is a flow diagram showing an outline of an embodiment of lowering in solubility of a gas and gas bubble generation by temperature elevation included in an embodiment of the present invention. These temperature elevation methods may be used in combination, or may be other methods.

Method (b) a Method of Mixing a Water-Soluble Organic Substance into an Aqueous Monomer Solution, in Preparation of an Aqueous Acrylic Acid (Salt)-Based Monomer Solution Examples of a method of dispersing gas bubbles in an aqueous acrylic acid (salt)-based monomer solution include a method of mixing a water-soluble organic substance in which a gas is not dissolved, or a little gas is dissolved, or a water-soluble organic substance in which a gas is dissolved at a smaller amount as compared with an aqueous acrylic acid-based monomer solution to be mixed or water, when preparation is performed by mixing a monomer and/or a salt thereof and, optionally, an internal crosslinking agent and water, thereby, reducing solubility of a gas. As the water-soluble organic substance, an organic compound having solubility of oxygen of preferably 0.02 [ml/ml] or less, more preferably 0.01 [ml/ml] or less, particularly preferably 0.005 [ml/ml] or less is used. For example, by mixing a monomer (e.g. acrylic acid) containing no gas into an aqueous acrylic acid-based monomer solution containing a gas (in which a gas is dissolved), a gas which cannot be dissolved in an aqueous solution after mixing is generated, and the gas can be made to be dispersed in an aqueous solution as fine gas bubbles.

(Dissolved Gas)

A number average diameter (volume average particle diameter) of gas bubbles to be introduced into an aqueous acrylic acid-based monomer solution by the method (a) or (b) is preferably 50 µm or less, more preferably 50 nm (more preferably 10 µm) to 500 µm, still more preferably 100 nm (more preferably 10 µm) to 100 µm.

When an average diameter of gas bubbles is less than 50 nm, since a surface area of gas bubbles does not grow greater, there is a possibility that a free swelling rate is inferior. And, when an average diameter exceeds 500 µm, there is a possibility that the strength of the resulting water absorbent resin powder becomes fragile.

Solubility of a gas in water is determined by a kind and a temperature of a gas, for example, the solubility is carbonic acid gas (1.05 [ml/ml]), oxygen (0.0285 [ml/ml]), or nitrogen (0.0147 [ml/ml]) in water at 25° C., solubility of these gases is lowered by temperature elevation or mixing of a water-soluble organic substance (preferably, acrylic acid), and gas bubbles generated by lowering of solubility may be dispersed in an aqueous acrylic acid solution with a surfactant or a dispersant. An amount of gas bubbles is appropriately determined by a kind of a gas and a method of lowering solubility (a temperature elevation width and a mixing ratio of a water-soluble organic substance), and it is preferable to disperse gas bubbles in an aqueous acrylic acid-based monomer solution so that a volume of an aqueous monomer solution becomes preferably 1.01 to 1.1-fold, more preferably 1.02 to 1.08-fold, with generated gas bubbles.

(2-3) Polymerization Step (Polymerization Method)

Examples of a polymerization method for obtaining the water absorbent resin powder of the present invention include spraying polymerization, liquid droplet polymerization, bulk polymerization, precipitation polymerization, aqueous solution polymerization, reverse phase suspension polymerization or the like and in order to solve the problems of the present invention, aqueous solution polymerization in which a monomer is formulated into an aqueous solution, reverse phase suspension polymerization, or spraying polymerization•liquid droplet polymerization, particularly, aqueous solution polymerization is preferable. In these polymerizations, if necessary, foaming polymerization described in (2-2), particularly polymerization in which gas bubbles are dispersed is performed, and an internal gas bubbles ratio is further controlled.

In addition, the aqueous solution polymerization is a method of polymerizing an aqueous monomer solution without using a dispersion solvent, and is disclosed, for example, in U.S. Pat. Nos. 4,625,001, 4,873,299, 4,286,082, 4,973,632, 4,985,518, 5,124,416, 5,250,640, 5,264,495, 5,145,906, and 5,380,808, EP Nos. 0811636, 0955086, 0922717 and the like.

And, the reverse phase suspension polymerization is a method of polymerizing an aqueous monomer solution by suspending it in a hydrophobic organic solvent, and is disclosed, for example, in U.S. Pat. Nos. 4,093,776, 4,367, 323, 4,446,261, 4,683,274, 5,244,735 and the like. Monomer, polymerization initiators and the like disclosed in these patent Literatures can be also applied to the present invention.

A polymerization step in the present invention can be performed under any of a normal pressure, a reduced pressure and an increased pressure, and is preferably performed under a normal pressure (or in vicinity thereof, usually ±10 mmHg). And, in order to promote polymerization to improve physical properties, a step of deoxidizing dissolved oxygen in an aqueous monomer solution (e.g. a step of replacement of oxygen by inert gas introduction) may be provided, if necessary, at polymerization, and foaming polymerization may be performed by introducing an inert gas to disperse gas bubbles.

A polymerization step in the present invention can be performed under any of a normal pressure, a reduced pressure and an increased pressure, and is preferably performed under a normal pressure (or in vicinity thereof, usually ±10 mmHg). And, in order to promote polymerization to improve physical properties, a step of deoxidizing dissolved oxygen in an aqueous monomer solution (e.g. a step of replacement of oxygen by inert gas introduction) may be provided, if necessary, at polymerization, and foaming polymerization may be performed by introducing an inert gas to disperse cells.

And, a temperature of an aqueous acrylic acid (salt)-based monomer solution at polymerization initiation depends on a kind of a polymerization initiator used, and is preferably 15 to 130° C., more preferably 20 to 120° C.

(Polymerization Initiator)

A polymerization initiator used in the present invention is appropriately determined by a polymerization form, and is not particularly limited, and examples include a photodegradation-type polymerization initiator, a thermodegradation-type polymerization initiator, a redox-type polymerization initiator and the like. By these polymerization initiators, polymerization in the present invention is started.

Examples of the photodegradation-type polymerization initiator include a benzoin derivative, a benzil derivative, an acetophenone derivative, a benzophenone derivative, an azo compound and the like. And, examples of the thermodegradation-type polymerization initiator include persulfate salts such as sodium persulfate, potassium persulfate and ammonium persulfate; peroxides such as hydrogen peroxide, t-butyl peroxide and methyl ethyl ketone peroxide; azo compounds such as 2,2'-azobis(2-amidinopropane)dihydrochloride and 2,2'-azobis[2-(2-imidazolin-2-yl)propane]dihydrochloride; and the like. Further, examples of the redox-type polymerization initiator include a system in which the aforementioned persulfate salts or peroxides are used in combination with a reducing compound such as L-ascorbic acid and sodium hydrogen sulfite. And, it is also a preferable aspect that the photodegradation-type polymerization initiator and the thermodegradation-type polymerization initiator are used in combination. Among these polymerization initiators, an azo-type polymerization initiator which generates nitrogen by thermodegradation may be used to promote foaming. Further, an active energy ray such as an ultraviolet ray, an electron beam and a γ-ray may be used alone, or may be used in combination with the aforementioned polymerization initiators.

A use amount of the polymerization initiator is preferably 0.0001 to 1 mole %, more preferably 0.0005 to 0.5 mole % relative to the monomer. When the use amount exceeds 1 mole %, since deterioration in a color tone of a water absorbent resin powder is generated, this is not preferable. And, when the use amount is less than 0.0001 mole %, since a residual monomer is increased, this is not preferable.

(Further Suitable Polymerization Method)

In the present invention, as a method of polymerizing an aqueous acrylic acid (salt)-based monomer solution, from view point of physical properties (e.g. free swelling rate and liquid permeability) of a water absorbent resin powder, easiness of polymerization control and the like, aqueous solution polymerization is adopted. Among it, continuous aqueous solution polymerization is more preferable, high concentration continuous aqueous solution polymerization and/or high temperature initiation continuous aqueous solution polymerization are further preferable, and high concentration•high temperature initiation continuous aqueous solution polymerization is particularly preferably adopted.

Examples of a preferable form of the aqueous solution polymerization include kneader polymerization or belt polymerization and, specifically, examples include continuous belt polymerization (disclosed in U.S. Pat. Nos. 4,893,999 and 6,241,928, U.S. Patent Application Publication No. 2005/215734 etc.), continuous kneader polymerization, batch kneader polymerization (disclosed in U.S. Pat. Nos. 6,987,151, 6,710,141 etc.) and the like. When these forms of aqueous solution polymerizations are used, a water absorbent resin powder can be produced at high productivity. In addition, the aforementioned polymerization method is preferably adopted in a production apparatus at a huge scale, in which a production amount per 1 line is large, and the production amount is preferably 0.5 [t/hr], more preferable 1 [t/hr], still more preferably 5 [t/hr], particularly preferably 10 [t/hr].

The high temperature initiation continuous aqueous solution polymerization is high temperature initiation continuous aqueous solution polymerization in which a polymerization initiation temperature is preferably 40° C. or higher, more preferably 50° C. or higher, still more preferably 60° C. or higher, particularly preferably 70° C. or higher, most preferably 80° C. or higher (an upper limit is a boiling point of a monomer which is contained in the aqueous solution at a largest amount, preferably acrylic acid), the high concentration continuous aqueous solution polymerization is high concentration aqueous solution polymerization in which a monomer concentration is preferably 40% by weight or more, more preferably 45% by weight or more, still more preferably 50% by weight or more (un upper limit is 90% by weight or less, preferably 80% by weight or less, still more preferably 70% by weight or less) and the high concentration•high temperature initiation continuous aqueous solution polymerization is continuous aqueous solution polymerization in which both are combined. By using these polymerization methods, foaming is more promoted. Further, in order to promote foaming, a maximum reaching temperature at polymerization is preferably high, specifically, 100° C. or higher is preferable, 100 to 130° C. is more preferable, and 105 to 120° C. is further preferable. In addition, the monomer concentration may be such that a solid content concentration of a water-containing gel-like crosslinked polymer after polymerization is within the aforementioned range. By rendering the monomer concentration within the aforementioned range, stability of fine gas bubbles is enhanced and, particularly, there is predominance of the present invention.

And, upon the polymerization, from a view point of suppression of decrease in gas bubbles in an aqueous monomer solution, a polymerization initiation time (a time from the time of addition of a polymerization initiator to initiation of polymerization) is preferably longer than 0 and within 300 seconds, more preferably 1 to 240 seconds. When the polymerization initiation time exceeds 300 seconds, since a ratio of internal gas bubbles of a water absorbent resin powder is reduced in some cases, this is not preferable.

(2-4) Gel-Crush Step

The present step is a step of gel-crush a water-containing gel-like crosslinked polymer (hereinafter referred to as "hydrogel") in which, preferably, a ratio of internal gas bubbles is suppressed, and which is obtained via the polymerization step and the like, to obtain a particle-like hydrogel (hereinafter referred to as "particulate hydrogel").

By micronization by gel-crush of the hydrogel, particularly, gel-crush with an apparatus having the kneading function, both of a free swelling rate and liquid permeability are realized and, further, impact resistance is also improved. Therefore, it is preferable to adopt aqueous solution polymerization rather than adopt reverse phase suspension polymerization not requiring gel-crush and, particularly, it is preferable to adopt aqueous solution polymerization in which gel-crush is performed during polymerization (e.g. during kneader polymerization) or after polymerization (e.g. after belt polymerization, after kneader polymerization).

A gel-crush machine usable in the present invention is not particularly limited, but examples include a batch system or continuous system double arm-type kneader and the like, a gel-crush machine equipped with a plurality of rotating stirring wings, a monoaxial or biaxial extruder, a meat chopper and the like. Among them, a screw-type extruder having a porous plate at a tip is preferable, and examples include a screw-type extruder disclosed in JP-A No. 2000-063527.

In the gel-crush step of the present invention, a temperature of a hydrogel before gel-crush (gel temperature), from a viewpoint of particle size control and physical properties, is preferably 60 to 120° C., more preferably 65 to 110° C. When the gel temperature is lower than 60° C., from a view point of physical properties of the hydrogel, a hardness is too high, and it becomes difficult to control a particle shape and a particle size distribution at gel-crush. And, when the gel temperature exceeds 120° C., a hardness of the hydrogel is too low, and it becomes difficult to control a particle shape and a particle size distribution. In addition, a gel temperature can be controlled by a temperature at polymerization, heating or cooling of a gel after polymerization, or the like.

And, a weight average particle diameter (D50) (defined by sieve classification) of a particulate hydrogel after gel-crush is preferably 0.5 to 3 mm, more preferably 0.6 to 2 mm, still more preferably 0.8 to 1.5 mm. And, a ratio of a coarse particulate hydrogel having a particle diameter of 5 mm or more is preferably 10% by weight or less, more preferably 5% by weight or less, still more preferably 1% by weight or less of a whole particulate hydrogel.

The present invention is performed by continuous kneader polymerization in which a water-containing gel-like crosslinked polymer produced at polymerization is gel-crushed, or is such that a polymerization step is performed by continuous belt polymerization, and a production method of subjecting the resulting water-containing gel-like crosslinked polymer to a gel-crush step is preferable.

(Further Preferable Gel-Crush Method)

In gel-crush in the present invention, gel-crush described in Japanese Patent Application No. 2010-088993 (filing date; Apr. 7, 2010) and its International Application No. PCT/JP2011/058829, particularly gel-crush in which a "gel-crush energy (GGE)" is 18 to 60 [J/g] and/or gel-crush in which a "weight average molecular weight of extractables of a hydrogel" is increased by 10,000 to 500,000 [Da] are still more preferably applied. And, when gas bubbles of (2-2) are contained at polymerization, further, an internal gas bubbles ratio may be controlled by gel-crush after polymerization.

Regarding adjustment of the "gel-crush energy" and/or the "weight average molecular weight of extractables of a hydrogel", for example, a method described in Japanese Patent Application No. 2010-088993, such as in which a screw extruder having a porous plate at a tip is used, concerning a hydrogel before gel-crush, a temperature thereof is made to be 60 to 120° C., its CRC (water absorption capacity without load) is made to be 10 to 32 [g/g] or the like, is preferably applied. Further, the gel-crush method described in Japanese Patent Application No. 2010-088993 and an application claiming the priority right of that application (including International Application No. PCT/JP2011/058829) is incorporated into the present application by reference.

(2-5) Drying Step

The present step is a step of drying a hydrogel containing gas bubbles, which are obtained via the aforementioned polymerization step and the like, to obtain a dried polymer. In addition, when the polymerization step is aqueous solution polymerization, gel-crush (micronization) is performed before drying and/or after drying of a hydrogel. And, a dried polymer (aggregate) obtained at a drying step may be subjected as it is to a pulverization step. And, a polymerization step and a drying step may be performed at the same time, by high temperature polymerization, spraying polymerization•liquid droplet polymerization or the like.

A drying method in the present invention is not particularly limited, but various methods can be adopted. Specifically, examples includes heat drying, hot air drying, reduced pressure drying, infrared drying, microwave drying, azeotropic dehydration drying with a hydrophobic organic solvent, high humidity drying using a water steam at a high temperature and the like, and one or two or more of them can be also used in combination.

In a suitable embodiment of the present invention, a hydrogel containing gas bubbles (particularly, closed-cell) is obtained via the polymerization step and the like, and foaming of the hydrogel containing gas bubbles is more promoted at high temperature drying. Therefore, a drying temperature in the present invention is preferably 100 to 300° C., more preferably 150 to 250° C. And, a drying time depends on a surface area and a moisture content of a hydrogel, a kind of a dryer and the like, and for example, is preferably 1 minute to 5 hours, more preferably 5 minutes to 1 hour. Further, a resin solid content obtained from a drying reduction amount after drying (1 g of a powder or a particle is dried at 180° C. for 3 hours) is preferably 80% by weight or more, more preferably 85 to 99% by weight, still more preferably 90 to 98% by weight, particularly preferably 92 to 97% by weight.

(2-6) Optional Pulverization•Classification Step

The present step is a step of pulverizing and/or classifying a dried polymer obtained by the drying step to obtain, preferably, a water absorbent resin powder of a particular particle size. In addition, this step is different from the (2-4) gel-crush step in that a subject to be crushed has been via a drying step. And, a water absorbent resin after a pulverization step is named pulverized product in some cases. In addition, if a particle size can be controlled at an objective particle size by the polymerization or the drying using reverse phase polymerization, spraying polymerization•liquid droplet polymerization etc., the pulverization•classification step is not necessary, and is an optional step, but preferably, a classification step is performed, and further, a pulverization step is also performed (in water-soluble polymerization etc.).

(Particle Size)

A weight average particle diameter (D50) of a water absorbent resin powder before surface crosslinking is preferably 200 to 600 µm, more preferably 200 to 550 µm, still more preferably 250 to 500 µm, particularly preferably 350 to 450 µm, from a view point of a free swelling rate, liquid permeability, a water absorption capacity under load and the like. And, it is good that fine particles having a particle diameter of less than 150 µm defined by standard sieve classification are as small as possible, and from a view point of liquid permeability and the like, 0 to 5% by weight is preferable, 0 to 3% by weight is more preferable, and 0 to 1% by weight is further preferable. Further, it is good that coarse particles having a particle diameter defined by standard sieve classification of 850 µm or more, preferable 710 µm or more are as small as possible, and from a view point of a free swelling rate and the like, 0 to 5% by weight is preferable, 0 to 3% by weight is more preferable, 0 to 1% by weight is further preferable. And, a ratio of a particle diameter of preferably 150 µm or more and less than 850 µm, more preferable 150 µm or more and less than 710 µm is preferably 95% by weight or more, more preferably 98% by weight or more, still more preferably 99% by weight or more (upper limit is 100% by weight), from a view point of a free swelling rate, liquid permeability, a water absorption capacity under load and the like.

In addition, coarse particles (particles having a particle diameter of, for example, 1 mm or more) which are removed by the classification step may be re-pulverized as necessary, and fine particles (particles having a particle diameter of, for example, less than 150 µm, preferably less than 106 µm) which are removed by the classification step may be discarded, may be used in other use, or may be recovered•reused in a fine powder recovering step described later.

Controls of the particle size can be performed independently or by combining them, respectively, at polymerization, at gel-crush, or at pulverization or classification after drying and, particularly, it is preferable that controls are performed at classification after drying. And, measurement of the particle size is performed in accordance with the method defined in International Publication No. WO 2004/69915 and EDANA-ERT420.2-02, using a JIS standard sieve.

And, a shape of the water absorbent resin powder of the present invention may be spherical or an aggregate thereof, or a pulverized non-uniformly shape obtained via a pulverization step on a hydrogel or a dried polymer, and from a view point of a free swelling rate, a pulverized non-uniformly shape or a granulated product thereof is preferable.

In order to solve the problems of the present invention well, the aforementioned particle size is also applied preferably after surface crosslinking, still more preferably to a water absorbent resin powder which is a final product.

(2-7) Optional Fine Powder Recovering Step

In order to solve the problems of the present invention, a classification step (including a second classification step after a surface crosslinking step; the same hereinafter) is included after a drying step, and it is preferable that, preferably in the classification step, fine powders are classified with a standard sieve having a mesh size of 250 to 45 µm, for example, 150 µm etc., more preferably, water absorbent resin fine particles which are the sieve passed product are separated•recovered and, thereafter, the water absorbent resin fine particles or water-added products thereof are reused at a step before a drying step.

By removing water absorbent resin fine particles, improvement in liquid permeability (e.g. SFC) was found out and, further, by adding removed water absorbent resin fine particles, a water absorbent speed (e.g. FSR) can be improved.

That is, in the production process of the present invention, the fine powder recovering step refers to a step of separating water absorbent resin fine particles (particularly, fine particles containing 70% by weight or more of particles having a particle diameter of 150 µm or less; hereinafter referred to as "fine powder" in some cases) generated at a drying step and, optionally, a pulverization and classifying step, thereafter, adding fine particles as they are or by hydration or granulation before a drying step, preferably, to a polymerization step, a gel-crush step, or a drying step, and by recovering fine powders, a particle size of a water absorbent resin particle can be controlled and, at the same time, by adding recovered fine powders to a step before a drying step, a free swelling rate can be improved.

In addition, fine powders to be added may be fine powders after the drying step and before a surface crosslinking step, or may be fine powders after a surface crosslinking step described later, and an addition amount, that is, a separation recovery amount of fine powders is preferably 1 to 40% by weight, more preferably 5 to 30% by weight of a whole dried polymer.

A preferable method of adding recovered fine powders in the present invention is a method of mixing water absorbent resin fine particles or a hydrate thereof or a granulated product thereof and, if necessary, inorganic fine particles etc. into an aqueous monomer solution before polymerization or a hydrogel during polymerization. Further, by fine powders to be added, a viscosity of an aqueous monomer solution at polymerization is increased, and the effect of promoting foaming is obtained. In addition, a method of addition to an aqueous monomer solution before polymerization is exemplified in International Publication Nos. WO 92/001008, and WO 92/020723, a method of addition to a hydrogel during polymerization is exemplified in International Publication Nos. WO 2007/074167, WO 2009/109563, WO 2009/153196, and WO 2010/006937, and a method of addition to a drying step (drying machine) is exemplified in U.S. Pat. No. 6,228,930 etc., respectively, and these fine powder adding methods are preferably applied.

(2-8) Surface Crosslinking Step (a Preferable Method is Described in [3] Described Later)

The present step is a step of crosslinking-treating a surface or a vicinity of a surface of a water absorbent resin powder in order to improve a free swelling rate and liquid permeability of a water absorbent resin powder obtained in the classification step and, further, a water absorbent resin powder including a fine powder recovering step, and by passing through the step, a surface-crosslinked water absorbent resin is obtained.

In addition, surface crosslinking is performed by addition of a surface crosslinking agent described later, polymerization of a monomer on a surface of a water absorbent resin powder, or addition of a radical polymerization initiator such as a persulfate salt and heating•ultraviolet irradiation, and the like, and in the present invention, addition of a surface crosslinking agent is preferable, addition of a covalently binding surface crosslinking agent which covalently binds to a carboxyl group which is a functional group of a water absorbent resin and, further, a dehydration reactive surface crosslinking agent having dehydration reactivity with a carboxyl group are more preferable and, further, use in combination of addition of a covalently binding surface crosslinking agent and other method (ion binding (reactive) surface crosslinking agent having ion binding property with a carboxyl group) is preferable. A preferable dehydration reactive surface crosslinking agent is shown below.

The present invention is applied to a method for producing a water absorbent resin powder of a high water absorption capacity under load (e.g. AAP) and liquid permeability (e.g. SFC), and continuous production at a huge scale (particularly, 1 [t/hr] or more), and is particularly preferably applied to a water absorbent resin powder by high temperature surface crosslinking. The present invention is characterized in that, in a step of surface crosslinking, a non-polymerized organic compound is stored in the heated state, is mixed with other compound, and is mixed with a water absorbent resin powder (first method), a mixing ratio thereupon is controlled with a mass flowmeter (second method) and a non-polymerized organic compound is used in the heat-melted state (third method). Details of a surface crosslinking step which is the characteristic of the present invention will be described later in the following [3].

(Amount of β-Hydroxypropionic Acid (Salt) in a Water Absorbent Resin Before Surface Crosslinking)

In order to suppress increase in generation of a residual monomer by surface crosslinking, β-hydroxypropionic acid (salt) in a water absorbent resin powder before surface crosslinking is made to be 1000 ppm or less, further 0 to 1000 ppm, 0 to 500 ppm, 0 to 200 ppm, 0 to 100 ppm.

By using in combination with a surface crosslinking agent described later (particularly, polyhydric alcohol and alkylene carbonate are used in combination) and, further, using in combination with an ion binding crosslinking agent in the present invention, shortening of a heating time and lowering of a heating temperature become possible. Still more preferably, an organic acid or an inorganic acid may be used in combination. By shortening a heating time and lowering a heating temperature, it is also possible to suppress increase in a residual monomer due to degradation of β-hydroxypropionic acid (salt) low, being preferable.

(Covalently Binding Surface Crosslinking Agent)

As a surface crosslinking agent usable in the present invention, various organic or inorganic covalently binding surface crosslinking agents which covalently bind to a carboxyl group which is a functional group of a water absorbent resin are exemplified, and an organic surface crosslinking agent is preferably used. From a view point of physical properties of the resulting water absorbent resin powder, examples include a polyhydric alcohol compound, an epoxy compound, a polyvalent amine compound or a condensate with a haloepoxy compound thereof, an oxazoline compound, (mono, di, or poly)oxazolidinone compound, an oxetane compound, an alkylene carbonate compound and the like and, particularly, a dehydration reactive crosslinking agent consisting of a polyhydric alcohol compound, an alkylene carbonate compound, an oxazolidinone compound or the like is preferably exemplified.

Herein, the dehydration reactive surface crosslinking agent is a surface crosslinking agent which performs a dehydration esterification reaction between a carboxyl group which is a functional group of a polyacrylic acid (salt)-based water absorbent resin powder, and a hydroxy group or an amino group which is a functional group of a surface crosslinking agent, or a dehydration amidation reaction, and a surface crosslinking agent which generates a hydroxy group and an amino group from a cyclic crosslinking agent or via such the group, such as an alkylene carbonate compound and an oxazolidinone compound is also classified as the dehydration reactive surface crosslinking agent.

In addition, when the dehydration reactive crosslinking agent is used, preferably, a method of heating (further, melting) a dehydration reactive crosslinking agent, a storing method, a transporting method, and a method of mixing at a predetermined ratio described in (3-3) to (3-5) described later are preferably used. A particularly preferable mixing method will be described in [3] described later, particularly, (3-6) to (3-9).

Examples of the covalently binding surface crosslinking agent include compounds exemplified in U.S. Pat. Nos. 6,228,930, 6,071,976 and 6,254,990 etc. For example, examples include polyhydric alcohols such as (mono, di, tri, tetra, or poly)propylene glycol, 1,3-propanediol, glycerin, 1,4-butanediol, 1,3-butanediol, 1,5-pentanediol, 1,6-hexanediol and sorbitol; epoxy compounds such as ethylene glycol diglycidyl ether and glycidol; alkylene carbonate compounds such as ethylene carbonate, propylene carbonate and glycerin carbonate; an oxetane compound; cyclic urea compounds such as 2-imidazolidinone; and the like.

And, as the surface crosslinking agent usable in the present invention, a surface crosslinking agent which forms an amide bond or an ester bond, further, an ester bond with a carboxyl group is more preferably used. When such the surface crosslinking agent is not used, not only it is difficult to obtain particular physical properties described later (water absorption capacity without load CRC, water absorption capacity under load AAP), but also safety of a residual crosslinking agent becomes a problem, in some cases, as compared with a dehydration reactive surface crosslinking agent having generally high safety and a surface crosslinking agent which forms an ester bond (preferably, polyhydric alcohol, alkylene carbonate, oxazolidinone compound, oxetane compound, aminoalcohol compound etc.).

In addition, examples of the surface crosslinking agent which forms an ester bond (preferably, a dehydration ester bond) with a functional group (carboxyl group) of a polyacrylic acid (salt)-based water absorbent resin powder include compounds having a hydroxy group in a molecule, such as a polyhydric alcohol or aminoalcohol, compounds which generate a hydroxy group by ring opening, such as alkylene carbonate, oxazolidinone or oxetane, and the like.

(Use of a Covalently Binding Surface Crosslinking Agent in Combination, Particularly, a Dehydration Reactive Crosslinking Agent Having a Different Reaction Mechanism)

In the present invention, among these surface crosslinking agents, from a view point of physical properties, shortening of a reaction time, reduction in a residual surface crosslinking agent and the like, particularly, a dehydration reactive surface crosslinking agent is used and, as the dehydration reactive surface crosslinking agent, a dehydration reactive surface crosslinking agent having a different reaction mechanism is used in combination. Herein, as the surface crosslinking agent having a different reaction mechanism, a plurality of compounds from a hydroxyl compound which is dehydration-esterified with a carboxyl group, an amino compound which is dehydration-amidated, and a cyclic compound which is ring-opened (including different cyclic structures, such as a 4-membered ring, a 5-membered ring etc.), particularly, a polyhydric alcohol, alkylene carbonate, an oxazolidinone compound, an oxetane compound, and an aminoalcohol compound are used in combination and, particularly, a polyhydric alcohol, and a cyclic compound selected from alkylene carbonate, an oxazolidinone compound, and an oxetane compound are used in combination and, further, a polyhydric alcohol and alkylene carbonate are used in combination.

As these surface crosslinking agents, from reactivity and mixability with a water absorbent resin, preferably, a non-polymerized surface crosslinking agent (non-polymerized compound) is used, particularly, a non-polymerized water-soluble surface crosslinking agent is used, and a carbon number thereof is 20 or less, further, 15 or less. By use of a covalently binding surface crosslinking agent in combination, particularly, a dehydration reactive crosslinking agent having a different reaction mechanism in the present invention, physical properties and productivity are improved and, further, a residual surface crosslinking agent and a byproduct (particularly, ethylene glycol which is produced from ethylene carbonate as a byproduct) can be reduced. For example, as compared with the case where ethylene carbonate is used alone as a surface crosslinking agent, when a polyhydric alcohol is used in combination, since residual ethylene carbonate can be reduced and, further, a reaction time can be shortened, productivity can be also improved, and this is preferable. However, remaining of a predetermined amount of ethylene glycol, particularly, remaining of less than 1000 ppm in the resulting final product is preferable in some cases, and a predetermined amount may remain.

In addition, the surface crosslinking agent having a different reaction mechanism (particularly, dehydration reactive surface crosslinking agent) does not include use of the same compound in combination, such as use of a plurality of polyhydric alcohols in combination (e.g. use of butanediol and propylene glycol in combination), persistently, different reaction mechanisms such as esterification, amidation, ring opening and use thereof in combination, specifically, two or more from a polyhydric alcohol, alkylene carbonate, an oxazolidinone compound, an oxetane compound, and an aminoalcohol compound are used in combination and, suitably, a polyhydric alcohol compound and an alkylene carbonate compound are used in combination.

A polyhydric alcohol which is suitably used in combination, is a C(number of carbon atom)2-C6 (preferably, C3-C6) polyol (another name; polyhydric alcohol), further, a C2-C4 (preferably, C3-C4), C2-C3, C3 polyol, particularly, a diol (particularly, C3 diol) and, further, one or two or more of ethylene glycol, propylene glycol, 1,3-propane diol, particularly, propylene glycol which is a C3 diol, and 1,3-propanediol are preferably used.

The polyhydric alcohol is used in combination with a surface crosslinking agent other than a polyhydric alcohol, particularly, a cyclic compound selected from an alkylene carbonate compound, an oxazolidinone compound and an oxetane compound, particularly, an alkylene carbonate compound. From a view point of physical properties, among them, as the alkylene carbonate compound, ethylene carbonate, propylene carbonate, and glycerin carbonate are used and, as the oxazolidinone compound, 2-oxazolidinone is preferably used and, as the oxetane compound, 2-oxetane is preferably used. Particularly preferable is ethylene carbonate. By combining ethylene carbonate and a polyhydric alcohol, liquid permeability is improved and, at the same time, production of a byproduct derived from ethylene carbonate is suppressed.

In addition, an extremely small amount (ppm) of a raw material or a polyhydric alcohol and aminoalcohol as a byproduct are contained as impurities, in a polyhydric alcohol derivative such as alkylene carbonate, or an aminoalcohol derivative such as oxazolidinone as a surface crosslinking agent, in some cases. However, this is not a significant amount (e.g. use in combination range described later) exhibiting the effect of the present invention, such as an extremely minor amount of ethylene glycol in ethylene carbonate, and the present invention is characterized in that an intentional significant amount is used in combination. A preferable use amount and ratio are as described below.

When a plurality of dehydration reactive surface crosslinking agents are used in combination, particularly, when a polyhydric alcohol and a surface crosslinking agent other than a polyhydric alcohol (among them, a cyclic compound such as alkylene carbonate etc.) are used in combination, a ratio (weight ratio) thereof is usually 1:9 to 9:1, preferably 2:8 to 8:2, more preferably 3:7 to 7:3, particularly 5:5 to 7:3, and at this weight ratio, a polyhydric alcohol and the cyclic compound are used in combination and, further, a polyhydric alcohol (still more preferably, C3-C6) and alkylene carbonate (still more preferably, ethylene carbonate) are used in combination.

In addition, when an alkylene carbonate compound and a compound other than a polyhydric alcohol compound are used in combination, these two kinds are made to be a main component at 50 to less than 100%, particularly 60 to 90%, and a surface crosslinking agent having a third reaction mechanism (e.g. an oxazolidinone compound etc., when a polyhydric alcohol and alkylene carbonate are used in combination) is used in combination at 90% by weight or less, 70% by weight or less, 50% by weight or less, 30% by weight or less to a second surface crosslinking agent (surface crosslinking agent at a smaller amount as compared with an amount of a first surface crosslinking agent). In addition to a polyhydric alcohol and a surface crosslinking agent other than a polyhydric alcohol (among them, a cyclic compound such as alkylene carbonate), a third covalently binding surface crosslinking agent which is preferably used in combination is a non-dehydration reactive surface crosslinking agent, particularly an epoxy-based ring opening reactive surface crosslinking agent, particularly, a polyglycidyl compound, and (poly)glycol diglycidyl ether and the like are optionally used in combination.

In the present invention, by using in combination with a polyhydric alcohol compound and the cyclic compound (preferably, alkylene carbonate compound) as a surface crosslinking agent, physical properties of the resulting water absorbent resin is improved, a reaction time is shortened, and a residual surface crosslinking agent and a byproduct thereof (ethylene glycol, particularly when ethylene carbonate is used) can be also reduced. And, by using in combination with a polyhydric alcohol and the cyclic compound as a surface crosslinking agent, since preservation stability of the cyclic compound, particularly, stability in an aqueous surface crosslinking agent solution is improved, and ring opening of the cyclic compound before use is suppressed, degradation into ethylene glycol when ethylene carbonate is used, and degradation into ethanolamine when oxazolidinone is used, can be controlled.

As a preferable polyhydric alcohol, since the aforementioned polyhydric alcohol, particularly a C3-C6 polyhydric alcohol, among it, particularly propylene glycol and 1,3-propanediol improve preservation stability of an aqueous cyclic compound (particularly, alkylene carbonate, further, ethylene carbonate) solution, being preferable.

Hence, in the present invention, by using in combination with a polyhydric alcohol and a surface crosslinking agent other than a polyhydric alcohol (among it, a cyclic compound such as alkylene carbonate etc.), since preservation stability of a cyclic compound is improved, in a method of mixing a cyclic compound such alkylene carbonate and oxazolidinone into a water absorbent resin to perform surface crosslinking, degradation of a cyclic compound before mixing is suppressed and, therefore, a mixing ratio of a cyclic compound is made to be constant, and physical properties after surface crosslinking is stabilized.

Thereupon, it is preferable that a water amount of an alkylene carbonate compound is 1.0% by weight or less, further, 0.01% by weight or more and 1.0% by weight or less. When water is contained at a large amount, for example, when heated or heat-melted such as production of ethylene glycol as a byproduct from ethylene carbonate, there is a possibility that degradation and coloration occur, and heating or heat-melting is preferably performed at the aforementioned water amount. Herein, the water amount in the case of an alkylene carbonate compound is a water amount of alkylene carbonate immediately before preparation of a surface crosslinking agent and, also when an alkylene carbonate is used by heat-melting as described later, the water amount refers to a water amount of an alkylene carbonate compound in the melted state immediately before preparation of a surface crosslinking agent. For measuring a water amount, a value measured by using a Carl Fischer moisture meter is adopted.

(Suitable Surface Crosslinking Agent)

It is preferable that an alkylene carbonate compound and a polyhydric alcohol compound are mixed into a polyacrylic acid (salt)-based water absorbent resin, thereafter, they are heat-reacted and, further, from a view point of improvement in liquid permeability, an ion binding surface crosslinking agent is mixed simultaneously and/or separately, at a surface crosslinking step. Still more preferably at a surface crosslinking step, a surfactant is mixed at the same time with, or separately from addition of an alkylene carbonate compound and a polyhydric alcohol compound. A time at which an ion reactive surface crosslinking agent/a surfactant are added separately may be before or after addition of an alkylene carbonate compound and a polyhydric alcohol compound, or an ion binding surface crosslinking agent/a surfactant may be added both before addition and after addition. And, still more preferably, an α-hydroxycarboxylic acid compound (particularly, lactic acid or a salt thereof) described later is mixed. Herein, it is preferable that a polyhydric alcohol compound is a C3-C6 polyhydric alcohol, and an ion binding surface crosslinking agent is a polyvalent metal cation.

A use amount of the surface crosslinking agent may be appropriately set by physical properties of the resulting water absorbent resin powder, a kind of a surface crosslinking agent used and the like, is not particularly limited, and is preferably 0.001 to 10 parts by weight (in the case of plural use in combination, as expressed by each amount, still more preferably, a total amount), and an order of 0.01 to 5 parts by weight, 0.1 to 5 parts by weight, and 0.1 to 1 part by weight is more preferable, relative to 100 parts by weight of a water absorbent resin powder.

Particularly, a use amount of an ethylene carbonate surface crosslinking agent is preferably such that a use amount of ethylene carbonate is in the aforementioned range, further, 0.1 to 1 part by weight, and a C3-C6 polyhydric alcohol (preferably, C3 diol, particularly, propylene glycol) is in the aforementioned range, further, 0.1 to 5 parts by weight, relative to 100 parts by weight of a water absorbent resin powder, from a view point of improvement in water absorbing physical properties and reduction in an amount of residual ethylene glycol. And, it is preferable that water in an aqueous surface crosslinking agent solution is 0.1 to 5 parts by weight relative to 100 parts by weight of a water absorbent resin powder, from the similar view point.

Also when an organic surface crosslinking agent (including the case of a plurality of organic surface crosslinking agents) and an inorganic surface crosslinking agent are used in combination, they are used in combination at preferably 0.001 to 10 parts by weight, more preferably 0.01 to 5 parts by weight, respectively, relative to 100 parts by weight of a water absorbent resin powder. And, preferable plural organic surface crosslinking agents are the aforementioned compounds (a polyhydric alcohol and a compound other than a polyhydric alcohol), at the aforementioned ratio. And, a surfactant and an α-hydroxycarboxylic acid compound are also appropriately used in a range described later.

(Solvent, Aqueous Surface Crosslinking Agent Solution and Concentration)

And, in conformity with a surface crosslinking agent, preferably, water is used. That is, a suitable one embodiment of the present invention is that an aqueous surface crosslinking agent solution containing at least an alkylene carbonate compound, a polyhydric alcohol compound and water is prepared, and the aqueous surface crosslinking agent solution is mixed into a water absorbent resin powder. A content of water thereupon is preferably 0.5 to 20 parts by weight, more preferably 0.5 to 10 parts by weight relative to 100 parts by weight of a water absorbent resin powder. Further, when an inorganic surface crosslinking agent and an organic surface crosslinking agent are used in combination, each is used in combination at preferably 0.001 to 10 parts by weight, more preferably 0.01 to 5 parts by weight. Thereupon, a hydrophilic organic solvent may be used, and a use amount thereof is preferably more than 0 part by weight and 10 parts by weight or less, more preferably more than 0 part by weight and 5 parts by weight or less, relative to 100 parts by weight of a water absorbent resin powder. In addition, water may be added separately, or water may be water contained as an aqueous solution of a non-polymerized compound and/or other compound to be mixed into an aqueous surface crosslinking solution.

A temperature of these solvents to be mixed is appropriately determined, since when a temperature is too low, a problem of solubility and a viscosity arises in some cases, particularly, when a solid non-polymerized organic compound described later in (3-1) is used in a surface crosslinking agent, particularly, ethylene carbonate is used as a surface crosslinking agent, water which has been warmed to room temperature or higher (30 to 100° C. is preferable, 35 to 70° C. is more preferable, 40 to 65° C. is further preferable) is used in a solvent. That is, it is preferable that other compound to be mixed with a non-polymerized organic compound (particularly, a solid surface crosslinking agent, further, a cyclic compound such as a solid polyhydric alcohol and alkylene carbonate), particularly, water has been warmed, and the aforementioned temperature range is more preferable.

And, it is preferable that an alkylene carbonate compound or the aforementioned polyhydric alcohol compound, particularly a solid alkylene carbonate compound is heated in advance before mixing with water. Concerning a heating temperature, it is preferable that the compound is heated to a temperature higher than a temperature of an aqueous surface crosslinking agent solution after addition of water, specifically, in the case of a solid alkylene carbonate compound, a temperature described in a column of (3-3) described later is preferable, and it is preferable that a polyhydric alcohol, particularly, a solid polyhydric alcohol is also heat-melted, and the temperature is preferably 30 to 100° C., more preferably 35 to 70° C., still more preferably 40 to 65° C.

Further, upon mixing of a surface crosslinking agent solution into a water absorbent resin powder, a water-insoluble fine particle and a surfactant may coexist at, for example, more than 0 part by weight and 10 parts by weight or less, preferably more than 0 part by weight and 5 parts by weight or less, more preferably more than 0 part by weight and 1 part by weight or less, still more preferably 0.0005 to 1 part by weight relative to a water absorbent resin powder in such the range that the effect of the present invention is not prevented. Thereupon, a surfactant or the like to be used is disclosed in U.S. Pat. No. 7,473,739 or the like. An average preservation time as an aqueous solution is a range described later, particularly, within 1 hour.

A concentration of a surface crosslinking agent is appropriately determined, and from a view point of physical properties, a surface crosslinking agent is formulated into an aqueous solution of 1 to 80% by weight, further 5 to 60% by weight, 10 to 40% by weight, 15 to 30% by weight. In addition, herein, an aqueous solution is not limited to the case of a solvent of only water, and the solvent may contain 0 to 50% by weight, 0 to 30% by weight, 0 to 10% by weight of an organic solvent as a solvent other than water, particularly, may contain a hydrophilic organic solvent (particularly, boiling point of 150° C. or lower, further 100° C. or lower) as a solvent. Examples of the hydrophilic organic solvent used include a C1-C4, further C2-C3 primary alcohol and, additionally, a C4 or less lower ketone such as acetone, and the like.

A temperature of such the aqueous surface crosslinking agent solution is appropriately determined from a viewpoint of solubility of a surface crosslinking agent used, a viscosity of the aqueous solution and the like, and is preferably in a range of −10 to 100° C., further 5 to 50° C., 10 to 30° C., 35 to 70° C., 40 to 65° C. as described in the following (3-8). When a temperature is too high, there is a tendency that, before mixed or reacted with a water absorbent resin powder, a cyclic surface crosslinking agent is hydrolyzed (e.g. degradation from ethylene carbonate into ethylene glycol, degradation from oxazolidinone into ethanolamine), and mixability is deteriorated. When a temperature is too low, this is not preferable in respect of solubility and a viscosity, in some cases.

Herein, it is preferable that after preparation into an aqueous surface crosslinking agent solution, the solution is used in an as short time as possible, that is, the solution is used by mixing into a water absorbent resin within 10 days, within 5 days, within 1 day, within 10 hours, within 1 hour, within 1 minute, as an average preservation period. That is, after a predetermined compound is mixed at a predetermined ratio, a temperature is adjusted at the aforementioned temperature and, thereafter, the solution is mixed into a water absorbent resin within 10 days. In the present invention, it is preferable that after a non-polymerized organic compound described later including a surface crosslinking agent and other compound such as water, or a non-polymerized organic compound and water are mixed, a temperature of the mixture is adjusted at 50° C. or lower, and the mixture is mixed into a water absorbent resin within 10 days after preparation.

And, it is preferable that, after an aqueous surface crosslinking agent solution is prepared, the solution is stored at 50° C. or lower, preferably 20 to 50° C. before mixing into a water absorbent resin powder, from a view point of preservation stability.

Further, an upper space in a storage tank at storage of an aqueous surface crosslinking agent may be an air, and for the purpose of preventing deterioration, preventing coloration or the like, the upper space may be nitrogen or an inert gas such as nitrogen. And, conveniently, the upper space may be under reduced pressure or under increased pressure, but is usually under a normal pressure (atmospheric pressure). And, an atmospheric dew point at storage (dew point in an upper space) is preferably low, and is 20° C. or lower, further 10° C. or lower, 0° C. or lower, −10° C. or lower, −20° C. or lower. In order to control a dew point, at storage, a dry air may be used, or an inert gas, preferably a nitrogen gas may be used. A nitrogen gas has a dew point of −73° C. or lower, and a helium gas has a dew point of −65° C. or lower.

It is preferable that upon mixing of an aqueous surface crosslinking agent solution into a water absorbent resin powder, mixing is performed while a flow rate is measured with a mass flowmeter (preferably, Coriolis-type flowmeter). By using a mass flowmeter, since influence of a change in a specific gravity due to change in an air temperature or a liquid temperature disappears, a mixing ratio of a solution can be more precisely adjusted, and even when many components (3 or more components) are mixed, since a mixing ratio is stabilized, physical properties of a water absorbent resin is stabilized.

(Use of an Acid or a Base in Combination in an Aqueous Surface Crosslinking Agent Solution)

In order to promote a reaction of a surface crosslinking agent or uniform mixing, an acid or a base may be used in combination with a surface crosslinking agent. As an acid or a base used, an organic acid or a salt thereof, an inorganic acid or a salt thereof, and an inorganic base are used, and they are appropriately used at 0 to 10 parts by weight, further 0.01 to 5 parts by weight, 0.1 to 3 parts by weight relative to 100 parts by weight of a water absorbent resin powder. An organic acid to be used is a C1-C6, further C2-C4 water-soluble organic acid, a water-soluble saturated organic acid, particularly a saturated organic acid containing a hydroxyl group. A representative organic acid is acetic acid, propionic acid, lactic acid, 3-hydroxypropionic acid, citric acid, tartaric acid or a salt thereof, and the salt is a monovalent salt or a polyvalent metal salt, particularly, an alkali metal salt or a trivalent salt (particularly, aluminum salt). And, an inorganic acid to be used is carbonic acid, sulfuric acid, hydrochloric acid, phosphoric acid, polyphosphoric acid or a salt thereof, and the salt is a monovalent salt or a polyvalent metal salt, particularly, an alkali metal salt or a trivalent salt (particularly, aluminum salt). A usable inorganic base is hydroxide, carbonate, or bicarbonate of an alkali metal, or a hydroxide of a polyvalent metal or the like. Examples of a suitable inorganic acid include aluminum sulfate, and examples of an organic acid include lactic acid and the like. And, when the aforementioned acid is used in combination, it is preferable that a surface crosslinking agent solution is an acidic solution having a pH of 2.5 to 6.9.

Particularly, when the aforementioned dehydration reactive surface crosslinking agent, further a cyclic dehydration reactive surface crosslinking agent, particularly an alkylene carbonate compound is used in a present invention, it is preferable that an acid (an organic acid or an inorganic acid) or a base is used in combination with a surface crosslinking agent at a surface crosslinking step, and particularly, an acid (an organic acid or an inorganic acid) is used in combination with a cyclic dehydration reactive surface crosslinking agent. By use of a base, mixability of a surface crosslinking agent is improved, but reactivity between a water absorbent resin powder and a surface crosslinking agent is reduced, further, stability of an aqueous surface crosslinking agent solution before surface crosslinking is reduced, in some cases. For example, since ethylene carbonate is degraded in an aqueous basic solution to produce ethylene glycol as a byproduct, attention is necessary. An average time when such the acid or base, particularly a base is preserved as an aqueous solution is in the aforementioned range, particularly within 1 hour.

(A Particularly Preferably Surface Crosslinking Agent and a Use Amount Thereof)

From a view point of improvement in water absorbing physical properties, particularly a relationship between a water absorption capacity without load and liquid permeability, or between a water absorption capacity without load and a water absorption capacity under load, a surface crosslinking agent which is particularly preferable in the present invention is preferably a surface crosslinking agent including ethylene carbonate, still more preferably a C3-C6 polyhydric alcohol compound, particularly propylene glycol, and is added to a water absorbent resin powder as an aqueous surface crosslinking agent solution. An ion binding surface crosslinking agent which is used simultaneously with, or separately from the aqueous surface crosslinking agent solution is described in (2-9) described later and, among it, an aluminum salt is preferable, and it is, for example, aluminum sulfate, or aluminum lactate.

A use amount of a surface crosslinking agent, from a view point of improvement in water absorbing physical properties and reduction in an amount of residual ethylene glycol, is such that a use amount of ethylene carbonate is 0.001 to 10 parts by weight, more preferably 0.01 to 5 parts by weight, still more preferably 0.1 to 1 part by weight, and a use amount of propylene glycol is 0.001 to 10 parts by weight, more preferably 0.01 to 5 parts by weight, still more preferably 0.1 to 5 parts by weight, relative to 100 parts by weight of a water absorbent resin powder. And, from the similar view point, it is preferable that water in an aqueous surface crosslinking agent solution is 0.1 to 5 parts by weight relative to 100 parts by weight of a water absorbent resin powder.

Concerning an aluminum salt, a use amount of an ion binding crosslinking agent described later is applied. And, a mixing ratio of a polyhydric alcohol compound and a carbonate compound, and an ion binding compound is not particularly limited, but a polyhydric alcohol compound and a carbonate compound: an ion binding compound=50:1 to 2:1 (weight ratio) is preferable. By adopting the aforementioned use amount, a novel water absorbent resin powder having a composition described later, and which realizes both of safety and water absorbing physical properties is obtained. Further, by performing surface crosslinking at the aforementioned use amount, and adjusting a concentration of a residual crosslinking agent and a byproduct, that is, ethylene glycol and propylene glycol in a final water absorbent resin powder and, optionally a moisture content and the like at a range described later, a water absorbent resin powder excellent in conveyability is obtained. In addition, being excellent in conveyability means that a water absorbent resin powder undergoes damage with difficulty in transport at a step of producing a water absorbent resin powder, or at a diaper factory.

(Mixing Method)

Regardless of a particular method of mixing a water absorbent resin and a surface crosslinking agent, preferably, a mass flowmeter described in (3-6) described later, and a mixing machine and a mixing time described in (3-8) are applied.

(Heating of a Water Absorbent Resin Powder)

A water absorbent resin powder after mixing with a surface crosslinking agent is reacted by heat-treatment and, if necessary, thereafter, the powder is cooling-treated. A heating temperature is preferably 70 to 300° C., more preferably 120 to 250° C., and in the case of use of a dehydration reactive surface crosslinking agent, still more preferably 150 to 250° C., further 170 to 230° C., and a heating time is preferably in a range of 1 minute to 2 hours, 5 minutes to 1 hour. It is preferable that a cooling temperature after surface crosslinking is lower than a surface crosslinking temperature, and the powder is cooled to particularly 10° C. or higher, for example, 100° C. or lower, further a range of 30 to 90° C., particularly 40 to 80° C.

A pressure at these heating step and cooling step is also appropriately determined, and it is preferable to be performed at a normal pressure or a reduced pressure, particularly a slightly reduced pressure described in (2-10) stated later for shortening of a reaction time, and reduction in a residual crosslinking agent and a byproduct, and a residual surface crosslinking agent, particularly, a polyhydric alcohol compound, and ethylene glycol which is produced from ethylene carbonate as a byproduct in the resulting water absorbent resin are also adjusted to a predetermined amount or less.

Specifically, in the case of ethylene glycol, it can be reduced to 1000 ppm or less (900 ppm or less, 800 ppm or less, 700 ppm or less), and in the case of a C3-C6 polyhydric alcohol, preferably a C3 diol, particularly propylene glycol), it can be reduced to 1000 to 10000 ppm. When an amount exceeds the upper limit, flowability of a powder and Anti-Caking property are deteriorated. And, regarding ethylene glycol and a C3-C6 polyhydric alcohol compound, it is disadvantageous in the excessive cost and a process, but inclusion at a constant amount is preferable in surface hydrophilization and dust prevention in some cases, and a lower limit of ethylene glycol is 1 ppm, 10 ppm or more, further 100 ppm or more, and a lower limit of a C3-C6 polyhydric alcohol is 100 ppm, further 1000 ppm, respectively.

Further, also from productivity, it is preferable that a water absorbent resin powder before mixing with a surface crosslinking agent has been heated, particularly in the case of a solid non-polymerized organic compound described later, further a water-soluble non-polymerized organic compound, by mixing into a water absorbent resin powder in the heated state, particularly which has been heated to a melting point of a non-polymerized organic compound in a surface crosslinking agent or higher, a surface crosslinking agent can be mixed more uniformly. When heated in advance, a heating temperature is a melting point of a surface crosslinking agent or higher, and is preferably 30° C. or higher, further in a range of 35 to 100° C., particularly 40 to 80° C. When a temperature is low, a time is necessary for surface crosslinking, a surface crosslinking agent becomes at a melting point or lower, and mixability is reduced. And, when a temperature is excessively high, particularly when a temperature exceeds a boiling point of water, water is evaporated from an aqueous surface crosslinking agent solution and, conversely, there is a possibility that mixability and physical properties are reduced.

(Mixing Method)

A method of mixing a water absorbent resin and a surface crosslinking agent is not particularly limited, but preferably, a mass flowmeter described in (3-6) stated later, and a mixing machine and a mixing time described in (3-8) are applied.

(Number of Components)

As in (3-8) described later, in order to more exert the effect of the present invention, as a surface crosslinking agent, a plurality of, further 3 or more components, 4 or more components of surface crosslinking agents are applied. An upper limit of the number of components is appropriately determined, and is around 10 components. This is also suitably used when surface crosslinking agents are added plural times, and preferably is applied to the case where addition and a reaction of an ion binding crosslinking agent are performed after addition and a reaction of a covalently binding surface crosslinking agent, or the like.

By such the surface crosslinking, particularly surface crosslinking after the aforementioned particle size control, a water absorption capacity under load (AAP) described later may be crosslinked to a range described later, preferably 20 [g/g] or more, still more preferably 23 to 30 [g/g]. Particularly, when SFC is improved to the following range (e.g. $20[\times 10^{-7} \cdot cm^3 \cdot s \cdot g^{-1}]$ or more, still more preferably a range described later), CRC may be surface-crosslinked at the aforementioned range in a range of preferably 15 to 45 [g/g], more preferably 20 to 40 [g/g], still more preferably 25 to 35 [g/g], particularly preferably 28 to 33 [g/g], and still more preferably, by further inclusion of a liquid permeability improving agent selected from a polyvalent metal cation, a polyamine polymer, and a water-insoluble fine particle, liquid permeability can be improved more.

(Production Amount)

The production method of the present invention is more suitable for stabilization of physical properties at continuous operation or a huge scale and simplification of production. Hence, the method is suitably applied to continuous production for preferably 1 day (24 hours) or longer, further 10 days or longer. And, the process is suitably applied to 0.1 [t/hr] or more per 1 line (apparatus), further a production amount described in the aforementioned polymerization, particularly, continuous production. In the present invention, a water absorbent resin powder can be produced at 1 ton or more per 1 hour.

In such the production at a huge scale, particularly continuous production, for stabilizing physical properties or simplifying a step, a solid non-polymerized organic compound is used, suitably, a non-polymerized organic compound is heated, preferably melted, and is mixed into a water absorbent resin powder as an aqueous solution. And, preferably, in such the mixing step, a mass flowmeter, particularly a Coriolis-type mass flowmeter is used. In [3], a solid non-polymerized organic compound and a mass flowmeter which are preferably used will be described.

(2-9) A Step of Adding an Additive

The present step is a step of adding each additive in order to impart various functions to a water absorbent resin powder, and is composed of one or a plurality of steps. Examples of the additive include a liquid permeability improving agent which improves liquid permeability, a surfactant which improves a free swelling rate and liquid permeability, or a coloration preventing agent, a resistance to degradation by urin improving agent and the like. And, all or a part of these additives may be added simultaneously with, or separately from the surface crosslinking agent. Herein, when the liquid permeability improving agent can be reacted with a water absorbent resin, for example, when the agent is the following ion binding surface crosslinking agent, a step of adding such the liquid permeability improving agent is one kind of the surface crosslinking step described in (2-8).

(Ion Binding Surface Crosslinking Agent, Water-Insoluble Fine Particle)

In addition to use in combination with the covalently binding surface crosslinking agent, preferably, a polyhydric alcohol and a compound other than a polyhydric alcohol (particularly, a cyclic compound such alkylene carbonate), a polyvalent cationic polymer such as a polyamine polymer and a polyvalent metal salt (polyvalent metal cation) as an ion binding surface crosslinking agent are mixed at a surface crosslinking step, simultaneously with, or separately from the covalently binding surface crosslinking agent, to improve liquid permeability and the like. Among them, from a view point of improvement in liquid permeability, it is preferable to use a polyvalent metal cation as an ion binding surface crosslinking agent and, further, it is preferable to use an aluminum salt. And, from a view point of liquid permeability and suppression of a byproduct and raw material impurities, it is preferable that a polyhydric alcohol compound is a C3-C6 polyhydric alcohol, and the ion binding surface crosslinking agent is a polyvalent metal cation.

The ion binding surface crosslinking agent is used simultaneously with, or separately from a polyhydric alcohol compound and an alkylene carbonate compound which are a covalently binding surface crosslinking agent, and contributes to improvement in liquid permeability by forming an electrostatic spacer on a surface of a swollen gel particle. These additions may be dry-blending, or may be added as an aqueous solution or a water dispersion, using around 0 to 20 parts by weight of a solvent such as water. Regarding a preferable temperature, and a mixing machine and a flowmeter, (2-8) can be applied. In the present invention, when liquid permeability (SFC) is $20[\times 10^{-7} \cdot cm^3 \cdot s \cdot g^{-1}]$ or more, still more preferably in a range described later, use of a covalently binding surface crosslinking agent and an ion binding surface crosslinking agent in combination, further use in combination with a water-insoluble fine particle described later is preferable. Still more preferably, a polyhydric alcohol or α-hydroxycarboxylic acid (salt) is used in combination at mixing with an ion binding surface crosslinking agent, for the reason of improvement in coloration.

Examples of the polyamine polymer include polyethyleneimine, polyvinylamine, polyallylamine and the like. And, as a weight average molecular weight thereof, 1000 to 5000000 is preferable, and 10000 to 1000000 is more preferable.

Examples of the polyvalent metal salt include preferably a divalent or more, more preferably trivalent or tetravalent polyvalent metal salt (organic salt or inorganic salt) or hydroxide, that is, a polyvalent metal cation. Specifically, examples of a polyvalent metal include aluminum, zirconium and the like, and examples of the polyvalent metal salt include an aluminum cation such as aluminum lactate, aluminum sulfate.

Examples of the water-insoluble fine particle include inorganic fine powders such as silicon oxide, aluminum oxide, clay and kaolin, and organic fine particles such as calcium lactate and a metal soap (polyvalent metal salt of long chain fatty acid), and a volume average particle diameter thereof is preferably 10 μm or less, more preferably 1 μm or less.

It is preferable that the water absorbent resin powder of the present invention contains simultaneously or separately further a liquid permeability improving agent selected from a polyamine polymer, a polyvalent metal salt (polyvalent metal cation), and a water-insoluble fine particle, in addition to the surface crosslinking agent. By inclusion of these liquid permeability improving agents, both of a free swelling rate and liquid permeability are realized at a higher level, further, since Anti-Caking property at moisture absorption is also excellent, those improving agents can be preferably applied to the water absorbent resin powder of the present invention which easily absorbs a moisture.

The ion binding surface crosslinking agent and the water-insoluble fine particle used in the present invention are preferably such an amount and a kind that a reduction width of a water absorption capacity under load (AAP) is preferably within 3.0 [g/g], more preferably within 2.5 [g/g], still more preferably within 2.0 [g/g], particularly preferably within 1.5 [g/g], most preferably within 0.5 [g/g]. In addition, a lower limit of a reduction width is 0 [g/g] (that is, no reduction in AAP) or −1 [g/g] (that is, AAP+1 improvement). By adjusting a water absorption capacity under load (AAP) in the aforementioned range, liquid permeability (SFC) can be improved to an objective range and, further, a water absorption capacity under suspension without load (FSC) can be improved.

Hereinafter, further, a polyhydric alcohol and/or α-hydroxycarboxylic acid (salt) which are used in combination with an ion binding surface crosslinking agent, a water-insoluble fine particle, or an ion binding surface crosslinking agent will be explained.

Examples of the ion binding surface crosslinking agent include a polyvalent metal cation and a polyvalent cationic polymer.

(Polyvalent Metal Cation)

It is preferable that a polyvalent metal compound usable in a polyvalent metal cation in the present invention is water-soluble. The cation is essentially divalent or more as polyvalent, di to tetra-valent is preferable, and further a trivalent metal cation, particularly an aluminum cation is used.

Water-soluble in the present invention refers to a compound which is dissolved in 100 g of water (25° C.) at 1 g or more, preferably 10 g or more. A polyvalent metal compound containing a polyvalent metal cation may be mixed as it is (mainly solid like) with a water absorbent resin particle, and from a view point of improvement in FSC, it is preferable that the water-soluble polyvalent metal compound is used, this is formulated into an aqueous solution, and the aqueous solution is mixed with a water absorbent resin. By mixing a water-soluble polyvalent metal compound in the state of an aqueous solution, a polyvalent metal cation which is generated by dissociation of a polyvalent metal compound acts as an electrostatic spacer between particles, liquid permeability (e.g. SFC) and a water absorption capacity (e.g. FSC) are more improved, and a water-absorbing agent of the present invention is obtained more.

It is preferable that the polyvalent metal cation usable in the present invention contains at least one or more metals selected from typical metals and transition metals having the group number of 4 to 11. Among the polyvalent metals, it is preferable that Mg, Ca, Ti, Zr, V, Cr, Mn, Fe, Co, Ni, Pd, Cu, Zn, Cd and Al are contained, and Mg, Ca, Zn and Al are more preferable, and Al is particularly preferable.

As the polyvalent metal compound containing a polyvalent metal cation usable in the present invention, a counter anion may be either organic or inorganic, and is not particularly limited. Examples include water-soluble aluminum salts such as aluminum acetate, aluminum lactate, aluminum acrylate, aluminum chloride, polyaluminum chloride, aluminum sulfate, aluminum nitrate, potassium aluminum bisulfate and sodium aluminum bisulfate; water-soluble alkaline earth metal salts such as calcium chloride, calcium nitrate, magnesium chloride, magnesium sulfate and magnesium nitrate; transition metal salts such as zinc chloride, zinc sulfate, zinc nitrate, copper sulfate, cobalt chloride, zirconium chloride, zirconium sulfate and zirconium nitrate; and the like. From a view point of liquid permeability, among them, particularly preferable is an aluminum compound and, among it, aluminum sulfate is preferable, and a powder (or an aqueous solution thereof) of a hydrous crystal such as aluminum sulfate 14 to 18-hydrate salt can be most suitably used.

When a polyvalent metal salt of an organic acid is used, examples include fatty acids such as anisic acid, benzoic acid, p-hydroxybenzoic acid, formic acid, valeric acid, citric acid, glycolic acid, glyceric acid, glutaric acid, chloroacetic acid, chloropropionic acid, cinnamic acid, succinic acid, acetic acid, tartaric acid, lactic acid, pyruvic acid, fumaric acid, propionic acid, 3-hydroxypropionic acid, malonic acid, maleic acid, butyric acid, isobutyric acid, imidinoacetic acid, malic acid, isothionic acid, methylmaleic acid, adipic acid, itaconic acid, crotonic acid, oxalic acid, salicylic acid, gluconic acid, gallic acid, sorbic acid and stearic acid, bases corresponding to the acids and the like. Among them, a tartaric acid salt and a lactic acid salt are preferable, and a lactic acid salt such as aluminum lactate and calcium lactate is most preferable.

As a method of mixing a polyvalent metal cation, an aqueous solution containing a polyvalent metal cation, particularly, an aqueous solution having a polyvalent metal cation concentration of 1 to 60% by weight, further 10 to 50% by weight is mixed into a water absorbent resin, simultaneously with, separately from the organic surface crosslinking agent, further, after mixing, if necessary, in the case of simultaneous mixing, the mixture may be heated at a surface crosslinking temperature described in (2-8), or in the case of mixing separately from a surface crosslinking agent, the mixture may be heated at around 40 to 150° C., further 60 to 100° C. It is preferable that a use amount of water is 0.1 to 5 parts by weight, further 0.5 to 3 parts by weight relative to 100 parts by weight of a water absorbent resin. Still more preferably, a polyhydric alcohol or α-hydroxycarboxylic acid is used in combination at mixing.

In addition, a polyhydric alcohol or α-hydroxycarboxylic acid is appropriately selected from the aforementioned various compounds. It is preferable that a polyhydric alcohol or α-hydroxycarboxylic acid is used at a smaller amount than that of water, and at 0 to 4 parts by weight, 0.01 to 3 parts by weight, further 0.1 to 0.5 part by weight relative to 100 parts by weight of a water absorbent resin.

A use amount of the polyvalent metal compound, as a polyvalent metal cation, is preferably 0.001 to 3 parts by weight, more preferably 0.01 to 2 parts by weight, still more preferably 0.02 to 1 part by weight, particularly preferably 0.03 to 0.9 part by weight, most preferably 0.05 to 0.8 part by weight relative to 100 parts by weight of a water absorbent resin particle. When the polyvalent metal cation is less than 0.001 part by weight relative to 100 parts by weight of a water absorbent resin, improvement in FSC is not sufficient and, on the other hand, when the cation is more than 3 parts by weight, there is a possibility that AAP is greatly reduced by mixing.

(Polyvalent Cationic Polymer)

A weight average molecular weight of a polyvalent cationic polymer usable in the present invention is preferably 1000 or more, more preferably 2000 or more, still more preferably 5000 or more, particularly preferably 10000 or more. And, a number average molecular weight is preferably 2000 or more, still more preferably 5000 or more. When the weight average molecular weight is less than 1000, there is a possibility that the expected effect is not obtained. In addition, a weight average molecular weight is measured by an equilibrium sedimentation method, and a number average molecular weight is measured by a viscosity method. In addition, the molecular weight can be also measured by gel permeation chromatography, a static light scattering method or the like. In addition, from a view point of the cost, an upper limit is sufficient that a weight average molecule weight is around 5000000, further around 1000000.

And, the polyvalent cationic polymer of the present invention is such that a cation density is preferably 2 [mmol/g] or more, more preferably 4 [mmol/g] or more, still more preferably 6 [mmol/g] or more. When the cation density is less than 2 [mmol/g], there is a possibility that shape retention after swelling of a water absorbent resin aggregate in a water absorbent resin obtained by mixing a water absorbent resin and a polyvalent cationic polymer becomes not sufficient. An upper limit is appropriately determined by a repetition unit, and is 30 [mmol/g] or less, further 25 [mmol/g] or less.

Examples of the polyvalent cationic polymer include cationic polymer electrolytes such as polyethyleneimine, modified polyamideamine modified with grafting of ethyleneimine, protonated polyamideamine, a condensate of polyamideamine and epichlorohydrin, a condensate of amines and epichlorohydrin, poly(vinylbenzyldialkylammonium), poly(diallylalkylammonium), poly(2-hydroxy-3-methacryloyloxypropyldialkylamine), polyether amine, polyvinylamine, modified polyvinylamine, a partial hydrolysate of poly(N-vinylformamide), a partial hydrolysate of poly(N-vinylalkylamide), a partial hydrolysate of (N-vinylformamide)-(N-vinylalkylamide) copolymer, polyalkylamine, polyvinylimidazole, polyvinylpyridine, polyvinylimidazoline, polyvinyltetrahydropyridine, polydialkylaminoalkyl vinyl ether, polydialkylaminoalkyl(meth)acrylate, polyallylamine, polyamidine, a cationated product of starch or cellulose and a salt thereof or a reaction product with an electrophilic reagent. Polyamidine referred herein is a polymer having an amidine ring in a molecule, and polyamidine obtained by acid treatment after copolymerization of N-vinylformamide and acrylonitrile is more preferable. Specific examples of the polyamidine include, but are not limited to, cationic polymers having an amidine structure described in Japanese Patent No. 2624089, or the like.

From a view point of the effect of the present invention, among them, a polyamine polymer containing at least one kind selected from polyamidine or a salt thereof, polyvinylamine or a salt thereof, a copolymer of polyvinylamine-poly (N-vinylformamide) or a salt thereof, a partial hydrolysate of poly (N-vinylformamide) or a salt thereof, further a polyamine polymer containing polyvinylamine or a salt thereof, or a partial hydrolysate of poly(N-vinylformamide) or a salt thereof is suitable. These polyvalent cationic polymers may contain 0 to 30 mole %, further around 0 to 10 mole % of other repetition unit. A method for producing these polyvalent cationic polymers is not particularly limited, but particularly in a method of hydrolyzing poly(N-vinylformamide), since a polyvalent cationic polymer having an amine group and formic acid (salt) are produced, and use of a mixture of this partial hydrolysate or a salt thereof and formic acid, upon mixing with a water absorbent resin, is preferable from a view point of simplification of a process, because addition of a polyvalent cationic polymer and addition of formic acid can be performed at the same time. In addition, upon production of a partial hydrolysate of poly (N-vinylformamide), purification is not performed so that a predetermined amount of formic acid remains, or such a purification method that formic acid is not removed should be adopted.

A hydrolysis ratio of a partial hydrolysate of (N-vinylformamide) or a salt thereof is preferably 10 to 100 mole %, still more preferably 20 to 95 mole %, particularly preferably 30 to 90 mole %. In addition, a hydrolysis ratio indicates a ratio (%) of an amine group generated by hydrolysis (mole number) relative to a formamide group before hydrolysis (mole number). Herein, a 100 mole % hydrolysate corresponds to polyvinylamine or a salt thereof.

As a method of mixing a polyvalent cationic polymer, a polyvalent cationic polymer may be directly mixed into a water absorbent resin, or a polyvalent cationic polymer may be mixed by formulating the polymer into an aqueous solution, and it is preferable that the polymer is mixed as an aqueous solution, particularly an aqueous solution having a concentration of a polyvalent cationic polymer of 1 to 60% by weight, further 10 to 50% by weight, and further, after mixing, if necessary, the mixture may be heated at around 40 to 150° C., further 60 to 100° C. For a mixing machine or heating treatment, the same apparatus as that of surface crosslinking is appropriately selected.

A ratio of a water absorbent resin and a polyvalent cationic polymer is appropriately determined, and is less than 0.3 part by weight, 0.25 part by weight or less, 0.2 part by weight or less, particularly preferably 0.1 part by weight or less, relative to 100 parts by weight of a water absorbent resin, and a lower limit is in a range of 0.001 part by weight or more, further 0.01 part by weight or more. When a polyvalent cationic polymer is less than 0.001 part by weight relative to 100 parts by weight of a water absorbent resin, improvement in FSC is not sufficient, or when the polymer is more than 0.5 part by weight, there is a possibility that AAP is reduced by mixing.

(Water-Insoluble Fine Particle)

A water-insoluble fine particle is not particularly limited, as far as it suppresses adhesion between particles of an absorbing agent when an absorbing agent is contacted with an aqueous liquid, and it makes flow of an aqueous liquid better. Among it, a water-insoluble inorganic fine powder is preferable, and examples include inorganic fine particles such as clay, kaolin, bentonite, silicon dioxide, titanium oxide and aluminum oxide, and organic fine particles such as calcium lactate and a metal soap (polyvalent metal salt of long chain fatty acid), and since a silicon-based fine particle improves an absorption capacity without load (FSC), it is preferable.

And, as a water-insoluble fine particle, preferably, a fine particle having a volume average particle diameter of 10 μm or less, 5 μm or less, 1 μm or less, particularly 0.5 μm or less is used.

A method of mixing a water absorbent resin and a water-insoluble fine particle may be dry blending, a water-insoluble fine particle may be mixed as a slurry obtained by formulating it into a water dispersion, and preferably, they are dry-blended, and a mixing machine thereupon is appropriately selected.

A ratio of a water absorbent resin and a water-insoluble fine particle may be to such an extent that an absorption capacity under load (AAP) and VDAUP are not extremely reduced by addition of a water-insoluble fine particle, particularly reduction in AAP is 3.0 [g/g] or less, an amount thereof is appropriately determined, and is in a range of 0.4 part by weight or less, 0.3 part by weight or less, 0.2 part by weight or less, particularly preferably 0.1 part by weight or less, and a lower limit is 0.001 part by weight or more, further 0.01 part by weight or more, relative to 100 part by weight of a water absorbent resin.

When a water-insoluble fine particle is less than 0.001 part by weight relative to 100 parts by weight of a water absorbent resin, improvement in FSC is not sufficient, and when a water-insoluble fine particle is more than 0.4 part by weight, there is a possibility that AAP and VDAUP are reduced by mixing, to such an extent that they do not satisfy the present application.

In addition, in the production process, in place of a polyvalent metal cation, a polyvalent cationic polymer, or a water-insoluble fine particle, long chain alkylamine (particularly, carbon number 10 to 20) may be used.

A polyhydric alcohol compound which is used in combination with an ion binding surface crosslinking agent is preferably a non-polymerized water-soluble polyhydric alcohol compound, a polyhydric alcohol compound exemplified in the surface crosslinking, particularly, propanediol and, in the present invention, preferably, these polyhydric alcohol compounds and α-hydroxycarboxylic acid are such that a polyhydric alcohol compound is contained at 0.01 to 3 parts by weight, further 0.05 to 2 parts by weight relative to 100 parts by weight of a water absorbent resin.

(α-Hydroxycarboxylic Acid)

α-Hydroxycarboxylic acid which is used preferably in the present invention refers to carboxylic acid in which a hydroxyl group is bound to carbon at an α position in a molecule, or a salt thereof, is preferably aliphatic hydroxycarboxylic acid (salt) such as a non-polymerized α-hydroxycarboxylic acid, more preferably aliphatic α-hydroxycarboxylic acid (salt) not having a cyclic structure or an unsaturated group. In the case of aromatic α-hydroxycarboxylic acid or α-hydroxycarboxylic acid having a cyclic structure or an unsaturated group, since it itself is colored by an oxidizing reaction, it is not preferable. And, a molecular weight thereof is preferably in a range of 40 to 2000, still more preferably 60 to 1000, particularly preferably 100 to 500. And, it is preferable that α-hydroxycarboxylic acid used in the present invention is water-soluble such that solubility in 100 g of deionized water is 1 g or more, more preferably 5 g or more, still more preferably 10 g or more, particularly preferably 20 g or more, at 20±5° C. Examples of such the α-hydroxycarboxylic acid include lactic acid (salt), citric acid (salt), malic acid (salt), isocitric acid (salt), glyceric acid (salt), tartaric acid (salt), a D body, a L body, a meso body or the like of them. As α-hydroxy polyvalent carboxylic acid, most preferably, from a view point of water absorbing property and improvement in coloration, malic acid (salt), citric acid (salt), isocitric acid (salt), and tartaric acid (salt) are used. Herein, α-hydroxycarboxylic acid or a salt or a mixture thereof are collectively called α-hydroxycarboxylic acid compound, in some cases.

A polyhydric alcohol compound and α-hydroxycarboxylic acid which are used in combination with an ion binding surface crosslinking agent are preferably such that a polyhydric alcohol is used at 0.01 to 3 parts by weight, further 0.05 to 2 parts by weight relative to 100 parts by weight of a water absorbent resin.

(2-10) A Step of Adding a Chelating Agent

In a polyacrylic acid (salt)-based water absorbent resin powder of the present invention, it is preferable that a coloration preventing agent or a resistance to degradation by urin (further, weather resistance of (5-14)) improving agent selected from a chelating agent (particularly, organic phosphorus-based chelating agent, aminocarboxylic acid-based chelating agent), α-hydroxycarboxylic acid (particularly, lactic acid (salt)), and an inorganic or organic reducing agent (particularly, sulfur-based inorganic reducing agent) is further contained, and it is preferable that the production process of the present invention includes a step of mixing a chelating agent or the like in any step. By inclusion of a chelating agent or the like, a water absorbent resin powder excellent in resistance to degradation by urin and coloration prevention is obtained.

A method of obtaining a polyacrylic acid (salt)-based water absorbent resin containing the chelating agent is not particularly limited, a chelating agent is appropriately added at the aforementioned each step, and a variety of methods such as a method of adding a chelating agent to an aqueous monomer solution in advance at a polymerization step, a method of adding a chelating agent at a gel finely dividing step, a method of adding a chelating agent before and after a drying step, a method of making a chelating agent contained in an aqueous surface crosslinking agent in advance at a surface crosslinking step or a method of adding a chelating agent separately from an aqueous surface crosslinking agent solution, a method of adding a chelating agent to a water absorbent resin after surface crosslinking and the like can be appropriately selected. And, an embodiment upon addition of a chelating agent is not particularly limited, for example, a liquid or solid (powder)-like chelating agent may be added as it is, it may be added after it is dissolved in a solvent to be a solution in advance, and from a view point of handleability, variation in an addition amount and the like, it is preferable to add a chelating agent as a solution.

The chelating agent is not particularly limited, but examples include a polymerized or non-polymerized chelating agent. Among them, a non-polymerized chelating agent is preferable, and it is more preferable to use a non-polymerized chelating agent having a molecular weight or a weight average molecular weight of preferably 40 to 2000, more preferably 60 to 1000, further preferably 100 to 500 for a monomer or a polymer thereof. Examples of a more specific chelating agent include aminocarboxylic acid (salt) or phosphoric acid (salt), and the number of carboxyl groups thereof is preferably 2 to 20, more preferably 4 to 10, particularly preferably 5 to 8.

A use amount of a chelating agent in the present invention is preferably 0.00001 to 10 parts by weight, more preferably 0.0001 to 1 part by weight, further preferably 0.002 to 0.1 part by weight relative to 100 parts by weight of a water absorbent resin. When the use amount exceeds 10 parts by weight, the effect corresponding to the use amount is not obtained, not only this is uneconomical, but also a problem such as lowering in water absorbing property arises in some cases. On the other hand, when the use amount is less than 0.00001 part by weight, the sufficient addition effect is not obtained.

(Surfactant)

Further, a polyacrylic acid (salt)-based water absorbent resin powder may contain a surfactant, and it is preferable that the production process of the present invention includes a step of mixing a surfactant at any step. For example, as described above, examples include an embodiment which is used for controlling a ratio of gas bubbles of a base polymer, and an embodiment which is used in combination with a surface crosslinking agent in a surface crosslinking step. And, a water absorbent resin powder may be covered with a surfactant.

By covering a surface of the water absorbent resin powder of the present invention with a surfactant, a water absorbent resin powder having a high free swelling rate and high liquid permeability is obtained. As the surfactant, compounds described in (2-1) are applied. The surfactant may be used at the polymerization, but preferably, in order to cover a surface, further, the surfactant is mixed simultaneously with, or separately from, preferably simultaneously with the surface crosslinking agent, particularly an aqueous surface crosslinking agent solution, and physical properties of a water absorbent resin after surface crosslinking is also improved.

A kind and a use amount of the surfactant used are appropriately determined, preferably, the surfactant is used in the aforementioned range of a surface tension, and is used in a range of 0 to 0.5 part by weight, further 0.00001 to 0.1 part by weight, 0.001 to 0.05 part by weight relative to a water absorbent resin. Among these surfactants, from a view point of the effect, it is preferable to use an anionic surfactant, a nonionic surfactant, or a silicone-based surfactant, and it is further preferable to use a nonionic surfactant or a silicone-based surfactant.

In one embodiment of the present invention, since a water absorbent resin powder is a foam body, there is a tendency that impact resistance is low, and physical properties is reduced in some cases, by process damage due to, particularly, at surface crosslinking or transport (e.g. air transport etc.) to a next step after surface crosslinking. This tendency is more remarkable as a production amount is greater and, for example, as a production amount per 1 line is 0.5 [t/hr] or more and, hereinafter, in an order of 1 [t/hr] or more, 5 [t/hr] or more, 10 [t/hr] or more, the tendency appears more remarkable.

That is, in order to obtain a water absorbent resin powder having a great free swelling rate and high liquid permeability, it is preferable that, particularly, at the aforementioned continuous production in a huge scale, surface crosslinking is performed after drying, and surface of a water absorbent resin powder is covered with a surfactant simultaneously with, or separately from, preferably simultaneously with surface crosslinking.

A kind and a use amount of the surfactant are appropriately determined, and a use amount is preferably 2% by weight or less, hereinafter, 0.03% by weight or less, 0.015% by weight or less, 0.01% by weigh or less, and 0.008% by weight or less is preferable in this order. A lower limit is preferably 0.1 ppm or more, more preferably 1 ppm or more. Further, the surfactant is used at such use amount and kind that the following surface tension (preferably, 60 [mN/m] or more, further preferably within a range shown in "(4-7) surface tension") is maintained.

From a view point of a free swelling rate and impact resistance, it is preferable to add water simultaneously with the surfactant. The water to be added is added to be preferably 0.1 to 10% by weight, more preferably 1 to 8% by weight, further preferably 2 to 7% by weight relative to a water absorbent resin powder.

(Chelating Agent, α-Hydroxycarboxylic Acid (Salt), Inorganic or Organic Reducing Agent)

In the present invention, for the purpose of preventing coloration or preventing deterioration (in addition, decrease in a residual monomer etc.), it is preferable that a coloration preventing agent or a resistance to degradation by urin (further, weather resistance of (5-14)) improving agent selected from a chelating agent (particularly, organic phosphorus-based chelating agent, aminocarboxylic acid-based chelating agent), α-hydroxycarboxylic acid (particularly, lactic acid (salt)), and an inorganic or organic reducing agent (particularly, sulfur-based inorganic reducing agent) is further contained. There is a tendency that a water absorbent resin powder having a great surface area is generally easily colored or deteriorated.

A use amount of the coloration preventing agent or resistance to degradation by urin (or weather resistance defined in (5-14)) improving agent is preferably 0 to 3 parts by weight, more preferably 0.001 to 1 part by weight, particularly preferably 0.05 to 0.5 part by weight relative to 100 parts by weight of a water absorbent resin powder. Since the coloration preventing agent or resistance to degradation by urin (weather resistance) improving agent is added to a monomer, a hydrogel, a dried polymer, a water absorbent resin powder or the like, an addition step is appropriately determined in a polymerization step or thereafter. In addition, since the inorganic or organic reducing agent is consumed at a polymerization step, the reducing agent is preferably added after a polymerization step, further after a drying step, particularly after a surface crosslinking step.

Examples of the chelating agent include a chelating agent disclosed in U.S. Pat. Nos. 6,599,989 and 6,469,080, EP No. 2163302 and the like, particularly a non-polymerized chelating agent, further an organic phosphorus-based chelating agent, and an aminocarboxylic acid-based chelating agent. Examples of the α-hydroxycarboxylic acid include malic acid (salt), succinic acid (salt), and lactic acid (salt) disclosed in U.S. Patent Application Publication No. 2009/0312183 and the like. Examples of the inorganic or organic reducing agent include a sulfur-based reducing agent, particularly a sulfite salt or a hydrogen sulfite salt and the like disclosed in U.S. Patent Application Publication No. 2010/0062252 and the like.

(2-10) Air Stream Exposing Step

The present step is a step of exposing a water absorbent resin powder to an air stream, after mixing of a surface crosslinking agent, at heat treatment of a water absorbent resin powder and/or after heat treatment.

The "exposing to an air stream" means that circulation and substitution of a gas filled in an apparatus by a machine for heat-treating a water absorbent resin powder and/or at other step. By this operation, it is possible to remove a volatile component which causes a discomfort smell generated by heat treatment at a high temperature.

A gas used in the air stream is not particularly limited, but examples include a water steam, an air, nitrogen, a mixed gas of one or more of them or the like. As an amount of supply thereof, in a heat treating machine in which a water absorbent resin powder is present and/or at other step, 0.001 to 100 [m$^3$/hr] per 1 m$^3$ of a unit volume is preferable, and 0.01 to 10 [m$^3$/hr] is more preferable. And, as a linear velocity of an air stream, 0.01 to 100 [m/s] is preferable, and 0.1 to 50 [m/s] is more preferable. Further, as an exposure time, 1 to 120 minutes is preferable, and 10 to 90 minutes is more preferable.

The air stream may be generated by ventilation or suction. And, thereupon, a pressure may be a reduced pressure or an increased pressure within preferably 10%, more preferably within 1%. Since a residual surface crosslinking agent, particularly residual alkylene carbonate and ethylene glycol which is a byproduct thereof can be reduced, surface crosslinking or cooling thereof is performed under reduced pressure of preferably 0.999 atm or less, further 0.999 to 0.9 atm, particularly subtle reduced pressure of 0.998 to 0.95 atm.

When exposure to the air stream is performed simultaneously with heat treatment of a water absorbent resin powder after mixing with a surface crosslinking agent, it is preferable to use a heat treating machine or a heating furnace equipped with a gas supply device and/or a gas exhaust device. It is preferable that a gas (water steam, air, nitrogen, or a mixed gas of one or more of them) occupying a space of a heat treating machine or a heating furnace is substituted as long as a set temperature (preferably 120 to 250° C.) at heat treatment is not remarkably reduced, and this does not adversely influence energetically.

When exposure to the air stream is performed at a step after heat treatment, it is preferable to pass an air through a machine for cooling a water absorbent resin powder after surface crosslinking, a transport line or piping during transport. In addition, in this case, the gas may be appropriately heated or cooled, but usually, a gas is heated to such a temperature that a volatile component being cause of an uncomfortable smell is easily evaporated from a water absorbent resin powder. Specifically, a temperature is preferably 50° C. or higher, more preferably 60° C. or higher, further preferably 70° C. or higher. When the temperature of the air stream is lower than 50° C., a volatile component is not removed in some cases, being not preferable. And, a temperature is set at a temperature lower than a heat treatment temperature at a surface crosslinking step.

Further, the present air stream exposing step also has, in addition to the effect of reducing an uncomfortable smell, the effect of removing ethylene glycol which is generated (produced as a byproduct) by exposure to a high temperature after addition of a surface crosslinking agent, when an alkylene carbonate compound, particularly ethylene carbonate is used as a surface crosslinking agent. Since there is a possibility that ethylene glycol adversely influences on a human body, it is preferable to reduce or remove ethylene glycol at the present step.

(2-11) Pneumatic Conveyance Step

The present step is a step of transporting a water absorbent resin powder before and after a surface crosslinking step, various transport methods can be adopted, and preferably, pneumatic conveyance is adopted. In the pneumatic conveyance step, from a view point of stably retaining physical properties of the water absorbent resin powder of the present invention, and preventing choking of piping, a dried gas (air) is preferably used in a primary air, and a secondary air which is used if necessary (air added in the middle of transport piping). By pneumatic conveyance, a non-polymerized organic compound remaining on a surface of a water absorbent resin powder, particularly a residual surface crosslinking agent, further ethylene glycol and the like may be removed.

A dew point of the dried gas (air) is preferably −5° C. or lower, more preferably −10° C. or lower, further preferably −12° C. or lower, particularly preferably −15° C. or lower. And, from a view point of cost performance, a lower limit is preferably −100° C. or higher, more preferably −70° C. or higher, further sufficiently around −50° C. A temperature of the dried gas (air) is preferably 10 to 40° C., more preferably 15 to 35° C. By adjusting a dew point and a temperature of a dried gas (air) in the aforementioned range, since upon wrapping as a product, lowering in SFC can be suppressed, this is preferable.

In place of use of the dried gas (air), a heated gas (air) may be used. A heating method is not particularly limited, but a gas (air) may be directly heated using a heat source, or a passing gas (air) may be indirectly heated by heating a transport part or piping. As a temperature of a heated gas (air), a lower limit is preferably 20° C. or higher, more preferably 30° C. or higher. An upper limit is preferably lower than 70° C., more preferably lower than 50° C.

And, as a method of controlling the dew point, a gas, preferably the air may be appropriately dried. Specifically, examples include a method of using a membrane dryer, a method of using a cooling adsorption-type dryer, a method of using a diaphragm dryer, or a method of using them in combination. When the cooling adsorption-type dryer is used, it may be a heating regeneration system, a non-heating regeneration system, or a non-generation system.

(2-12) Other Step

In addition to the aforementioned steps, if necessary, a second classification step (which is implemented after a surface crosslinking step), a step of recovering an evaporated monomer, a granulating step and the like may be provided.

Further, depending on the purpose, an oxidizing agent, an antioxidant, water, a polyvalent metal compound, a water-insoluble inorganic or organic powder such as silica and a metal soap, a deodorizing agent, an antibacterial agent, a pulp, a thermoplastic fiber or the like in addition to the aforementioned ones may be added into a water absorbent resin powder at more than 0% by weight and 3% by weight or less, preferably more than 0% by weight and 1% by weight or less.

[3] SOLID NON-POLYMERIZED ORGANIC COMPOUND

As described above, the processes (1) and (2) of the present inventions were generally stated in [2], further, hereinafter, more preferable characteristic parts of the first, second and third production processes (heating of non-polymerized organic compound, mass flowmeter, heat-melted non-polymerized organic compound) will be described in [3]. The following first, second and third production processes are preferably used in combination with the process (1) and/or (2) of the present invention, but may be carried out alone.

From a view point of decrease in an out of spec product after surface crosslinking, particularly, when a non-polymerized organic compound which is solid at a normal temperature, among it, an alkylene carbonate compound is used as a surface crosslinking agent, operation of dissolving it greatly reduces productivity, influence on flowability due to an air temperature is great, and it is necessary to reduce ethylene glycol which is produced as a byproduct. Particularly in stabilization of physical properties, stabilization of a free swelling rate, and realization of both of a free swelling rate and liquid permeability were necessary, while workability is maintained.

The present inventors paid attention to handleability of a modifier (non-polymerized organic compound) to be added to a water absorbent resin, and found out that, by heating, particularly heat-melting a non-polymerized organic compound, particularly a surface crosslinking agent, further alkylene carbonate, a water absorbent resin which can considerably improve workability, has no influence on flowability due to variation of an air temperature, is of high physical properties, and contains small impurities (particularly, residual ethylene glycol) is stably obtained in high productivity. Further, it was found out that, by such procedure, a water absorbent resin which is high liquid permeability and high free swelling rate can be stably provided.

That is, it was found out that, when a non-polymerized organic compound which is solid at a normal temperature is used as a raw material of a water absorbent resin, not only workability is reduced due to handling thereof, but also operation of dissolving it leads to lowering in productivity and variation in physical properties. Many techniques of stabilizing physical properties of a water absorbent resin and improving physical properties with surface crosslinking have been proposed as in Patent Literatures 1 to 44 etc., but those Patent Literatures paid no attention to handleability of a solid non-polymerized organic compound.

In order to overcome the aforementioned problems, first, second and third production processes will be provided below. The first production process, the second production process, and the third production process may be carried out, respectively, separately, and it is preferable to carryout both of the first production process or the third production process, and the second production process, or carry out all of first to third production processes.

(First Production Process)

A process for producing a water absorbent resin powder of the present invention (first production process) is a process for producing a polyacrylic acid (salt)-based water absorbent resin powder, comprising storing a non-polymerized organic compound being a raw material (modified raw material) of a water absorbent resin powder in the heated state (preferably, heat-melted state), thereafter, mixing the compound with other compound at a predetermined ratio and, further mixing the mixture into a water absorbent resin powder.

(Second Production Process)

A process for producing a water absorbent resin powder of the present invention (second production process) is a process for producing a polyacrylic acid (salt)-based water absorbent resin powder, comprising mixing a non-polymerized organic compound and water into a polyacrylic acid (salt)-based water absorbent resin powder, wherein a mixing ratio is controlled with a mass flowmeter.

(Third Production Process)

A process for producing a water absorbent resin powder of the present invention (third production process) is a process for producing a polyacrylic acid (salt)-based water absorbent resin powder, comprising mixing a non-polymerized organic compound in the heat-melted state, and other compound at a predetermined ratio and, further, mixing the mixture into a polyacrylic acid (salt)-based water absorbent resin powder. In the present invention, storage may be entirely omitted, and heat-melting of a non-polymerized organic compound may be continuously performed with a continuous heating kneader or the like. When heated in a batch manner, this corresponds to storage in the first production process, and when continuously heat-melted with a continuous heating kneader or the like, this also corresponds to transport of the present invention.

(Preferable Production Condition)

In the first production process (storage of non-polymerized organic compound in the heated state) or the second production process (use of amass flowmeter described later) or the third production process (use of a non-polymerized organic compound in the heat-melted state) of the present invention, preferably, a non-polymerized organic compound is water-soluble, and the non-polymerized organic compound in the heated state and water are mixed at a predetermined ratio to obtain an aqueous solution in the present invention. In the present invention, a non-polymerized organic compound is preferably a surface crosslinking agent and, in such case, preferably, condition described in a step of surface crosslinking described in (2-8) and (2-9) is applied.

The following process for producing a water absorbent resin is more preferable: the non-polymerized organic compound contains at least one kind selected from an alkylene carbonate compound or a polyhydric alcohol compound, preferably, a surface crosslinking agent containing at least each one selected from an alkylene carbonate compound and a polyhydric alcohol compound, respectively, and a polyacrylic acid (salt)-based water absorbent resin are mixed and, thereafter, heat-reacted, more preferably, an ion binding surface crosslinking agent is mixed simultaneously or separately.

That is, in the first or second production process of the present invention, as described in (2-8), preferably, a surface crosslinking agent is one kind or a plurality of dehydration reactive surface crosslinking agents. Preferably, a dehydration reactive surface crosslinking agent is an alkylene carbonate compound, further preferably, an alkylene carbonate compound is an ethylene carbonate compound. Preferably, a surface crosslinking agent is an alkylene carbonate compound and a polyhydric alcohol compound used in combination.

It is preferable that other compound to be mixed with a non-polymerized organic compound or water has been warmed, further, it is preferable that, upon mixing of the mixture obtained at a predetermined ratio into a water absorbent resin, more preferably, the mixture is warmed for a term from preparation of a mixture at a predetermined ratio to mixing into a water absorbent resin. Amore preferable temperature is 30° C. to 100° C., further preferably 35° C. to 70° C., most preferably 40° C. to 65° C.

A non-polymerized organic compound contains an alkylene carbonate compound and a polyvalent alcohol compound, an alkylene carbonate compound and a polyhydric alcohol compound are mixed into a water absorbent resin and, thereafter, they are heat-reacted, upon further mixing of an alkylene carbonate compound and a polyhydric alcohol compound into a water absorbent resin, an ion binding surface crosslinking agent can be mixed simultaneously, or an ion binding surface crosslinking agent can be mixed separately from mixing of an alkylene carbonate compound and a polyhydric alcohol compound into a water absorbent resin.

In the first to third production processes of the present invention, preferably, as a surface crosslinking agent, a compound other than a non-polymerized organic compound (particularly, other than a dehydration reactive surface crosslinking agent) is used in combination, particularly, an ion binding surface crosslinking agent selected from a polyamine polymer or a polyvalent metal compound described in (2-9) is used in combination.

Separately, an ion binding surface crosslinking agent selected from a polyamine polymer and a polyvalent metal compound described in (2-9) may be mixed and, further, a polyvalent metal compound may be mixed.

Further, as a compound other than a surface crosslinking agent, a surfactant and/or a hydroxycarboxylic acid compound which have stored with heated, or without heated may be used in combination and/or may be separately mixed.

In the first to third production processes, a water absorbent resin powder into which a non-polymerized organic compound is mixed, preferably, as described in (2-2), is a polyacrylic acid-based water absorbent resin powder having a ratio of internal gas bubbles of 0.5% or more. A water absorbent resin powder has been also heated to 35° C. or higher in advance. Preferably, as described in (2-2), β-hydroxypropionic acid (salt) in a water absorbent resin is 1000 ppm or less. The process of the present invention improves workability and stability, and thus, is suitably applied to continuous production, particularly continuous production of 1 ton or more per 1 hour.

(Effect of Heating Storage, Particularly Melting Storage)

By storing a non-polymerized organic compound in the heated state, for example, melting-storing butanediol, ethylene carbonate or the like, it is easy to continuously mix water and, if necessary, other compound, as compared with storage in a non-heated state, particularly storage in a state of solid. Since preparation of an aqueous solution is easy, a preservation time as an aqueous non-polymerized organic compound solution (e.g. aqueous ethylene carbonate solution) can be shortened and, as a result, degradation and coloration of a non-polymerized organic compound due to preservation of an aqueous solution can be suppressed.

For example, when ethylene carbonate is used, since decomposition-originated ethylene glycol as a byproduct can be reduced, surface physical properties of a water absorbent resin is improved or stabilized, or at least residual ethylene glycol in the resulting water absorbent resin can be reduced. Preferably, melting storage of ethylene carbonate, and mixing with a polyhydric alcohol compound (preferably, C3-C6 polyhydric alcohol compound) at a predetermined ratio are precise and easy, and physical properties of a water absorbent resin is also improved and stabilized.

By using melting storage of a non-polymerized organic compound, for example, butanediol and ethylene carbonate, a tank, that is, a plant can be made to be smaller compared to an aqueous solution storage. Further, by melting, storing and, further, transporting a solid non-polymerized organic compound, a procedure for dissolving a solid non-polymerized organic compound in a solvent (particularly, water) can be omitted, workability is also improved by using a pipeline, a pump and a mass flowmeter, and continuous production at a huge scale, particularly, continuous production at 1 ton or more per 1 hour can be carried out simply and precisely. Since a melted non-polymerized organic compound is continuously mixed at a predetermined ratio precisely and easily, particularly a mass flowmeter, further, a Coriolis-type mass flowmeter can be applied and, further, precise mixing is possible, when used in a surface crosslinking agent, surface physical properties is improved or stabilized.

(Non-Polymerized Organic Compound, and Other Compound Which are a Raw Material)

Herein, a non-polymerized organic compound is a raw material (modified raw material) of the water absorbent resin powder, particularly, a solid non-polymerized organic compound, and if the raw material is a raw material to be mixed with the water absorbent resin powder, compounds exemplified in [2] can be applied, particularly, a surface crosslinking agent described later in (3-1) can be used.

Other compound to be mixed with the non-polymerized organic compound is a compound having a structure different from that of the non-polymerized organic compound, at least one selected from compounds other than the non-polymerized organic compound which are generally used as a surface crosslinking agent or a modifier of the water absorbent resin, and a solvent is preferable, and at least one selected from water, a polyhydric alcohol and a polyvalent metal salt is more preferable.

Specifically, examples include surface crosslinking agents described in (2-8), (2-9) and (2-10), a solvent including water, and various modifiers (surfactant, chelating agent α-hydroxycarboxylic acid, additionally, deodorizing agent, coloration preventing agent, lowering agent for residual monomer).

Further, a solvent such as a monohydric alcohol, various polymer compounds, and other organic or inorganic compounds may be contained. A mixture containing the non-polymerized organic compound and other compound is preferably a composition forming a solution, and a form of an aqueous solution or an alcohol solution is more preferable.

In the first production process, a non-polymerized organic compound, preferably, a solid non-polymerized organic compound is used in the heated or cooled, particularly heated, further heat-melted state (third production process). As a non-polymerized organic compound used, a surface crosslinking agent or a surface covering agent of a water absorbent resin powder, further, a surface crosslinking agent is preferable and, for example, compounds of the following (3-1) and (3-2) are exemplified.

(Molecular Weight of Non-Polymerized Organic Compound and Definition of Water-Soluble Non-Polymerized Organic Compound)

The "non-polymerized organic compound" is not particularly limited, as far as it is a non-polymerized organic compound which is mixed into a water absorbent resin in a step of producing a water absorbent resin, usually, it is an organic compound other than a monomer such as acrylic acid being a raw material of polymerization of a water absorbent resin and a polymerizable crosslinking agent, that is, a non-radical polymerizable organic compound. The non-polymerized organic compound refers to an organic compound having a molecular weight of usually 7000 or less, preferably 1000 or less. The water-soluble non-polymerized compound is the non-polymerized organic compound which is, particularly, water-soluble (solubility in 100 g of water at a normal temperature is 1 [g/water 100 g] or more, further 5 g, more preferably 10 g or more). The compound may have an unsaturated bond as in long chain unsaturated fatty acid, as long as it is substantially non-radical polymerizable and, preferably, a non-polymerized organic compound having no unsaturated bond (olefin structure) is used.

And, a shape of a solid is not particularly limited, but is block-like, powder-like, pellet-like, sheet-like, wax-like, fibrous, film-like, or the like, and a powder-like solid having a particle diameter determined by a standard sieve of 100 mm or less, preferably 10 mm or less, more preferably 2 mm or less is preferably used. It is preferable that these various shaped solids are heated to liquefy and, further, by adding to, and mixing into a water absorbent resin powder at a predetermined ratio in a solution state, particularly, in an aqueous solution state, physical properties of a water absorbent resin powder is stabilized and, further, even when it remains in a water absorbent resin surface powder, since it is a solid, there is little adverse influence on flowability of a water absorbent resin powder, or the like.

(Melting Point)

The non-polymerized organic compound may be a liquid at a normal temperature, preferably, is a solid at a normal temperature, and a melting point thereof is 10 to 200° C., 10 to 100° C., preferably 15 to 100° C., more preferably 18 to 90° C., further preferably 20 to 50° C., particular preferably 30 to 40° C. A preferable carbon number is in a range of C2 to C30, further C4 to C20, C4 to C18. In Japan Industrial Standards, a "normal temperature" is defined as a temperature within a range of 20° C.±15° C. (5 to 35° C.) (JIS Z8703), and such range is defined as normal temperature.

The non-polymerized organic compound, upon heating, particularly upon heat-melting, is heated to a temperature of a melting point or higher, and a boiling point or lower and, further, heating or heat-melting is performed at a decomposition temperature thereof or lower. Therefore, an epoxy compound, an organic peroxide and the like having a relatively low decomposition temperature are not preferably used, and a non-polymerized organic compound being a non-epoxy compound or a non-organic peroxide is preferably applied.

(Purity, Particularly Water Amount of Non-Polymerized Organic Compound)

The non-polymerized organic compound may contain water and other impurities, and a purity of the non-polymerized organic compound is preferably 96% by weight, and hereinafter, at least 97% by weight, 98% by weight, 99% by weight, 99.5% by weight, 99.7% by weight, 99.9% by weight, 99.95% by weight, and 99.99% by weight are preferable in this order (herein, the impurity is preferably such that water is a main component). In the production process of the present invention, a non-polymerized organic compound having the aforementioned purity is preferably used. When water and other impurities are contained in a large amount, for example, in the case of heating or heat-melting in production of ethylene glycol from ethylene carbonate as a byproduct for example, there is a possibility that degradation or coloration occurs, and it is preferable that it is performed at the aforementioned purity. A water amount of a non-polymerized organic compound is 1.0% by weight or less, preferably 0.5% by weight or less, more preferably 0.3% by weight or less, further preferably 0.1% by weight or less, more further preferably 0.05% by weight or less, most preferably 0.01% by weight or less. By preventing degradation and coloration of a non-polymerized organic compound (particularly, surface crosslinking agent) before use, physical properties of the resulting water absorbent resin is stabilized, a residual byproduct is also reduced and, further, coloration can be also prevented. A water amount can be determined by the Karl Fischer method (JIS K0068, ISO 760, DIN 51777 etc.) and, preferably, can be determined by JIS K0068:1966.

(3-1) Non-Polymerized Organic Compound, Particularly, Solid Surface Crosslinking Agent A solid surface crosslinking agent which is preferably used in the present invention is not particularly limited, but examples include polyhydric alcohols such as a saturated dihydric alcohol, a saturated trihydric alcohol, a saturated tetrahydric alcohol and an unsaturated glycol, cyclic compounds such as a cyclic (carbonate) ester, diamine compounds, amine compounds such as aminoalcohol, saturated fatty acids and the like which are solid at a normal temperature, specifically, the following compounds are exemplified. These compounds, and a non-polymerized organic compound, particularly, a solid surface crosslinking agent are preferably heated, particularly, heat-melted, and stored or transported in the heated state. In the present invention, further preferably, a dehydration reactive surface crosslinking agent, further, a saturated dihydric alcohol, a saturated trihydric alcohol, a saturated tetrahydric alcohol, and a cyclic (carbonate) ester which are a solid at a normal temperature are used. And, such dehydration reactive surface crosslinking agent may be used as an internal crosslinking agent by using for a monomer at polymerization or a gel after polymerization, that is, it can be used as a dehydration reactive crosslinking agent.

A solid crosslinking agent which is preferably used in the present invention, particularly, a surface crosslinking agent will be specifically explained below. The following compounds can be also used in an internal crosslinking agent or in a surface covering agent (without reacting), and are suitably used as a surface crosslinking agent of (2-8).

Examples of the saturated dihydric alcohol include meso-2,3-butanediol (melting point 34.4° C.), tetramethylethylene glycol (melting point 38° C.) and a hexahydrate thereof (melting point 46 to 47° C.), hexanemethyltrimethylene glycol (melting point 126 to 128° C.), 2,2-dimethyl-1,3-butanediol (melting point 10° C.), 2,2-dimethyl-1,3-pentanediol (melting point 60 to 63° C.), 2,2,4-trimethyl-1,3-pentanediol (melting point 52° C.), 1,4-butanediol (melting point 19° C.), 2,5-hexanediol (melting point 43 to 44° C.), 1,6-hexanediol (melting point 42° C.), 1,8-octanediol (melting point 60° C.), 1,9-nonanediol (melting point 45° C.), 1,10-decanediol (melting point 72 to 74° C.), 1,11-undecanediol (melting point 62 to 62.5° C.), 1,12-dodecanediol (melting point 79 to 79.5° C.), 1,13-tridecanediol (melting point 76.4 to 76.6° C.), 1,14-tetradecanediol (melting point 83 to 85° C.), 1,12-octadecanediol (melting point 66 to 67° C.), 1,18-octadecanediol (melting point 96 to 98° C.), neopentyl glycol (melting point 130° C.), sorbitol (melting point 96° C.) and the like.

Examples of the unsaturated glycol include cis-2,5-dimethyl-3-hexene-2,5-diol (melting point 69° C.), cis-2,5-dimethyl-3-hexene-2,5-diol (melting point 77° C.), meso-2,6-octadiene-4,5-diol (melting point 23 to 24° C.), racemic-2,6-octadiene-4,5-diol (melting point 48° C.) and the like.

And, examples of polyethylene glycol which is semi-solid, waxy or waxy solid at a normal temperature include PEG600 (melting point 15 to 25° C.), PEG1000 (melting point 35 to 40° C.), PEG3000 to 4000 (melting point 53 to 56° C.), PEG5000 to 7000 (melting point 58 to 62° C.) and the like.

Examples of the saturated trihydric alcohol include glycerin (melting point 18° C.), 2-methyl-2,3,4-butanetriol (melting point 49° C.), 2,3,4-hexanetriol (melting point 47° C.), 2,4-dimethyl-2,3,4-hexanetriol (melting point 75° C.), dimethylpentaneglycerin (melting point 83° C.), 2,4-dimethyl-2,3,4-pentanetriol (melting point 99° C.), trimethylolpropane (melting point 58° C.) and the like.

Examples of the saturated tetrahydric alcohol include 1,2,4,5-hexanetetrol (melting point 88° C.), 1,2,5,6-hexanetetrol (melting point 96° C.) and the like.

Examples of the cyclic ester include ethylene carbonate (melting point 35 to 38° C.), 5,5-dimethyl-4-methylene-1,3-dioxolane-2-one (melting point 26° C.), 2,2-pentamethylene-1,3-dioxolane-4-one (melting point 32 to 35° C.), 1,3-dioxane-2-one (melting point 48° C.), 4,5-dimethyl-1,3-dioxol-2-one (melting point 78° C.) and the like.

Examples of other cyclic compounds include (S)-4-benzyl-2-oxazolidinone (melting point 86 to 88° C.), 5-methyl-5-(3-isopropoxy-4-methoxyphenyl)-2-oxazolidinone (melting point 67 to 69.5° C.), 5-methyl-5-(3-ethoxy-4-methoxyphenyl)-2-oxazolidinone (melting point 63 to 65° C.), oxazolidinone (melting point 86 to 89° C.) and the like.

Examples of the diamine compound include ethylenediamine (melting point 8.5° C.), tetramethylenediamine (melting point 27° C.), hexamethylenediamine (melting point 42° C.), heptamethylenediamine (melting point 28 to 29° C.), octamethylenediamine (melting point 52° C.), nonamethylenediamine (melting point 37.5° C.) and the like.

Examples of the aminoalcohol include diisopropanolamine (melting point 43° C.), triisopropanolamine (melting point 57.2° C.), 1-aminopentane-5-ol (melting point 36° C.) and the like.

(3-2) Solid Surface Covering Agent

A solid surface covering agent which is preferably used in the present invention is not particularly limited, but examples include a saturated or unsaturated monohydric alcohol, an ether compound, an alkanesulfonic acid compound, a ketone compound and the like which are solid at a normal temperature and, specifically, the following compounds are exemplified. The surface covering agent can be used in various modifications of flowability, hydrophobicity/hyrdophilicity and the like, by covering a water absorbent resin powder or a hydrogel thereof.

Examples of the saturated fatty acid include caprylic acid (melting point 16.7° C.), capric acid (melting point 31.6° C.), lauric acid (melting point 44.2° C.), myristic acid (melting point 53.9° C.), palmitic acid (melting point 63.1° C.), stearic acid (melting point 69.6° C.) and the like.

Examples of the saturated monohydric alcohol include lauryl alcohol (melting point 24° C.), myristyl alcohol (melting point 38° C.), cetyl alcohol (melting point 49° C.), stearyl alcohol (melting point 58.5° C.), neopentyl alcohol (melting point 52 to 53° C.), n-eicosyl alcohol (melting point 63.5° C.), n-hexacosyl alcohol (melting point 79.5° C.), and examples of the unsaturated monohydric alcohol include 2,4-pentadiyn-1-ol (melting point 26 to 28° C.) and the like.

Examples of the ether compound include dicetyl ether (melting point 55° C.), isoamyl cetyl ether (melting point 30° C.) and the like.

Examples of the alkanesulfonic acid compound include n-pentanesulfonic acid (melting point 15.9° C.), n-hexanesulfonic acid (melting point 16.1° C.), n-nonanesulfonic acid (melting point 46° C.), n-decanesulfonic acid (melting point 46.5° C.), n-undecanesulfonic acid (melting point 52° C.), n-dodecanesulfonic acid (melting point 58° C.) and the like.

Examples of the ether compound include dicetyl ether (melting point 55° C.), isoamyl cetyl ether (melting point 30° C.) and the like.

Examples of the ketone compound include di-n-hexyl ketone (melting point 31° C.), di-n-heptyl ketone (melting point 41° C.), methyl-n-nonyl ketone (melting point 15° C.), methyl-n-decyl ketone (melting point 21° C.), methyl-n-undecyl ketone (melting point 29° C.), methyl-n-dodecyl ketone (melting point 34° C.), methyl-n-tridecyl ketone (melting point 39° C.) and the like.

In addition, these compounds of (3-2) and (3-1) may be used in utility other than surface crosslinking and surface covering as a raw material of a water absorbent resin, for example, may be used as an internal crosslinking agent at polymerization, and may be used in improving flowability of a gel and, additionally, imparting another function of a water absorbent resin by adding to a gel during polymerization or after polymerization.

(3-3) Melting

In the present invention, when melted, a non-polymerized organic compound is a solid at a normal temperature (JIS Z 8703), and a melting point thereof is 10 to 200° C., 10 to 100° C., preferably 15 to 100° C., more preferably 18 to 90° C., further preferably 20 to 50° C., particularly preferably 30 to 40° C. Since the compound is a solid at a normal temperature, even when it is used in a water absorbent resin powder or it remains, it does not deteriorate flowability of a water absorbent resin powder and, further, there is no problem of a smell from a non-polymerized organic compound. When a melting point is high, exceeding 200° C., 100° C., 90° C., or the like, this is disadvantageous energetically, and heating at a high temperature causes degradation and coloration in some cases. And, when a melting point is lower such as 10° C., 15° C. or the like, the effect of the present invention is achieved with difficulty.

It is preferable that the non-polymerized organic compound is preferably heated, particularly, heated to a melting point or higher, then is used in storage, transport and, further, in a step of producing a water absorbent resin powder. Heating may be performed on a non-polymerized organic compound which is a liquid at a normal temperature and, preferably, is performed on a non-polymerized organic compound which is a solid at a normal temperature.

Due to a difference in an air temperature between summer and winter or a difference in an air temperature between day and night, working environment temperature of a step of producing a water absorbent resin powder is over or below a melting point in some cases and, as a result, the non-polymerized organic compound is a solid or a liquid, depending on an air temperature at production. In such case, since not only a time is necessary for preparing a raw material of a water absorbent resin powder, but also since flowability and a specific gravity of a raw material vary depending on a temperature, a mixing ratio of a raw material is not constant, resulting in lowering of physical properties and variation in physical properties, in some cases.

Particularly, when used as an aqueous solution in a step of producing a water absorbent resin powder, particularly, in a surface treatment step, further, in a surface crosslinking step, subtle change (variation) in composition due to the aforementioned variation in an air temperature can causes lowering or variation in physical properties.

(Heating Temperature)

In the present invention, heating may be performed continuously, or in a batch manner. The case where heating is performed continuously and the case where heating is performed in a batch manner are included in scope of transport and storage of the present invention.

A temperature for heating a non-polymerized organic compound is appropriately determined by a melting point, a decomposition temperature and a viscosity thereof, and when the compound is a solid at a normal temperature, usually, the compound is heated beyond a melting point, and an upper limit is preferable in an order of a melting point+100° C. or lower, further a melting point+80° C. or lower, a melting point+60° C. or lower, a melting point+20° C. or lower, and a melting point+10° C. or lower. That is, in the present invention, preferably, a non-polymerized organic compound has the aforementioned melting point (preferably, 10 to 100° C.), and it is preferable to heat the compound in a range of a melting point or higher and a melting point+100° C. or lower. And, a lower limit of a heating temperature is appropriately determined by a melting point or the like, it is preferable that the compound is heated to a normal temperature or higher, and it is more preferable that the compound is heated to a temperature described in the following (3-4) and (3-6). Further preferably, a temperature for heating a non-polymerized organic compound is 30° C. or higher and a melting point+100° C. or lower and, particularly, it is preferable that the compound is heated in a range of 30 to 90° C.

When a lower limit of a heating temperature exceeds a melting point, there is no problem, and it is preferable that, in view of change in an air temperature or the like, the lower limit is set to be at least +5° C. of a melting point and, further, around +8° C. of a melting point. A heating temperature is determined also by a melting point, for example, a non-polymerized organic compound having a melting point of lower than 30° C. (e.g. crosslinking agent and surface crosslinking agent such as propylene glycol, 1,3-propanediol, glycerin carbonate) may be heated to 30 to 90° C. and stored or transported and, preferably, a heating temperature is applied to the non-polymerized organic compound which is a solid at a normal temperature.

And, from a viewpoint of stability of physical properties, it is preferable that a heating temperature is substantially a constant temperature, particularly, the same temperature, and it is preferable that a heating temperature is controlled within ±9° C., further within ±6° C., within ±3° C., within ±1° C. of the predetermined temperature and, particularly, 90% or more of a whole production time is controlled. And, it is preferable that a temperature in the heated state is also a melting point or higher, and 150° C. or lower is preferable as a temperature, 100° C. or lower is more preferable, and 90° C. or lower is further preferable. In the present invention, it is sufficient that a raw material is melted at a melting point or higher, excessive heating is not only disadvantageous energetically, but also it causes lowering in physical properties, and coloration of the resulting water absorbent resin powder, with deterioration and degradation of a raw material, and thus, this is not preferable.

Since a mixing ratio and a concentration can be strictly controlled by heating a non-polymerized organic compound (particularly, surface crosslinking agent) (to a certain temperature) in advance before adjustment of a non-polymerized organic compound (particularly, surface crosslinking agent) at a predetermined ratio, particularly, before preparation of an aqueous solution at a predetermined ratio in the present invention, physical properties of a water absorbent resin powder, particularly, physical properties after surface crosslinking is improved or stabilized. A preferable predetermined ratio is determined depending on the purpose, and is a mixing ratio described in (2-8) and (2-9) in the case of a surface crosslinking agent, a solvent thereof (particularly, water), and other compound, and at least one kind of a surface crosslinking agent is stored in the heated state, preferably, in the melted state.

And, even when a non-polymerized organic compound is a powder or a block, it turns into a liquid-like substance by heating it to melt. As a result, the compound acts as a liquid-like substance having substantially no voids, as compared with a powder or a block having a low bulk density due to possession of voids between particles, a storage tank (tank) can be also compacted. When formulated into an aqueous solution, by continuously mixing water from a piping, a storage amount and a storage time as an aqueous solution can be shortened, degradation of a non-polymerized organic compound in an aqueous solution can be suppressed and a plant can be compacted. When formulated into a liquid-like substance, a storage tank (e.g. tank) is appropriately determined by a shape such as a spherical shape, a cone-like shape and a cylinder-like shape, and a heating method, a method of stirring or circulation, the presence or absence of stirring or circulation, a volume, a filling rate and the like as a liquid-like substance are appropriately determined.

By storage in the heated state, particularly, storage of a raw material which is a solid at a normal temperature in the heated state, further, storage in the melted state, production of a water absorbent resin powder is performed simply and more stably. When not heated, a viscosity is not constant due to an air temperature of the production field of a water absorbent resin powder, storage stability of a raw material is reduced and, as a result, physical properties and productivity of a water absorbent resin powder are reduced in some cases. And, for an organic compound which is a solid at a normal temperature, particularly, for a compound which is a solid around a normal temperature, since the raw material is a solid (powder, paste, block), or a liquid due to change in an air temperature for one day or one year, flowability and a shape of the raw material greatly change due to an air temperature of a water absorbent resin powder and, therefore, reception of a raw material in a production step (purchase, conveyance or transport from a raw material maker), or transport (particularly transport with a pipeline) from storage of a material (tank) in a step of producing a water absorbent resin powder is difficult, being not preferable.

Figure 8:
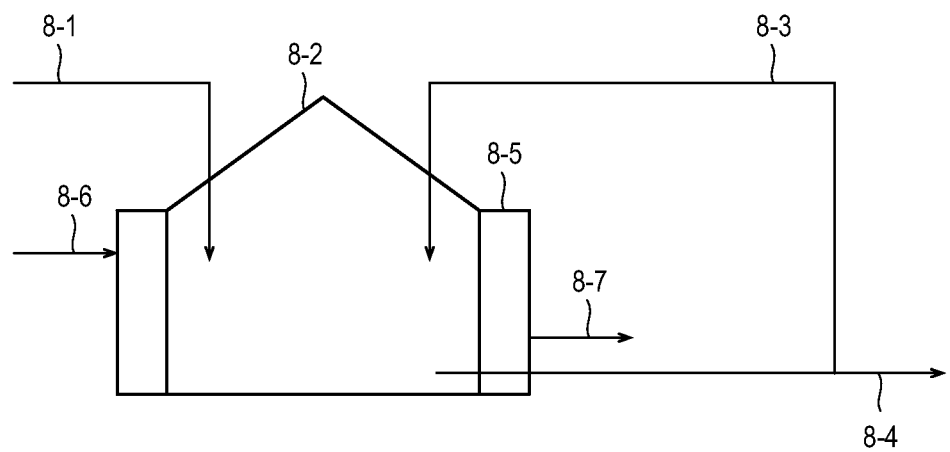
FIG. 8 is a conceptional diagram showing an outline of a periphery of a storage tank equipped with a jacket-system heating facility, which can be used in an embodiment of the present invention.
Figure 9:
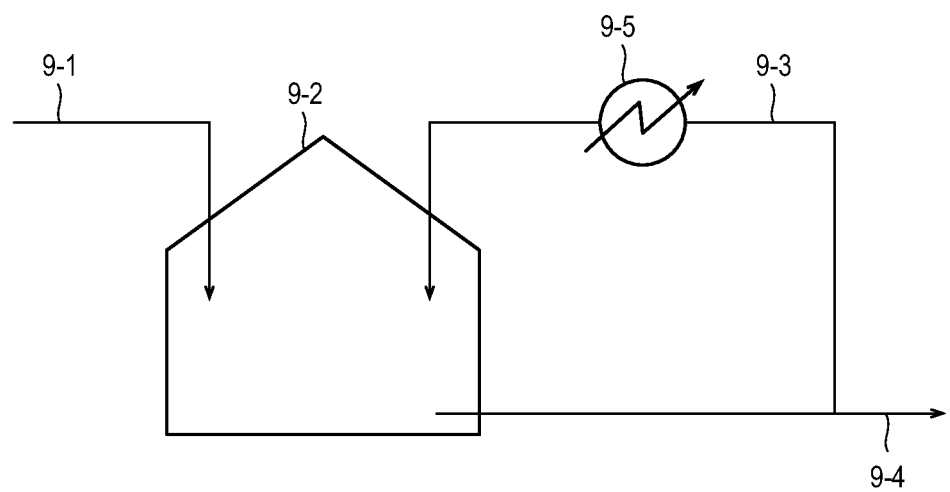
FIG. 9 is a conceptional diagram showing an outline of a periphery of a storage tank equipped with a multitubular heat exchanger (heating apparatus) which is provided in the outside, which can be used in an embodiment of the present invention.

Stirring may be performed at heating, or heating may be performed as it is without stirring, various containers and stirring devices having the heating function are used and, for example, a jacket-type storage tank shown in FIG. 8 and a storage tank equipped with a multitubular heat exchanger outside a storage tank shown in FIG. 9, various heat stirring devises (e.g. kneader) and the like are used. When stirred using a stirring wing or the like, a stirring portion may be heated. When stirred as necessary, a rotation number and a time are appropriately determined and, for example, are 0.1 to 5000 rpm, further 1 to 1000 rpm and for 1 second to 10 hours. Further, heating may be performed continuously, or intermittently.

(3-4) Storage

And, the present invention provides a method of storing a raw material of a polyacrylic acid (salt)-based water absorbent resin powder, comprising storing a non-polymerized organic compound which is a raw material of a water absorbent resin powder, in the heated state. Such method of storing a raw material of a water absorbent resin powder is applied suitably (second and third production processes) or essentially (first process), to a process for producing a water absorbent resin of the present invention. Storage may function as heating.

Storage may be a batch-manner which also functions as a heating (melting) device or continuous heating and, preferably, a non-polymerized organic compound is stored in a tank which is heated or kept hot. Before and after such heat-storage, particularly, melting storage, a heated non-polymerized organic compound is preferably transported in the heated state described in (3-5), particularly, transported in the heat-melted state, and is used in a step of producing a water absorbent resin.

A non-polymerized organic compound is preferably used in a step of producing a polyacrylic acid (salt)-based water absorbent resin of a non-polymerized organic compound in the heated state by the method of storing and/or the method of transporting a water absorbent resin. Preferably, a non-polymerized organic compound in the heated state is used in a crosslinking agent which can cause dehydration-reaction with a carboxyl group, particularly, a surface crosslinking agent.

(Storage Tank)

In the present invention, the non-polymerized organic compound which is a raw material is stored in the heated state before use and, particularly, is stored in a tank. A storage place is a place for producing the water absorbent resin, is substantially in the vicinity of a plant of the water absorbent resin and, particularly, the non-polymerized organic compound is stored in the vicinity of within 1 km, preferably within 0.5 km, more preferably 0.2 km from a use equipment thereof (e.g. surface crosslinking agent preparation tank).

In order to store in the heated state, a raw material which has been heated in advance, particularly, a raw material which has been heat-melted may be stored as it is, and during storage, a storage tank such as a tank may be heated or kept hot from the outside. And, a raw material which has not been heated, particularly, a raw material in the solid state, particularly, a powder raw material may be placed into a storage tank having the heating function, and heated as it is to a predetermined temperature, particularly, heated to a melting point or higher, to heat-melt. A storage tank used for heating is a tank having a planar heating element (particularly, electric sheet heating element, further, sheet heating element containing electrically conductive carbon black) on the surface, and/or a jacket of a heating medium such as a steam and warm water, and a storage tank used for keeping a material hot is a tank having a thermally insulating material or a double structure on the surface, and heating may be performed with a tank having a function of keeping a material hot.

When not stored in the heated state, not only handleability of a raw material is deteriorated, but also when a raw material is stored as a solution, particularly, an aqueous solution, a huge tank is necessary for storing a raw material and this is not preferable also in view of the cost. And, in storing in the aqueous solution state, since an ester compound, particularly, carbonic acid ester, particularly, alkylene carbonate is degraded in an aqueous solution and, particularly, ethylene carbonate generates ethylene glycol as a byproduct, this is not preferable. A filling rate, a storage amount and a time per tank are appropriately determined and, for example, they are 100 to 20000 L, further 500 to 15000 L, and are appropriately determined depending on a production amount of a water absorbent resin per day.

(Non-Polymerized Organic Compound, and Other Compound to be Mixed)

A first process which is one preferable embodiment of the production process of the present invention is a process for producing a water absorbent resin powder comprising storing an organic compound (preferably, non-polymerized organic compound which is a solid at a normal temperature) which is a raw material of a water absorbent resin powder, in the heated state, thereafter, mixing the compound with other compound at a predetermined ratio and, further, mixing the mixture into a water absorbent resin powder. Preferably, the organic compound which is a raw material of a water absorbent resin powder is a surface crosslinking agent of a water absorbent resin powder.

Herein, examples of other compound to be mixed with a non-polymerized organic compound which is stored or transported in the heated state include an inorganic compound, a solvent, particularly water, an organic compound which is a liquid at a normal temperature as non-polymerized organic compound and the like, and they may be also heated or cooled as necessary or may be a compound which is at room temperature (air temperature) as it is.

In the present invention, a temperature of other compound to be mixed, such as water, is appropriately determined according to a melting point, boiling point thereof or the like, and is in a range of preferably 30 to 100° C., more preferably 35 to 70° C., further preferably 40 to 65° C., as described in (2-8). When a difference in a temperature from other compound is great, mixing proceeds non-uniformly, or precipitation or degradation is seen in some cases and, therefore, a difference in a temperature between both of them to be mixed is preferable in an order of preferably 100° C. or less, further 80° C. or less, 60° C. or less, 20° C. or less, and 10° C. or less. Further, a temperature of a mixture after mixing at a predetermined ratio is adjusted at preferably 30° C. to 100° C., further preferably 35 to 70° C., more preferably 40 to 65° C., before mixing with a water absorbent resin. In addition, such temperature is not limited to the case of use of a surface crosslinking agent of (2-8).

In the present invention, preferably, as described in (2-8), the surface crosslinking agent is one or plural dehydration reactive surface crosslinking agents, further, the dehydration reactive surface crosslinking agent is an alkylene carbonate compound and, particularly, the alkylene carbonate compound is an ethylene carbonate compound. Particularly, it is preferable that the surface crosslinking agent is use of an alkylene carbonate compound and a polyhydric alcohol compound (particularly, C3-C6 polyhydric alcohol compound) in combination. By such procedure, a water absorbent resin powder of high physical properties is obtained simply, compactly and stably and, particularly, a residual alkylene carbonate compound, and ethylene glycol which is produced as a byproduct can be also reduced.

Since by storing an non-polymerized organic compound (particularly, surface crosslinking agent) in the heated state at a constant temperature, a mixing ratio at a huge scale and handleability are stabilized without influence of an air temperature, and raw materials can be mixed to be constant also after adjustment at a predetermined ratio, productivity is also stabilized, and by melting a non-polymerized organic compound (particularly, surface crosslinking agent) itself, a facility can be more compact and, further, there is neither degradation (e.g. decomposition of carbonate into ethylene glycol) nor rotting as in storage of an aqueous solution, compared with storage of a powder having a small bulk density and, further, storage of an aqueous solution diluted with water.

(Heating Temperature)

A heating temperature at storage is appropriately determined by a melting point, a viscosity, heat stability and the like of a raw material, a heating temperature of a non-polymerized organic compound is 30 to 90° C. and a melting point+100° C. or lower, or a non-polymerized organic compound has a melting point of 10 to 100° C. and is heated to a melting point+100° C. or lower. More preferable is 30 to 90° C., further 40 to 80° C., 50 to 70° C. When a heating temperature is too high, degradation and coloration occur at storage in some times, depending on a melting point and, conversely, when a temperature is too low, the effect is hardly achieved in solution of the problems of the present invention. And, storage is also performed in a tank which is heated or kept hot in the aforementioned temperature range. Herein, heating of a raw material may be performed at a stage before conveyance into a storage tank, or may be performed in a tank after storage, and a raw material which has been heated, particularly, heat-melted at a stage before conveyance into a storage tank may be introduced into a conveying machine, for example, a tank lorry, a container, or a pipeline and, thereupon, if necessary, a conveying machine may be heated or kept hot from the outside.

(Atmospheric Dew Point at Storage)

An upper space thereof may be an air, and an inert gas such as nitrogen may be filled therein or flown therethrough, for the purpose of preventing deterioration, preventing coloration or the like. And, conveniently, an upper space may be under reduced pressure or increased pressure, usually, under a normal pressure (atmospheric pressure). As described above, for controlling a moisture, an atmospheric dew point at storage (dew point of an upper space) is preferably low, 20° C. or lower, further 10° C. or lower, 0° C. or lower, −10° C. or lower, −20° C. or lower. In order to control a dew point, a dry air may be used, or an inert gas, preferably, a nitrogen gas may be used at storage. A nitrogen gas has a dew point of −73° C. or lower, and a helium gas has a dew point of −65° C. or lower.

(Storage Tank)

When transported to a step of producing a water absorbent resin powder with a tank lorry or a container, a transport unit thereof is appropriately determined within 100 to 20000 L, further 500 to 15000 L and, a material made of a metal (particularly, internal surface is SUS), a material made of a resin (particularly, made of polyethylene) and the like are appropriately determined, and a shape such as a cube, a cylinder, a pillar, a reverse cone, a reverse pyramid is appropriately selected. Among them, a temperature retainment-•warming-type thermal container or lorry is suitably used.

A raw material which has been conveyed to a factory (plant) for producing a water absorbent resin powder by such means is stored in a production factory as necessary and, then, conveyed to a step of preparing a raw material of a water absorbent resin powder by transport, preferably, a pipeline, further preferably, a pipeline which is heated or kept hot (e.g. yard for preparing an aqueous surface crosslinking agent solution at a predetermined ratio).

For controlling a storage amount, from a viewpoint of a precision degree, stability and, further, stability of physical properties of a water absorbent resin powder, among many flowmeters, a mass flowmeter, further, a Coriolis-type mass flowmeter is used. It is preferable that a flow rate of a heated raw material, particularly, a heat-melted raw material is measured, and is controlled in a water absorbent resin powder.

(3-5) A Method of Preparing a Surface Crosslinking Agent

Preparation of a surface crosslinking agent solution in the present invention, a surface crosslinking agent solution containing the aforementioned heated non-polymerized organic compound may be performed in a batch manner or a continuous manner and, among them, explanation will be given using an apparatus view of FIG. 7 which can be particularly preferably applied.

An apparatus 20 shown in FIG. 7 has a first tank 22, a second tank 24, a third tank 26, a line mixer 28, a fourth tank 30, a first piping 32, a second piping 34, a third piping 36, a fourth piping 38, a fifth piping 40 and a sixth piping 42 (circulation loop). The first piping 32 connects the first tank 22 and the line mixer 28. The second piping 34 connects the second tank 24 and the first piping 32. The third piping 36 connects the third tank 26 and the second piping 34. The fourth piping 38 connects the line mixer 28 and the fourth tank 30. The fifth piping 40 connects the fourth tank 30 and a next step. The sixth piping 42 is branched from a midway of the fifth piping 40, and is connected again to the fourth tank 30. Thereby, a part of the fifth piping 40 and the sixth piping 42 form a circulation loop (hereinafter, simply referred to as "circulation loop 2").

In the present invention, the first tank 22, the second tank 24, and the third tank 26 are tanks for storing a raw material for preparing a mixed liquid containing a surface crosslinking agent, respectively. That is, in the first tank 22, a first surface crosslinking agent (hereinafter, referred to as first surface crosslinking agent) is stored, in the second tank 24, other surface crosslinking agent (hereinafter, referred to as second surface crosslinking agent) is stored and, in the third tank 26, water is stored. Therefore, since an undiluted liquid of a surface crosslinking agent is stored in the first tank 22 and the second tank 24, respectively, an stock amount can be reduced, and a tank volume can be reduced. The third tank 26 may not be provided, and water may be directly introduced into the second piping 34.

The first surface crosslinking agent stored in the first tank 22 is continuously taken out through the first piping 32, and is sent to the line mixer 28. The second surface crosslinking agent stored in the second tank 24 is continuously taken out through the second piping 34, and is sent to the first piping 32. Water stored in the third tank 26 is continuously taken out through the third piping 36, and is sent to the second piping 34. The first surface crosslinking agent, the second surface crosslinking agent and water are mixed in the line mixer 28. A mixed liquid of the surface crosslinking agents having passed through the line mixer 28 is continuously placed into the fourth tank 30 through the fourth piping 38, and a predetermined amount of the mixed liquid is stored in the fourth tank 30. Thereafter, the mixed liquid stored in the fourth tank 30 is continuously taken out through the fifth piping 40, and is continuously added to a water absorbent resin particle consisting of a polymer of acrylic acid (salt).

Since in the line mixer 28, the surface crosslinking agent and water are not sufficiently mixed, a mixing ratio of the mixed liquid passing through the fourth piping 38 is not stabilized, and is not uniform. Therefore, if the mixed liquid of the surface crosslinking agents passing through the fourth piping 38 is directly added to a water absorbent resin particle, quality of the resulting water absorbent resin powder is not stabilized in some cases. Then, the mixed liquid of the surface crosslinking agents passing through the fourth piping 38 is stored in the fourth tank 30 once. And, the mixed liquid in the interior of the fourth tank 30 is circulated with a circulation loop 2 so as to sufficiently mix three kinds of liquids.

If the aforementioned two kinds of surface crosslinking agents and water are batch-mixed to prepare a mixed liquid suitable for addition to a water absorbent resin particle, a large amount of the mixed liquid is necessary. Therefore, a large tank is necessary in some cases.

(3-6) Transport

And, the present invention provides a method of transporting a raw material of a polyacrylic acid (salt)-based water absorbent resin powder, comprising, after production of a non-polymerized organic compound which is a raw material (modified raw material) of a water absorbent resin powder and, if necessary, after storage, transporting the compound in a heated state to a step of producing a water absorbent resin powder. Such method of transporting a raw material of a water absorbent resin powder is suitably (second and third production processes) or essentially (first production process) applied to the process for producing a water absorbent resin of the present invention. Such transporting method is suitably applied to a step of producing a water absorbent resin, particularly, transport of a raw material in the aforementioned production process and, further, is also applied to transport of a raw material to a step of producing a water absorbent resin (a plant for producing a water absorbent resin). That is, in the present invention, suitably, a raw material of a water absorbent resin in a heated state, in a heat-melted state is transported to a step of producing a water absorbent resin (a plant for producing a water absorbent resin), further preferably is stored in the heated state, and/or used in production of a water absorbent resin which is adjusted at a predetermined ratio in the heated state. The aforementioned raw material (preferably, modified raw material) of a water absorbent resin powder which has been transported in the heated-state is not particularly limited, as far as it is a raw material of a water absorbent resin powder, but particularly, it is suitably used as the aforementioned crosslinking agent, particularly, a surface crosslinking agent or a surface covering agent (which is a solid at a normal temperature).

The transport of a non-polymerized organic compound in the present invention means move of the non-polymerized organic compound, and includes transport of a fluid with a pipeline or the like, transport by move of the storage container itself or a container for transport (e.g. container, lorry, tanker) filled with the compound, or a form of combination of them. Representatively, the transport is transport to a water absorbent resin production plant after production of the non-polymerized organic compound, or transport in a production step in a water absorbent resin production plant, and preferably, both of them are applied.

In the present invention, it is preferable that the non-polymerized organic compound is transported in the heated state, particularly the heat-melted state. By transporting a solid in the heat-melted state, after production of the non-polymerized organic compound, transport to a water absorbent resin production plant can be simple and precise, and use or storage in a water absorbent resin production plant can be also performed as it is in the heat-melted state. In a step of producing a water absorbent resin, in the case of fluid transport with a pipeline or the like, heating and temperature retainment of a pipeline may not be performed, as far as the compound is not solidified during transport. In the case of transport using a container, heating•temperature retainment of a container during transport is arbitrary, but in view of deformation and damage of a container due to solidification, a procedure of re-melting and the like, it is preferable that heating and temperature retainment are conducted so that the melted state is retained. A method of heating or retaining a temperature at transport can be performed by the same means as that at storage.

(Strainer)

It is preferable that a strainer is used in the transport step. The strainer is suitably provided on a fluid transport path, particularly before a suction port of a transporting pump, with a mesh or a metal net. A mesh size or a pore diameter of the strainer is appropriately determined, and is in a range of 10 to 5000 μm, further 100 to 2000 μm, and an opening ratio is around 10 to 90%, and is appropriately determined.

That is, the present invention provides a method of transporting a raw material of a water absorbent resin powder, comprising, after production of the non-polymerized organic compound which is at least one kind of a raw material of a water absorbent resin powder and, if necessary after storage, transporting the compound in the heated and melted state to a step of producing a water absorbent resin powder. It is suitable from a view point of the effect that: the non-polymerized organic compound which is a raw material of such water absorbent resin powder is a solid at a normal temperature; it is used as a surface crosslinking agent of a water absorbent resin powder because of greatness of influence on physical properties of a water absorbent resin powder; the surface crosslinking agent contains one or a plurality of dehydration reactive surface crosslinking agents; further, an alkylene carbonate compound is used in the dehydration reactive surface crosslinking agent; and particularly, the alkylene carbonate compound is ethylene carbonate. It is more preferable that the surface crosslinking agent contains at least an alkylene carbonate compound and a polyhydric alcohol compound.

By such procedure, a water absorbent resin powder of high physical properties is stably obtained simply and compactly without contamination of a foreign matter into a water absorbent resin and without stoppage of an apparatus due to a foreign matter and, particularly, a residual alkylene carbonate compound and ethylene glycol which is produced as a byproduct can be also reduced. By storing the non-polymerized organic compound at a constant temperature in the heated state, since a mixing ratio at a huge scale and handleability are stabilized without influence of an air temperature, and a raw material can be mixed constantly, productivity is also stabilized, a facility can be compact as compared with the case of storage as an aqueous solution, further, degradation (e.g. decomposition of carbonate into ethylene glycol) like in an aqueous solution stored is suppressed, and a possibility that corrosion is generated can be reduced.

By transporting the non-polymerized organic compound in the heated state, more preferably, by transporting the compound in the melted state, production of a water absorbent resin powder is performed simply and stably. When the compound is not heated or melted, a viscosity is not constant due to an external air temperature and, particularly, in the case of a compound which is a solid at around normal temperature, a raw material is a solid (powder, paste, block) or a liquid due to change in an air temperature for one day or one year. For this reason, flowability and a shape of a raw material are greatly changed due to an external air temperature, thereby, reception of a raw material into a production step (purchase, conveyance or transport from a raw material maker), or transport (particularly, transport with a pipeline) from storage (tank) of a raw material in a step of producing a water absorbent resin powder is difficult, being not preferable.

(Heating Temperature)

A heating temperature at transport is appropriately determined by a melting point, a viscosity, heat stability and the like of a raw material, and is 30 to 90° C., further 40 to 80° C., 50 to 70° C. When a heating temperature at transport is considerably higher than a melting point, this is disadvantageous energetically, degradation and coloration occur at storage in some cases depending on a compound and, conversely, when a temperature is too low, the effect is achieved with difficulty, in solution of the problems of the present invention. Transport is performed using any one or more conveying machines of a tank lorry, a tanker, a container, and a pipeline, and heating of a raw material may be performed by a conveying machine used in the transport, alternatively a raw material which has been heated, particularly heat-melted at a stage before introducing into a conveying machine, may be introduced into a conveying machine, for example, a tank lorry, a container or a pipeline and, thereupon, if necessary, a conveying machine may be heated or kept hot from the outside.

When transported to a step of producing a water absorbent resin powder in a batch manner with a tank lorry or a container, a transport unit is 100 to 20000 L, further 500 to 15000 L, and is appropriately determined, and a material made of a metal (particularly, an internal surface is SUS), a material made of a resin (particularly, made of polyethylene) and the like are appropriately determined, and a shape such as a cube, a cylinder, a pillar, a reverse cone, a reverse pyramid and the like is appropriately selected. Among them, a temperature retainment•warming-type thermal container or lorry is suitably used. And, when a fluid is transported with a pipeline, a transport amount is appropriately determined, and for example, a flow rate is adjusted at 0.1 to 1000 [$m^3$/hr], further 1 to 100 [$m^3$/hr].

When transported from a raw material production maker to a production base of a water absorbent resin powder, transport in the heat-melted state is stably applied to transport at a relatively long distance, and a transport distance is 10 km or longer, further 20 to 1000 km. In such case, various transport means of land transport and marine transport, such as a tank lorry and a tanker are used, and a raw material is delivered into a factory (plant) for producing a water absorbent resin powder by such means. The delivered raw material is stored in a production factory as necessary, then, is conveyed to a step of preparing a raw material of a water absorbent resin powder (e.g. preparation of an aqueous surface crosslinking agent solution at a predetermined ratio)

by transport, preferably with a pipeline, further preferably a pipeline which is heated or kept hot.

For controlling a transport amount, from a viewpoint of a precision degree, stability and further, stability of physical properties of a water absorbent resin powder, among many flowmeters, a mass flowmeter, further a Coriolis-type mass flowmeter is used. It is preferable to produce a water absorbent resin powder by controlling a flow rate of a heated raw material, particularly a heat-melted raw material with a mass flowmeter. A Coriolis-type mass flowmeter is suitably applied to adjustment of flow rate of the compound (particularly, a surface crosslinking agent and a solvent thereof) at a predetermined ratio at mixing, or adjustment of a flow rate when an aqueous surface crosslinking agent solution after mixing is mixed into a water absorbent resin.

(3-7) Mass Flowmeter, Preferably Coriolis-Type Mass Flowmeter

The present inventors paid attention to that a trouble at a production step and lowering in productivity (workability, handleability of a raw material) are due to change in an air temperature every day or every season. It was found out that such problem is remarkable in a solid raw material having a relatively low melting point (particularly melting point 15 to 100° C.). And, when alkylene carbonate is used as a surface crosslinking agent, ethylene glycol is produced as a byproduct in a water absorbent resin, and it was found out that cause thereof is brought by decomposition in an aqueous alkylene carbonate solution before mixing into a water absorbent resin, and such degradation of alkylene carbonate used in a surface crosslinking agent leads to also variation and lowering in physical properties after surface crosslinking.

And, the present inventors found out that cause for variation and lowering in physical properties of a water absorbent resin is derived from subtle variation in a concentration and ratio of a modifier mixture to be mixed into a water absorbent resin, particularly an aqueous surface crosslinking agent solution and, particularly, is derived from subtle variation in a concentration and a ratio of a modifier mixture, particularly an aqueous surface crosslinking agent solution due to change in an air temperature every day or every season.

Further, the present inventors found out that cause of variation in physical properties of a water absorbent resin (particularly, physical properties after surface crosslinking) is derived from subtle variation in a mixing ratio when an organic compound used in an additive (a modifier of a water absorbent resin, particularly a surface crosslinking agent) into a water absorbent resin powder, and water are mixed, and solved such problem by using a particular flowmeter upon adjustment to a predetermined ratio.

Previously, many techniques of stabilizing physical properties of a water absorbent resin powder and improving physical properties in surface crosslinking have been proposed as in Patent Literatures 1 to 44 etc., but the present inventors found out that cause for variation and lowering in physical properties of a water absorbent resin powder is derived from subtle variation in a concentration and a ratio of a modifier mixture to be mixed into a water absorbent resin powder, particularly an aqueous surface crosslinking agent solution, particularly, is derived from subtle variation in a concentration and a ratio of a modifier mixture, particularly an aqueous surface crosslinking agent solution due to change in an air temperature every day or every season. Previously, for controlling a flow rate, various flowmeters have been used, and further, specific gravity correction has been performed by a temperature as necessary, but it was found out that these previous flow rate controls are insufficient for producing high physical properties (particularly, ranges stated later) in recent years at a high production amount.

In the present invention which found out such cause, such problem was solved by measuring a flow rate of the heated non-polymerized organic compound with a mass flowmeter, particularly, a Coriolis-type mass flowmeter, and mixing the compound into a water absorbent resin powder. In the present invention, since influence on physical properties is great from a view point of the effect, a non-polymerized organic compound, a flow rate of which is measured, is a surface crosslinking agent of a water-soluble resin powder, further preferably, the surface crosslinking agent is one or a plurality of dehydration reactive surface crosslinking agents, further preferably, the dehydration reactive surface crosslinking agent is an alkylene carbonate compound, and it is particularly preferable that the alkylene carbonate compound is ethylene carbonate (melting point 36° C.)

As a flowmeter, many kinds are known (see; OVAL Corporation homepage http://www.oval.co.jp/techinfo/coriolis3.html) and, for example, a volume mass flowmeter (OVAL flowmeter/the number of pumpings or a constant volume is detected; $Q=K*N$), an area flowmeter ($Q=K \cdot A$, a float position (H) is detected), a differential pressure flowmeter ($Q=K*\sqrt{(P1-P2)}$, a differential pressure is detected), a turbine flowmeter ($Q=K \cdot w$, the rotation number of a rotor (w) is detected), an eddy flowmeter ($Q=K/f$, the eddy occurrence number (f) is detected), an ultrasound mass flowmeter ($Q=K/$change in ultrasound transmission velocity ($\Delta t$) is detected), a Coriolis-type mass flowmeter ($Q=K \cdot \Delta t$, a time difference ($\Delta t$) is detected), a heat-type flowmeter ($Q=K \cdot \Delta T$ or $Q=K \cdot \Delta q$, a temperature difference ($\Delta A$) or a supply heat amount ($\Delta q$) is detected) and the like are known. And, also in JIS (Japanese Industrial Standards), measurement of a flow rate is defined in JIS-B7551 (float-type area flowmeter), JIS-B7552 (flowmeter for fluid-instrumental error test method), JIS-B7553 (partial flume-type flowmeter), JIS-B7554 (electromagnetic flowmeter), JIS-B-Z8761 (flow rate measuring method with float area flowmeter), JIS-Z8762 (flow rate measuring method with throttle mechanism), JIS-Z8765 (flow rate measuring method with turbine flowmeter), JIS-Z-8766 (flow rate measuring method with eddy flowmeter) and the like.

(Coriolis-Type Mass Flowmeter)

When a moving mass encounters vibration vertical to a moving direction, a Coriolis force in response to a velocity of the mass is generated. The Coriolis mass flowmeter is provided with a resonating, measuring tube for correctly generating this effect, and when a fluid (=mass) moves in a measuring tube, a Coriolis force is generated. By sensors at an outlet and an inlet, slippage of a vibration phase of a measuring tube is sensed, and a microprocessor analyzes and uses this information to calculate a mass flow rate. Further, by a resonating frequency of a measuring tube, direct measurement of a fluid density is possible, and a temperature of a measuring tube is also measured for correcting influence of a temperature. This signal corresponds to a temperature of a process, and can be also used as an output signal. The Coriolis-type mass flowmeter is suitably used not only in preparation of a surface crosslinking agent at a predetermined ratio, but also addition of a surface crosslinking agent to a water absorbent resin after preparation.

(Volume Mass Flowmeter)

A mass flowmeter directly measures a flow rate with a "bushel", and a space is formed with a "motor" such as a piston and a rotor, and a "case" surrounding it, as an "automatic continuous bushel". When a fluid is flown through an inlet, a pressure is applied to a tooth surface of an OVAL gear (hereinafter, referred to as rotor), and if supply of a fluid is continuously conducted, rotational motion is continuously conducted, and an oval flowmeter measures a flow rate by measuring a volume of a crescent moon-shaped "bushel" formed between a rotor and a case every one rotation of a rotor.

(Heat-Type Mass Flowmeter)

As a mass flowmeter, there are a capillary-type, a heat ray-type, a semiconductor-type, a flow sensor-type and the like, and is constructed of a main path and a bypass path, a heater and a temperature sensor (flow rate sensor) provided in the main path, a body part consisting of a laminar flow element provided in the bypass path for generating a flow in the main path, and the like, and an electric circuit part for operational treating a mass flow rate signal from a flow rate sensor, and the like.

(Ultrasound Mass Flowmeter)

As an ultrasound flowmeter, there are some methods such as a transmission time difference method, a transmission time reciprocal difference method, a sing• around method and a Doppler method and, among them, most frequently used is a transmission time reciprocal difference method (frequency difference method). A volume flow rate is such that a flow rate can be obtained by multiplying the flow velocity by a tubular cross-sectional area A. In an actual flowmeter, after a detected flow velocity value is corrected into an average flow velocity in a plane with a "flow rate correction coefficient", this is multiplied by a cross-sectional area to obtain a flow rate.

(3-8) A Suitable Method of Mixing the Non-Polymerized Organic Substance into a Water Absorbent Resin Powder It is preferable that the non-polymerized organic substance is transported or stored in a heated state. Such non-polymerized organic substance which has been transported or stored is mixed at a predetermined ratio, particularly, formulated into an aqueous solution at a predetermined concentration, and is mixed into a water absorbent resin and, particularly, used in surface-crosslinking a water absorbent resin. By transporting, storing or mixing, at a predetermined ratio, a raw material in the heated state (particularly, a melting point or higher), since production of a water absorbent resin can be performed simply and compactly and, further, a mixing ratio is also stabilized by heating a raw material to a constant temperature, then, physical properties of a water absorbent resin powder, particularly, physical properties after surface crosslinking is also stabilized. For measuring a flow rate upon transport, storage or mixing, a mass flowmeter, particularly a Coriolis-type mass flowmeter is used. By quantitating a flow rate of the heated non-polymerized organic substance with a Coriolis-type mass flowmeter, a mixing ratio of the non-polymerized organic substance can be controlled strictly regardless of an air temperature. As a result, physical properties of the resulting water absorbent resin powder, particularly, physical properties after surface crosslinking is also stabilized. The non-polymerized organic substance is a surface crosslinking agent, further, an alkylene carbonate compound, particularly, a surface crosslinking agent described in (2-8) and (2-9). A suitable mixing ratio is an aqueous solution at a ratio and a concentration described above in the surface crosslinking.

Previously, the technique of formulating a surface crosslinking agent such as alkylene carbonate into an aqueous solution at a predetermined concentration, and heating the aqueous solution has been known, but it was found out that, by such procedure, ethylene glycol is produced as a byproduct before addition to a water absorbent resin powder. In the present invention, contrary to such previous technique, by heating, particularly heat-melting alkylene carbonate, particularly ethylene carbonate (melting point 36° C.) in the aforementioned range, mixing it into a water absorbent resin powder as an aqueous solution immediately before use, particularly, mixing it into a water absorbent resin powder within an average retention time of 1 hour described later, such problem is solved, and a water absorbent resin powder of high physical properties can be stably provided.

(Mixing Machine)

Mixing of a non-polymerized organic compound or an aqueous solution containing a non-polymerized organic compound and a water absorbent resin powder may be performed in a batch manner or continuously, preferably continuous mixing is performed, and it is preferable that it is mixed into a water absorbent resin which is stirred or flown, further preferably, is spray-mixed therein. As a mixing machine, a mixing machine equipped with a Coriolis-type mass flowmeter is preferable, and a fluidized layer or a vertical or horizontal stirring mixing machine is used. A preferable vertical stirring mixing machine is exemplified in International Publication No. WO 2010/133460 pamphlet, International Publication No. WO 2010/100936 pamphlet, International Publication No. WO 2007/065840 pamphlet, and European Patent EP534228B, a suitable horizontal stirring mixing machine is exemplified in U.S. Pat. No. 6,071,976 and U.S. Pat. No. 5,140,076 etc., and a fluidized layer is exemplified in International Publication No. WO 2009/028568.

As to a mixing time, high speed mixing is performed preferably within 3 minutes, further within 1 minute, particularly within 0.5 minute, and a stirring rate when mixed while a water absorbent resin is stirred is preferably 10 to 10000 rpm, more preferably 100 to 5000 rpm, and is appropriately determined based on an apparatus, a production amount and the like.

(Second Production Process)

That is, the present invention provides a production process characterized in that an organic compound and water are mixed into a polyacrylic acid (salt)-based water absorbent resin powder, and the mixing ratio is controlled with a mass flowmeter (second process) as a second process for producing a polyacrylic acid (salt)-based water absorbent resin powder, in addition to the first production process in which a non-polymerized organic compound (preferably, used as a surface crosslinking agent) is stored in the heated state, and the third production process in which the compound is used in the melted state, explained in [3].

Also in the second production process, like the first production process and/or the third production process, preferably, the non-polymerized organic compound is a surface crosslinking agent described in (2-8), (3-1) and the like, further, preferably, the organic compound is selected from an alkylene carbonate compound and a polyhydric alcohol compound described in (2-8) and (2-9) and, further, a surface crosslinking agent mixed with an ion binding surface crosslinking agent described in (2-9) is used simultaneously and/or separately. More preferably, the process is a process for producing a water absorbent resin using a mass flowmeter, particularly preferably using a Coriolis-type mass flowmeter.

By using a mass flowmeter, particularly a Coriolis-type mass flowmeter in a particular step, particularly a surface crosslinking step, physical properties of a water absorbent resin produced over a long term is highly stabilized. Stability of a flow rate is determined to be variation of 2% or less, 1% or less, 0.5% or less, 0.2% or less relative to an objective flow rate. In recent years, with enhancement of objective physical properties of a water absorbent resin, it was found that since the number of components is increased to 3 or more, 4 or more, stability of a flow rate is more important.

Therefore, in order to more exert the effect of a Coriolis-type mass flowmeter, the flowmeter is used for weighing surface crosslinking agents of a plurality of components, further 3 or more components, 4 or more components. Preferable components are a composition described in (2-8), for example, this is suitably applied to surface crosslinking agents of 3 components consisting of a plurality of covalently binding surface crosslinking agents (preferably, polyhydric alcohol and alkylene carbonate) and water, further, if necessary, a surface crosslinking agent of 4 or more components containing a surfactant, anion crosslinking surface crosslinking agent, an organic acid and the like. There is no particular upper limit of the number of components measured using a Coriolis-type mass flowmeter, and is appropriately determined in view of physical properties of each component and an influence degree on the finished water absorbent resin, and is usually up to around 10 components.

Further, a Coriolis-type mass flowmeter is also suitably used in measuring an addition amount of each time when a surface crosslinking agent is added plural times. And, it is also applied to the case where addition and a reaction of an ion crosslinking crosslinking agent are performed after addition and a reaction of a covalently binding surface crosslinking agent. Herein, it is as described [2] that a surface crosslinking agent is preferably stored in the heated state in advance.

(3-9) Average Retention Time as an Aqueous Solution

In a method of surface-crosslinking a water absorbent resin powder with an aqueous solution of a cyclic compound, particularly, an alkylene carbonate compound, a continuous production process is preferable, in which an average retention time from preparation of an aqueous alkylene carbonate compound solution to addition of the solution is within 3 hours, further within 1 hour, within 0.5 hour.

Also in such procedure, it is preferable that, after an alkylene carbonate compound is stored or transported in the heat-melted state, a melted alkylene carbonate compound-containing aqueous solution is prepared, as described in (3-2) to (3-6). And, as described in (2-8), it is suitable that an alkylene carbonate compound is ethylene carbonate, and it is preferable that, after an alkylene carbonate compound and a polyhydric alcohol compound are mixed into a water absorbent resin, the mixture is heat-reacted. Further, it is preferable that an ion binding surface crosslinking agent described in (2-9) is mixed simultaneously with and/or separately from an alkylene carbonate compound or the like.

When an average retention time as an aqueous solution grows longer, particularly, an alkylene carbonate compound, further, an ethylene carbonate compound in a surface crosslinking agent is decomposed in an aqueous surface crosslinking agent solution or on a surface of a water absorbent resin before mixing with or before a reaction with a water absorbent resin powder, and lowering in physical properties after surface crosslinking and production of ethylene glycol as a byproduct (hydrolysate of ethylene carbonate) are formed, being not preferable.

A temperature of such aqueous surface crosslinking agent solution is appropriately determined from solubility and a viscosity, and is in a range of −10 to 100° C., further 5 to 50° C., 10 to 90° C., 35 to 70° C., 40 to 65° C. When a temperature is high, there is a tendency that, before mixing with or a reaction with a water absorbent resin powder, a cyclic surface crosslinking agent is hydrolyzed, and mixability is reduced. Particularly, when the aqueous surface crosslinking agent solution with an acid or a base added thereto is used, in order to avoid hydrolysis of a cyclic surface crosslinking agent, an average retention time is more important.

An average retention time in the present invention is defined as follows.

(i) In the case of a batch manner, an average retention time is a time from placement of a raw material to consumption of an all amount. However, when a next raw material is placed before the previously placed raw material is consumed, an average retention time is a time to consumption of the previously introduced amount equivalent. When mixed with a water absorbent resin after transferred from a preparation tank to a measurement tank, an average retention time is a time from placement into a preparation tank to mixing with a water absorbent resin. When the time varies due to difference in a placement amount or a use amount, an average retention time is a weighted average value of each time weighting with each placement amount.

(ii) In the case of a continuous manner, an average retention time is a value obtained by dividing an average storage amount of a total of an average storage amount of a preparation tank into which a raw material is placed, and a volume from the preparation tank outlet to a nozzle for mixing into a water absorbent resin, by an amount introduced into a water absorbent resin per unit time. When production is stopped due to night or holiday, concerning a part remaining in a system, an average retention time is a value obtained by adding a stoppage time, and performing weighting averaging.

(3-9) Strainer

In the present invention, it is preferable that a mixture, particularly, an aqueous solution at transport (during transport step) or at storage after preparation of the non-polymerized organic compound is passed through a strainer, and a contained solid is filtered. A filtering material is a resin such as polypropylene, or a stainless steel, and it is preferable that a separation efficiency of a filtering material used for particles having a particle diameter (defined as a mesh size) of 30 μm, further 10 μm is at least 90%.

By the present invention, advantageously, a filter material (filtering material or filter type) having a separation efficiency (retention property) for particles having a particle diameter of 30 μm of at least 70%, preferably at least 80%, particularly advantageously at least 90% or at least 95% or more is used. Particularly advantageously, in the case of the method in accordance with the present invention, a filter material (filtering material or filter type) having a separation efficiency for particles having a particle diameter of 20 μm of at least 70%, preferably at least 80%, particularly advantageously at least 90% or at least 95% or more is used. Extremely advantageously, in the case of the method in accordance with the present invention, a filter material (filtering material or filter type) having a separation efficiency for particles having a particle diameter of 10 μm of at least 70%, preferably at least 80%, particularly advantageously at least 90% or at least 95% or more is used. Still further advantageously, in the case of the method in accordance with the present invention, a filter material (filtering material or filter type) having a separation efficiency for particles having a particle diameter of 5 μm of at least 70%, preferably at least 80%, particularly advantageously at least 90% or at least 95% or more is used. Most advantageously, in the case of the method in accordance with the present invention, a filter material (filtering material or filter type) having a separation efficiency for particles having a particle diameter of 1 μm of at least 70%, preferably at least 80%, particularly advantageously at least 90% or at least 95% or more is used.

It is sufficient that a temperature of a site having a strainer is held at a temperature at which the melted or dissolved state can be maintained or higher, preferably, is held in a range of −5° C. to +5° C. relative to a temperature of a liquid immediately before flowing into a strainer, and is most preferably substantially the same temperature. By filtering a non-polymerized organic material, particularly, a surface crosslinking agent, further, an alkylene carbonate compound in the heated state, mixing of a foreign matter into a water absorbent resin powder and coloration can be prevented and, further, a trouble and stoppage of continuous operation can be prevented.

More advantageously, in order to remove a foreign matter such as a polymer dissolved in the non-polymerized organic compound, it is preferable that, as the filtering material, for example, a filtering web, a filtering cloth, a fiber layer, a sintered material or a deposition layer (e.g. from fine quartz material, diatomaceous earth, active carbon, zeolite) is used.

In the strainer, a bag filter or a candle filter can be used. As the bag filter, not only sewn filter bags from a variety of materials, but also completely adhered, preferably multilayered filter bags can be used. As the filter candle, a winding candle, a melt blow-type candle and a resin-bound filter candle are taken into consideration. The filter bag and the filter candle can be used in not only a monolayered filter casing but also a multilayered filter casing. As the casing material, for example, polypropylene, and a stainless steel are taken into consideration.

As the filtering material, for example, a stainless steel, polypropylene, cellulose, a polyester, and a metal woven fabric (stainless steel, for example, chromium-nickel-stainless steel) as well as a phenol resin-bound acryl fiber and the like are also taken into consideration. A more particularly advantageous material for a filter (not only a filter bag but also a filter candle) used by the present invention is polypropylene. And, in the case of a filter candle, active carbon can be also used.

It is preferable that filtration with the strainer is performed by providing a difference in pressures of fluid before and after the strainer, and the difference in a pressure is preferably 10 mbar to 5 bar, more preferably 20 mbar to 3 bar, further preferably 20 mbar to 2 bar, most preferably 20 mbar to 1.5 bar. When a higher difference in a pressure is required, a filter should be exchanged.

And, filtration using the strainer may be performed at reception from a raw material manufacturing maker, or at a stage of placement into a preparation tank.

[4] PHYSICAL PROPERTIES OF POLYACRYLIC ACID (SALT)-BASED WATER ABSORBENT RESIN POWDER

In the present invention, since workability and stability are excellent, the present invention is suitable for a process for continuously producing a water absorbent resin of high physical properties of the following (4-1) to (4-8) at the aforementioned production amount. Suitably, as a first water absorbent resin, there is provided a polyacrylic acid (salt)-based water absorbent resin which has a surface crosslinked with alkylene carbonate (particularly, ethylene carbonate), wherein a ratio of internal gas bubbles is 0.5% or more, and residual ethylene glycol (in accordance with a measuring method (2) of the following (5-16) defined in the description) is 1000 ppm or less.

Suitably, as a first water absorbent resin, there is provided a polyacrylic acid (salt)-based water absorbent resin which has been surface-crosslinked with an alkylene carbonate compound (particularly, ethylene carbonate), wherein a ratio of internal gas bubbles is 0.5% or more, and residual ethylene glycol (in accordance with a measuring method (2) of the following (5-16) defined in the description) is 1000 ppm or less.

The water absorbent resin of the present invention is of porosity exhibiting a high rate, nevertheless an amount of residual ethylene glycol derived from ethylene carbonate is small, and influence of an alkylene carbonate compound which is easily hydrophobized (unlike a polyhydric alcohol being a hydrophilic surface crosslinking agent) is small, and is of a high rate, and is also hydrophilic.

The water absorbent resin of the present invention is of porosity exhibiting a high rate (high FSR), nevertheless an amount of residual ethylene glycol derived from ethylene carbonate is small, and influence of an alkylene carbonate compound which is easily hydrophobized (unlike a polyhydric alcohol being a hydrophilic surface crosslinking agent) is small, and is of a high rate (high FSR), and is also hydrophilic.

(Various Physical Properties Suitable for the Present Invention) In the present invention, since workability and stability are excellent, the present invention is suitable for a process for continuously producing a water absorbent resin of high physical properties of the following (4-1) to (4-8) at the production amount. Suitably, there is provided a polyacrylic acid (salt)-based water absorbent resin having a ratio of internal gas bubbles of 0.5% or more, which has been surface-crosslinked with alkylene carbonate (particularly, ethylene carbonate), wherein residual ethylene glycol is 1000 ppm or less.

That is, in the present invention, there is also provided a polyacrylic acid (salt)-based water absorbent resin which has been surface-crosslinked with ethylene carbonate, wherein a water absorption capacity (AAP) in a 0.9 weight % aqueous sodium chloride solution under a pressure of 4.8 kPa is preferably 20 [g/g], a ratio of internal gas bubbles is 0.5% or more, and residual ethylene glycol defined in description (in accordance with the measuring method (2) of the following (5-16)) is 1000 ppm or less, a water absorption capacity without load (CRC) is preferably 10 [g/g] or more, more preferably 20 [g/g] or more, 0.69 weight % saline flow conductivity (SFC) is $1[\times 10^{-7} \cdot cm^3 \cdot s \cdot g^{-1}]$.

(Various Physical Properties Suitable for the Present Invention)

(4-1) AAP (Water Absorption Capacity Under Load)

In order to prevent leakage in a paper diaper, one example of a means for attaining that is surface crosslinking after the polymerization, a water absorption capacity (AAP) under a pressure of 1.9 kPa, further under a pressure of 4.8 kPa on a 0.9 weight % aqueous sodium chloride solution is controlled at preferably 20 [g/g] or more, more preferably 22 [g/g] or more, further preferably 24 [g/g] or more. It is preferable that an upper limit of AAP is higher, but from balance with other physical properties, an upper limit is usually 40 [g/g], further 35 [g/g] and, particularly in the case of a load of 4.8 kP, around 30 [g/g] is preferable.

(4-2) CRC (Water Absorption Capacity without Load)

A water absorption capacity without load (CRC) is controlled at preferably 10 [g/g] or more, more preferably 20 [g/g] or more, further preferably 25 [g/g] or more, particularly preferably 30 [g/g] or more. Higher CRC is preferable, and an upper limit value is not particularly limited, but from balance between other physical properties (particularly, liquid permeability), is preferably 50 [g/g] or less, more preferably 45 [g/g] or less, further preferably 40 [g/g] or less. Preferably, CRC is in a range of 25 to 35 [g/g]. CRC can be controlled by an amount of a crosslinking agent or the like. Table 5.6 of Non-Patent Literature 1 discloses a water absorption capacity of a commercially available water absorbent resin (there is no detailed description of a measuring method). Specifically, a fact that Aquakeep is 65.4 [g/g], and Sanwet IM-1000 is 58.3 [g/g] is disclosed, but in order to more solve the problem of the present invention (realization of both of liquid permeability and a free swelling rate), in the present invention, it is preferable that a water absorption capacity without load (CRC) is controlled in the aforementioned range.

(4-3) SFC (Saline Flow Conductivity)

In order to prevent leakage in a paper diaper, as one example of a means for attaining that is the polymerization and a particle size-controlled surface crosslinking, 0.69 weight % saline flow conductivity (SFC) being liquid permeability property of a liquid under load is controlled at $1[\times 10^{-7} \cdot cm^3 \cdot s \cdot g^{-1}]$ or more, $30[\times 10^{-7} \cdot cm^3 \cdot s \cdot g^{-1}]$ or more, $45[\times 10^{-7} \cdot cm^3 \cdot s \cdot g^{-1}]$ or more, $50[\times 10^{-7} \cdot cm^3 \cdot s \cdot g^{-1}]$ or more, $70[\times 10^{-7} \cdot cm^3 \cdot s \cdot g^{-1}]$ or more, $100[\times 10^{-7} \cdot cm^3 \cdot s \cdot g^{-1}]$ or more. SFC is a well-known measuring method, and can be defined by the method described, for example, in U.S. Pat. No. 5,562,646. The water absorbent resin powder of the present invention, in which a ratio of closed-cell is controlled, can realize both of high SFC and high FSR. An upper limit of SFC can be appropriately determined, but from balance with other physical properties, preferably, is around $1000[\times 10^{-7} \cdot cm^3 \cdot s \cdot g^{-1}]$.

A preferable range of SFC is 20 to $150[\times 10^{-7} \cdot cm^3 \cdot s \cdot g^{-1}]$. SFC is a well-known measuring method, and can be defined by the method described, for example, in U.S. Pat. No. 5,562,646. A water absorbent resin powder which is controlled a ratio of closed-cell in the present invention, can realize both of high SFC and high FSR.

When the present invention is applied to improvement in liquid permeability, among it, improvement in SFC, particularly, SFC in the aforementioned range, particularly a process for producing a water absorbent resin powder of high liquid permeability, in which SFC is $20[\times 10^{-7} \cdot cm^3 \cdot s \cdot g^{-1}]$ or more, the effect is remarkably exerted, being preferable.

Further, even when the water absorbent resin powder of the present invention (particularly, the first water absorbent resin powder in which a ratio of internal gas bubbles is controlled, or the second water absorbent resin powder in which a surfactant is contained in the interior and on a surface) is a water absorbent resin powder having high liquid permeability that SFC is $45[\times 10^{-7} \cdot cm^3 \cdot s \cdot g^{-1}]$ or more, $50[\times 10^{-7} \cdot cm^3 \cdot s \cdot g^{-1}]$ or more, further $100[\times 10^{-7} \cdot cm^3 \cdot s \cdot g^{-1}]$ or more, as described in Examples later, a SFC lowering width due to damage can be made to be preferably $15[\times 10^{-7} \cdot cm^3 \cdot s \cdot g^{-1}]$ or less, more preferably $10[\times 10^{-7} \cdot cm^3 \cdot s \cdot g^{-1}]$ or less, particularly preferably $5[\times 10^{-7} \cdot cm^3 \cdot s \cdot g^{-1}]$ or less, and the powder is excellent in damage resistance.

(4-4) Ext (Water-Extractable Polymer Content)

A water-extractable polymer content is preferably 35% by weight or less, more preferably 25% by weight or less, further preferably 15% by weight or less, particularly preferably 10% by weight or less.

(4-5) FSR (Free Swelling Rate)

As one example of a means for attaining the polymerization (foaming polymerization), in the water absorbent resin powder of the present invention, a free swelling rate (FSR) of 1 g of a water absorbent resin powder of 20 g of a saline is usually 0.05 [g/g/s] or more, preferably 0.1 [g/g/s] or more, more preferably 0.15 [g/g/s] or more, further preferably 0.20 [g/g/s] or more, particularly preferably 0.25 [g/g/s] or more. An upper limit is preferably 0.50 [g/g/s] or less, more preferably 1.0 [g/g/s] or less. A method of measuring FSR is defined in International Publication No. WO 2009/016055 pamphlet. The water absorbent resin powder of the present invention, in which a ratio of internal gas bubbles is controlled, can realize both of high SFC and high FRS.

(4-6) Bulk Density

A bulk density of a water absorbent resin powder is usually 0.58 to 0.8 (the same meaning as that of 0.58 to 0.80) [g/cm$^3$], preferably 0.6 to 0.8 (the same meaning as that of 0.60 to 0.80) [g/cm$^3$], more preferably 0.63 to 0.77 [g/cm$^3$], further preferably 0.66 to 0.74 [g/cm$^3$]. In suitable one embodiment of the present invention, the powder has internal gas bubbles (another name; porous structure), and has a high bulk density.

In addition, Table 5.6 of Non-Patent Literature 1 discloses a bulk density of a commercially available water absorbent resin powder (there is no detailed description of a measuring method). Specifically, a fact that Aquakeep is 0.4430 [g/cm$^3$], Sanwet IM-1000 is 0.5624 [g/cm$^3$], and Drytech510 is 0.8989 [g/cm$^3$] is disclosed, and in the present invention, it is preferable that a bulk density is controlled in the aforementioned range. A bulk density can be controlled by the production process of the present invention.

(4-7) Surface Tension

A surface tension (defined by a measuring method in Examples) is preferably 60 [mN/m] or more, more preferably 65 [mN/m] or more, further preferably 67 [mN/m] or more, particularly preferably 70 [mN/m] or more, most preferably 72 [mN/m] or more, and there is no substantial lowering in a surface tension. It is sufficient that an upper limit is usually 75 [mN/m]. When a surface tension is lower than a desired lower limit value, surface wettability of a swollen gel is increased, and a dry feeling is deteriorated, and under coexistence with a pulp, since a suction power of an aqueous solution such as urine from a pulp is reduced, a return amount is increased in some cases.

(4-8) Ratio of Internal Gas Bubbles and a Novel Water Absorbent Resin Powder

A water absorbent resin powder obtained by the aforementioned production process of the present invention has preferably a predetermined amount of voids in the interior thereof. A suitable surface crosslinking agent described in the above provides a novel water absorbent resin powder having a cyclic dehydration reactive surface crosslinking agent and, further, a ratio of internal gas bubbles (a content of gas bubbles in the interior of a water absorbent resin powder, another name; void ratio, ratio of closed-cell) in a particular range.

That is, in order to solve the aforementioned problems, the present invention provides a polyacrylic acid-based water absorbent resin powder, which has been surface-crosslinked with a cyclic dehydration reactive crosslinking agent, wherein a ratio of internal gas bubbles (another name;

ratio of closed-cell) defined by the following equation is 2.8 to 6.6%.

(Ratio of internal gas bubbles [%])={(true density [g/cm$^3$])−(apparent density [g/cm$^3$])}/(true density [g/cm$^3$])×100

Herein, a true density [g/cm$^3$] regarding a water absorbent resin powder which has been sufficiently dried (a moisture content of less than 1% by weight is preferable, less than 0.5% by weight is more preferable, less than 0.1% by weight is particularly preferable) is determined unambiguously by a chemical composition (a repetition unit and others of a polymer, additionally, a minor raw material such as a crosslinking agent, an arbitrarily used graft component). Therefore, a polyacrylic acid-based water absorbent resin powder has a slight difference derived from a neutralization rate, a kind of a salt thereof (e.g. neutralization rate of 75 mole % of sodium polyacrylate) and a minor raw material, but exhibits an approximately constant value.

Figure 2:
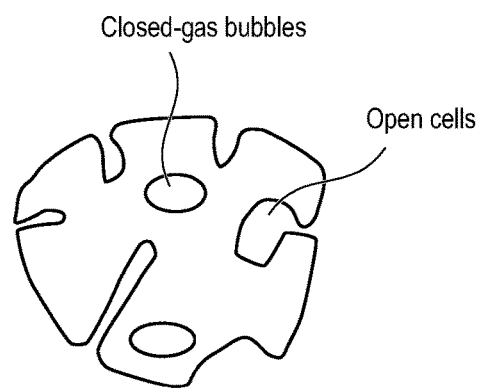
FIG. 2 is a cross-sectional view showing schematically a closed-gas bubble and an open-gas bubble in a water absorbent resin powder.

The aforementioned true density is determined by a chemical composition (mainly repetition unit), while an "apparent density" of a water absorbent resin powder is a density in view of voids (another name; gas bubbles, particularly closed-cell) in the interior of the particle. Specifically, a water absorbent resin obtained by foaming polymerization, and a water absorbent resin via a granulation step have a space (closed fine pore; void; closed-cell) which is not communicated with the outside, in the interior thereof, as shown in FIG. 2. For this reason, when a density of a water absorbent resin is measured by dry density measurement, since an introduced gas cannot reach a closed fine pore, a measured density becomes an apparent density obtained from a volume containing a closed fine pore (closed-cell).

In the present description, a significant digit of a measured value of an apparent density and a true density is appropriately determined with a measuring device or the like, and, for example, is three or four places of decimals. Also, as to an apparent density of a water absorbent resin powder, Non-Patent Literature 1, p. 197-199 discloses wet measurement for obtaining an apparent density of a water absorbent resin powder after 40 to 60 mesh-Cut, in which a volume is obtained with methanol, but an apparent density of the present invention is defined by the aforementioned dry measurement regarding a whole particle size. A ratio of internal voids defined by such apparent density is important for a water absorbent resin powder.

Herein, a density of a water absorbent resin powder can be correctly measured by dry density measurement using a predetermined gas. The measurement principle of dry density measurement of a solid is well-known in a method of constant volume inflation which is a method of obtaining a volume of a solid with a particular gas. Specifically, when a volume VCELL of a sample chamber and a volume VEXP of an inflation chamber are known, a volume VSAMP of a sample is obtained by measuring a pressure (gauge pressure) P1g and P2g, and a mass of a sample is measured separately, and a density can be obtained by dividing the mass with a volume (reference; Shimadzu Corporation homepage; http://www.shimadzu.co.jp/powder/lecture/middle/m04.html).

Since a true density is unambiguously determined by a chemical composition (mainly a repetition unit of a polymer), a known value may be used as it is. Since there is slight change depending on a minor raw material of a water absorbent resin powder, then the known value is unclear, a true density may be obtained by a method described later.

In the present invention, a true density is obtained by destructing closed-cell in a powder or converting them into open-cell by pulverizing to fine powder by a method described below (see, FIG. 3) and, thereafter, measuring a dry density of a water absorbent resin powder which has substantially lost closed-pulverizing to. Herein, open-cell are gas bubbles communicating with the exterior, and since they are not counted as a volume of a powder, upon measurement of a dry density of a powder, closed-cell and open-cell can be easily discriminated by dry density measurement of a powder.

A ratio of internal gas bubbles (defined by a measurement method of Examples) of the polyacrylic acid (salt)-based water absorbent resin powder of the present invention is preferably 0.5% or more, 1.0 to 8.0%, 1.3 to 6.7%, 2.8 to 6.6%, preferably 3.0 to 6.5%, further preferably 3.5 to 6.5%, particularly preferably 3.8 to 6.5%, most preferably 4.0 to 6.5%. When a ratio of internal gas bubbles is less than 0.5%, the effect of improving a free swelling rate (FSR) is small and, conversely, when a ratio of internal gas bubbles exceeds 6.6%, particularly 8.0%, since damage resistance is reduced, and saline flow conductivity (SFC) is reduced accompanying it, being not preferable. Such ratio of internal gas bubbles can be appropriately controlled by a gas bubble content at polymerization, a drying temperature (more inflation at a higher temperature) and the like, in the production process of the present invention.

Previously, in order to improve a free swelling rate, foaming polymerization of a water absorbent resin powder has been known. However, by the previous foaming polymerization, representative of which is U.S. Patent No. 61/007,358, corresponding present application Comparative Example 1-1 and the like, it was difficult to control a ratio of internal gas bubbles. As a result, since a water absorbent resin powder contains excessive internal gas bubbles exceeding 6.6%, and a large amount of a surfactant (e.g. 0.1 to 10% by weight) is used for foaming as in Patent Literatures 28 and 29, there was a problem that a surface tension of the resulting water absorbent resin powder is reduced (particularly, less than 60[mN/m], further less than 55 [mN/m]), and fine powders are generated (particularly, 10% by weight or more) by excessive foaming.

Non-Patent Literature 1 p. 197-199 and Table 5.6, regarding commercially available (polyacrylic acid-based) water absorbent resins (5 kinds), discloses a BET surface area, a free swelling rate, a water absorption capacity, a bulk density and an apparent density of 40 to 60 mesh-Cut (corresponding to powders of upper and lower limits of 425 to 250 μm) products.

Such Non-Patent Literature 1 discloses a fact that, as a specific numerical value of an apparent density by a methanol wet method, trade name Arasorb720 (Arakawa Chemical Industries, Ltd.) and Sanwet IM-1000 (Sanyo Chemical Industries, Ltd.) are 1.500 [g/cm$^3$], Aridall 1078 (American Colloid) is 1.250 [g/cm$^3$], Aquakeep (Sumitomo Seika Chemicals Co., LTD.) and Drytech510 (Dow Chemical) are 1.667 [g/cm$^3$]. That is, Non-Patent Literature 1 discloses five kinds of commercially available water absorbent resins having an apparent density of 1.250 to 1.667 [g/cm$^3$].

In Non-Patent Literature 1, an apparent density (methanol wet method) in 40 to 60 mesh-Cut products is also different from a dry density at a whole particle size in the present application, and there is no description of individual true densities and a chemical composition thereof, but if it is postulated that a true density 1.667 [g/cm$^3$] of Aquakeep (reverse phase suspension polymerization•spherical particle) is approximately a true density, and all of five kinds of commercially available water absorbent resins listed in Table 5.6 have the same chemical composition, ratios of internal gas bubbles of commercially available water absorbent resins (Table 5.6) are roughly classified into a 0% type or a type near 0% (Aquakeep, Drytech510), and a type of about 10 to 25% (Arasorb720, Sanwet 1M-1000, Aridall 1078) under the aforementioned postulation. On the other hand, the present invention is characterized in that a ratio of internal gas bubbles (2.8 to 6.6%) and a particle size are controlled in a particular narrow range (a ratio of a particle size of 850 to 150 μm is 95% by weight or more).

And, U.S. Pat. No. 5,856,370 discloses a porous water absorbent resin in which a density in the dry state exceeds 1.0 [g/cm$^3$], and a density in the swollen state (measured with a specific gravity bottle) is 1.0 [g/cm$^3$], by using an azo compound, but does not disclose a particular ratio of internal gas bubbles and particle size of the present invention.

It was found out that, when a ratio of internal gas bubbles defined in the present invention exceeds 6.6%, liquid permeability (SFC) and impact resistance are reduced as in Comparative Examples described later, and the present invention is characterized in that a ratio of internal gas bubbles which has not been paid attention at all in the previous foaming polymerization is controlled.

Such water absorbent resin powder of the present invention is obtained by foaming polymerization, but since it has high impact resistance, it generates little fine powders, and shows a ratio of a particle size of 850 to 150 μm of 95% by weight and, further, upper and lower limits (850 to 150 μm/further 710 μm to 150 μm) of the aforementioned (2-6) range, and a weight average particle diameter (D50). Previously, in order to improve a free swelling rate, the technique of reducing a particle size as in Patent Literature 10 has been known, but such procedure is accompanied with increase of fine powders, while there is no such problem in the present invention. A further suitable particle size of the water absorbent resin powder of the present invention is as described above (2-6).

Although such water absorbent resin powder (water absorbent resin) of the present invention is obtained by foaming polymerization, since a large amount of a surfactant (e.g. 0.1 to 10 weight %) is not necessary for foaming as in Patent Literatures 28 and 29, there isn't lowering in a surface tension, and the powder exhibits a surface tension of 60 [mN/m] or more, further, a surface tension in a range of (4-7) described later. A surface tension can be adjusted by a kind and a use amount of a surfactant, and is preferably used in a range of (2-1).

That is, the water absorbent resin powder of the present invention in which the production process of the present invention (solubility of gas is reduced) is one example of production process, is a polyacrylic acid-based water absorbent resin powder having a ratio of a particle size of 850 to 150 μm of 95% by weight or more, preferably 98% by weight or more, particularly preferably 99% by weight or more, wherein a surface tension is 60[mN/m] or more, and a ratio of internal gas bubbles defined by the aforementioned equation is 2.8 to 6.6%.

Such water absorbent resin powder of the present invention is obtained, for example, by a production process comprising the aforementioned surface crosslinking, particularly, surface crosslinking to the aforementioned range of CRC and, preferably, the water absorbent resin powder has a water absorption capacity under load (AAP) at a load of 50 [g/cm$^2$] of 15 [g/g] or more. A preferable range of AAP is described below, and when AAP is low, or when a water absorbent resin concentration is high in a paper diaper, sufficient water absorbing performance is not exerted, in some cases.

Such water absorbent resin powder of the present invention is obtained, for example, by a production process comprising the aforementioned surface crosslinking, particularly, surface crosslinking to the aforementioned range of CRC and, preferably, the powder has saline flow conductivity (SFC) of 20[×10$^{-7}$·cm$^3$·s·g$^{-1}$] or more.

It is preferable that such water absorbent resin powder further contains a liquid permeability improving agent selected from a polyvalent metal cation, a polyamine polymer and a water-insoluble fine particle exemplified in (2-6), in the surface crosslinking. By inclusion of these liquid permeability improving agents, both of a free swelling rate and liquid permeability are realized at a higher level. And, Anti-Caking property at moisture absorption is also improved.

Such water absorbent resin powder of the present invention, preferably, further contains a surfactant by a procedure exemplified in (2-1) or (2-2). By inclusion of a surfactant, a water absorbent resin powder which is more excellent in impact resistance can be obtained. A suitable use amount is in the aforementioned range and, preferably, a surfactant is added as an aqueous solution.

Such water absorbent resin powder of the present invention, preferably, further contains a surfactant in the aforementioned range or in the aforementioned range of a surface tension, by using a surfactant at polymerization or before and after surface crosslinking.

Such water absorbent resin powder of the present invention can be made to be a water absorbent resin powder which is further excellent in weather resistance, by further containing p-methoxyphenol (MEHQ) at preferably 5 to 60 ppm, more preferably 5 to 40 ppm, further preferably 5 to 30 ppm, as shown in (2-1). When p-methoxyphenol is excessive, a water absorbent resin powder is colored in some case, and when p-methoxyphenol is small, weather resistance is reduced in some cases. In addition, Non-Patent Literature 1 "2.5.3 Inhibition" (polymerization inhibitor) (p. 39-44) discloses a fact in Table 2.5 that p-methoxyphenol in commercially available water absorbent resins (8 kinds) is 16 to 151 ppm, but such Non-Patent Literature 1 does not disclose the effect of the present application (prevention of coloration and improvement in weather resistance by control in a particular range).

A part of p-methoxyphenol is consumed in a step of producing a water absorbent resin (particularly a polymerization step and a drying step). For this reason, an amount of p-methoxyphenol can be adjusted by adjustment at the polymerization step and the drying step, and in a water absorbent resin of a final product in accordance with the method, for example, described in International Application No. PCT/JP2010/067086. Specifically, the aforementioned neutralization step is performed with a basic substance having an iron content of 0 to 7 ppm; the polymerization step is a step of performing aqueous solution polymerization or reverse phase suspension polymerization of an aqueous monomer solution containing 90 to 100 mole % of acrylic acid (salt) and having a monomer concentration of 30 to 55% by weight using 0.001 to 1 mole % of a radical polymerization initiator under the condition of a maximum reaching temperature at polymerization of 130° C. or lower and a polymerization time of 0.5 minute to 3 hours; the drying step is a step of drying a particulate water-containing gel-like crosslinking polymer obtained in the polymerization step (including a grain refining step) to a moisture content of 20% by weight or less at a drying temperature of 100 to 250° C. for a drying time of 10 to 120 minutes; the surface crosslinking step is a step of mixing 0.001 to 10 parts by weight of a surface crosslinking agent relative to 100 parts by weight of the water absorbent resin powder after drying, at a temperature of 70 to 300° C. for 1 minute to 2 hours; and a content of p-methoxyphenol of the resulting water absorbent resin powder can be made to be 5 to 60 ppm via the above steps.

It is preferable that such water absorbent resin powder of the present invention further contains an additive selected from a chelating agent, α-hydroxycarboxylic acid, and an inorganic or organic reducing agent, as shown in (2-9). Due to such additive, since a surface area is great, usually, coloration and/or durability become a problem, but coloration and/or durability are improved in the present invention.

And, such water absorbent resin contains a predetermined amount of a moisture content (defined in Examples) of preferably 15% by weight or less, more preferably 0.1 to 10% by weight, further preferably 1 to 8% by weight. When the moisture content is low, a water absorbent speed (e.g. FSR) and impact resistance are reduced and, conversely, when a moisture content is high, there is a tendency that a water absorption capacity without load (CRC) and an absorption capacity under load (AAP) are reduced. In addition, a moisture content can be controlled by adjustment of a heating temperature and a time after polymerization, or addition of water.

(Various Physical Properties Suitable for the Present Invention)

That is, a polyacrylic acid-based water absorbent resin powder having a ratio of a particle size of 850 to 150 μm of 95% by weight, wherein the water absorbent resin powder is preferably surface-crosslinked, and a ratio of internal gas bubbles defined by the following equation is 2.8 to 6.6%.

Such water absorbent resin is preferably surface-crosslinked with an alkylene carbonate compound and a polyhydric alcohol compound. Further, preferably, the water absorbent resin is crosslinked with an ion binding surface crosslinking agent.

Preferable physical properties is in a range described in (4-1) to (4-8), particularly, saline flow conductivity is $20[\times 10^{-7} \cdot cm^3 \cdot s \cdot g^{-1}]$ or more and a free swelling rate (FSR) is 0.25 [g/g/s] or more. Preferably, a water absorption capacity without load (CRC) is 25 [g/g] or more, and a water absorption capacity under load (AAP) of a load 50 [g/cm$^2$] is 15 [g/g] or more. Preferably, a water absorption capacity without load (CRC) is 25 [g/g] or more, and saline flow conductivity (SFC) is $20[\times 10^{-7} \cdot cm^3 \cdot s \cdot g^{-1}]$ or more.

Further, the water absorbent resin powder of the present invention, preferably, further contains one or more liquid permeability improving agents selected from the group consisting of a polyvalent metal cation, a polyamine polymer and a water-insoluble fine particle. And, the water absorbent resin powder, preferably, further contains a surfactant. The water absorbent resin powder further contains p-methoxyphenol at 5 to 60 ppm. And, preferably, the water absorbent resin powder further contains one or more of additives selected from the group consisting of a chelating agent, α-hydroxycarboxylic acid (salt), and an inorganic or organic reducing agent.

(4-9) Residual Ethylene Glycol Content

The present inventors found out that, even in a water absorbent resin not using a monomer and ethylene glycol as a crosslinking agent at all, ethylene glycol is contained in some cases, and pursued the origin of such ethylene glycol and, as a result, found out that it is impurities in a raw material (particularly, ethylene glycol derivative; e.g. ethylene carbonate and polyethylene glycol) used in a surface crosslinking agent or a degradation product in a prepared surface crosslinking agent, particularly a degradation product. Further, when physical properties (particularly, a water absorption capacity under load and liquid permeability under load) and the like are improved using alkylene carbonate (particularly, ethylene carbonate) as a surface crosslinking agent, since a large amount of a surface crosslinking agent and a reaction at a high temperature are necessary, it was found out that even in the case of a water absorbent resin not using ethylene glycol in a raw material at all, or even when a raw material of high purity in which ethylene glycol and ethylene glycol-based impurities contained in alkylene carbonate such as ethylene carbonate are substantially zero is used, ethylene glycol is produced as a byproduct in a final product.

Like this, the present invention is based on finding that not only when a content of ethylene glycol in a particulate water absorbing agent is reduced by enhancing a purity of a raw material, but also when a raw material (particularly, ethylene carbonate) of a high purity in which ethylene glycol and ethylene glycol-based impurities are substantially zero is used in order to attain high physical purity, ethylene glycol is produced as a byproduct.

The present inventors found out that, previously, when physical properties (particularly, a water absorption capacity under load, liquid permeability under load and the like) is improved using an alkylene carbonate compound (particularly, ethylene carbonate) as a surface crosslinking agent, even in a water absorbent resin not using ethylene glycol in a raw material at all, and also even in a water absorbent resin using a raw material of a high purity in which ethylene glycol is substantially zero, ethylene glycol at an amount far exceeding an amount of ethylene glycol as a raw material or impurities is produced as a byproduct in a final product. Such ethylene glycol caused not only a problem of safety, but also a variety of problems, but in the present invention, a novel water absorbent resin having no such problems is provided.

In addition, an alkylene carbonate compound remains little in a water absorbent resin powder, by performing the aforementioned production process (usually N.D.).

(4-10) Particularly Preferable Water Absorbent Resin Composition and Physical Properties The present invention provides a water absorbent resin powder which is safe and of high physical properties (second water absorbent resin) by the aforementioned process for producing a water absorbent resin powder. The first and second water absorbent resins preferably satisfy various physical properties and compounds with "and".

That is, the present invention provides a polyacrylic acid (salt)-based water absorbent resin powder comprising less than 1000 ppm of ethylene glycol, 1000 to 10000 ppm of a C3-C6 polyhydric alcohol, and an ion binding surface crosslinking agent.

A further preferable range is that ethylene glycol is preferable in an order of less than 900 ppm, less than 800 ppm, and less than 700 ppm, and a C3-C6 polyhydric alcohol is preferable in an order of 1000 to 8000 ppm, 1000 to 6000 ppm, and 1000 to 4000 ppm. A lower limit of the ethylene glycol content is preferably 100 ppm or more, more preferably 300 ppm or more in a water absorbent resin powder. Among a C3-C6 polyhydric alcohol, a C3 diol, particularly, propylene glycol is preferable. A further preferable range of a content of an ion binding surface crosslinking agent is in accordance with an addition amount described in (2-9) a step of adding an additive.

Further, this water absorbent resin powder is preferably such that a water absorption capacity without load (CRC) is 25 to 35 [g/g], and saline flow conductivity (SFC) is 45 to 150[×$10^{-7}$·cm³·s·g$^{-1}$]. Further preferably, saline flow conductivity (SFC) is preferable in an order of 50 to 150[×$10^{-7}$·cm³·s·g$^{-1}$], 70 to 150[×$10^{-7}$·cm³·s·g$^{-1}$], and 100 to 150[×$10^{-7}$·cm³·s·g$^{-1}$].

Further, from a view point of a free swelling rate (FSR), a range is the range described in (4-8) a ratio of internal gas bubbles and a novel water absorbent resin powder and, specifically, a ratio of internal gas bubbles is preferable in an order of 0.5% or more, 0.5% or more, 1.0 to 8.0%, 1.3 to 6.7%, 2.8 to 6.6%, 3.0 to 6.5%, 3.5 to 6.5%, and 3.8 to 6.5%.

It is preferable that a water absorbent resin powder contains α-hydroxycarboxylic acid and/or a surfactant as described above.

A water absorbent resin powder of the aforementioned composition is excellent in conveyability, and lowering in physical properties hardly occurs in a conveying step at a user. From a view point of a free swelling rate (FSR), even when a granulated particle is used, or the ratio of internal gas bubbles is high, since a resin hardly undergoes conveyance damage, lowering in physical properties hardly occurs.

[5] EXAMPLES

The invention will be explained below according to Examples, but the present invention is not construed to be limited to Examples. Various physical properties described in claims and Examples of the present invention were obtained according to the following measurement methods (5-1) to (5-15). Unless otherwise is indicated, each step in each Example was performed substantially at a normal pressure (within ±5%, further preferably within 1% of atmospheric pressure), and Examples were carried out without adding change in a pressure by intentional increase in a pressure or decrease in a pressure, in the same step.

(5-1) Weight Average Particle Diameter (D50) and Logarithmic Standard Deviation of Particle Size Distribution (σζ)

In accordance with U.S. Patent Application Publication No. 2006/204755, a weight average particle diameter (D50) and a logarithmic standard deviation of particle size distribution (σζ) were obtained by classification with a standard sieve.

(5-2) CRC (Water Absorption Capacity without Load)

According to ERT441.2-0.2, a water absorption capacity without load (CRC) on a 0.90 wt % aqueous sodium chloride solution (also named as saline) was obtained under no pressure for 30 minutes.

(5-3) Solid Content

A solid content represents a ratio occupied by a component which does not volatilize at 180° C., in a water absorbent resin powder. A relationship with a moisture content ratio is {solid content=100−moisture content ratio}.

A method of measuring a solid content was performed as follows.

About 1 g of a water absorbent resin powder was weighed (weight W4 [g]) into an aluminum cup having a diameter of a bottom of about 5 cm (weight W3 [g]), placed into a windless dryer at 180° C., and allowed to stand for 3 hours to dry. A total weight (W5 [g]) of an aluminum cup and a water absorbent resin powder after drying was measured, and a solid content was obtained by Mathematic 1.

Solid mater [weight %]={(W5−W3)/W4}×100　　　[Mathematic 1]

(5-4) FSR (Free Swelling Rate)

1.00 g of a water absorbent resin powder was placed water absorbent resin into a 25 ml glass beaker (diameter 32 to 34 mm, height 50 mm). Thereupon, an upper plane of a water absorbent resin powder which had been placed in a beaker was adjusted to be horizontal (if necessary, a surface of a water absorbent resin powder may be adjusted to be horizontal, by performing treatment such as careful tapping of a beaker or the like).

Then, 20 g of a 0.90 weight % aqueous sodium chloride solution controlled at 23° C.±0.2° C. was weighed into a 50 ml glass beaker, and a total weight (weight W6 [g]) of the aqueous sodium chloride solution and the glass beaker was measured. Weighed sodium chloride was rapidly poured into a 25 ml beaker containing a water absorbent resin powder in a careful manner. Simultaneously with contact of a poured aqueous sodium chloride solution and a water absorbent resin powder, measurement of a time was started. And, measurement of a time was terminated (time $t_s$ [sec]) at the time of replacement of an upper plane which was first a surface of an aqueous sodium chloride solution into a surface of a water absorbent resin powder having absorbed an aqueous sodium chloride solution, by absorption of an aqueous sodium chloride solution by a water absorbent resin powder, when an upper plane of an aqueous sodium chloride solution in a beaker into which the solution had been poured was seen visually at an angle of about 20°. water absorbent resin water absorbent resin Then, a weight (weight W7 [g]) of a 50 ml glass beaker after pouring of an aqueous sodium chloride solution was measured. A weight (weight W8 [g]) of the poured aqueous sodium chloride solution was obtained from Mathematic 2, and FSR was obtained by Mathematic 3.

W8 [g]=W6−W7　　　[Mathematic 2]

FSR [g/g/sec]=W8/($t_s$×weight of water absorbent resin powder [g])　　　[Mathematic 3]

(5-5) Bulk Density

Using a bulk density measuring equipment (manufactured by Kuramochi Science Kiki Seisakusho Corp.), a bulk density was measured in accordance with JIS K 3362. In order to remove deviation due to a particle size, after 100.0 g of a sufficiently mixed water absorbent resin powder was placed into a funnel with a damper closed, a damper was rapidly opened, and a water absorbent resin powder was fallen into a receiver having a content amount of 100 ml (weight W9 [g]). A water absorbent resin powder which had risen from a receiver was rubbing-fallen with a glass bar, a weight of a receiver containing water absorbent resin powder (weight W10 [g]) was precisely weighed to 0.1 g, and a bulk density was calculated according to Mathematic 4.

Bulk density [g/ml]=(W10−W9)/100　　　[Mathematic 4]

A temperature of environment in which measurement was performed, was 24.2° C., and a relative humidity was 43% RH.

(5-6) Surface Tension 50 ml of saline adjusted at 20° C. was placed into a 100 ml beaker which had been sufficiently washed, and a surface tension of the saline was first measured with a surface tension meter (K11 automatic surface tension meter manufactured by KRUSS). In this measurement, a value of a surface tension must be in a range of 71 to 75 [mN/m].

Then, a rotor made of a fluorine resin having a length of 25 mm which had been sufficiently washed, and 0.5 g of a water absorbent resin powder were placed into a beaker containing the saline after measurement of a surface tension adjusted at 20° C., and these were stirred for 4 minutes under the condition of 500 rpm. After 4 minutes, stirring was stopped, a water absorbent resin powder containing water was settled and, thereafter, a surface tension of the supernatant was measured again by performing the same operation. In the present invention, a plate method using a platinum plate was adopted, and a plate was used by washing with deionized water sufficiently, and heat-washing it with a gas burner before each measurement.

(5-7) Liquid Permeability (SFC)

SFC is by a well-known measurement method, and measurement was performed by the procedure described in U.S. Pat. No. 5,562,646.

(5-8) Whiteness Degree (Initial Coloration)

As initial coloration (coloration immediately after production of water absorbent resin), a whiteness degree is an index showing whiteness of a powder, and is calculated using X, Y and Z values or L, a and b values. Among them, a WB value of a water absorbent resin powder useful for comparing a degree of whiteness was measured using a spectrocolorimeter. In addition, comparing to the initial coloration, coloration during long term preservation (progression) and coloration in a hygiene material (progression) are referred to as coloration with time.

Spectrocolorimeter: Spectrophotometer SE6000 manufactured by Nippon Denshoku Industries Co., Ltd.

Powder charge cell: φ 35 mm, height 15 mm (5-9) Damage Resistance Test

According to the method (mechanical damage test) described in Patent Literature 38 (U.S. Pat. No. 6,562,879) and Japanese Laid-Open Publication "JP-A No. 2000-302876" which is a corresponding patent thereof, a damage was given to a water absorbent resin powder using a vibration time of 10 minutes.

(5-10) Apparent Density (see FIG. 2)

Water in a water absorbent resin powder was further removed, and an apparent density of a powder (in view of closed-cell in the interior of a powder) was measured by dry density measurement (dry measurement with a volume of a water absorbent resin powder at a predetermined weight).

That is, 6.0 g of a water absorbent resin powder was weighed into an aluminum cup having a diameter of a bottom of about 5 cm, allowed to stand in a windless drying machine at 180° C. for 3 hours or longer, and was sufficiently dried to the moisture content rate of 1% or less. An apparent density (weight g/volume cm$^3$) of 5.00 g of a water absorbent resin powder after drying was measured with dry automatic density meter; Micromeritics Auto Pycnometer 1320 manufactured by Shimadzu Corporation using a helium gas. Measurement was repeated until the same measured value was measured continuously two or more times.

Figure 3:
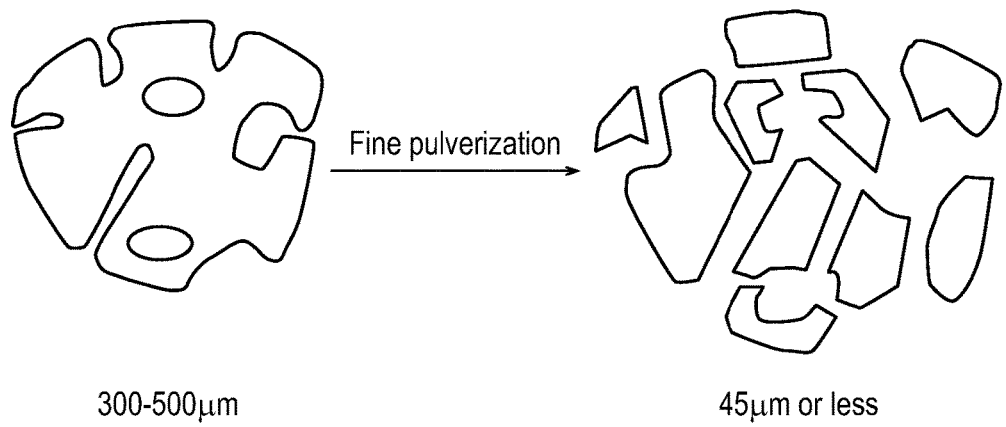
FIG. 3 is a cross-sectional view showing schematically operation of pulverizing a water absorbent resin powder (e.g. a ratio of a particle size of 850 to 150 μm is 95% by weight or more) to fine powder to be into less than 45 μm, for measuring a true density of the present invention.

(5-11) True Density (See FIG. 2, FIG. 3)

Regarding a water absorbent resin powder in which closed-cell in the interior were destructed or changed into open-cell by pulverizing to fine powder into 45 μm passed products with a JIS standard sieve, a true density in the present invention was obtained by measuring a dry density thereof.

A diameter of gas bubbles (closed-cell) contained in the interior of a water absorbent resin is usually 1 to 300 μm. However, upon pulverizing, a portion near gas bubbles is preferentially pulverized, then little closed-cell are contained in a water absorbent resin powder which has been pulverized to 45 μm or less and, therefore, a dry density of a water absorbent resin powder which has been pulverizing to fine powder into 45 μm or less was measured, thereby, this was regarded as true density of a water absorbent resin powder.

Using a water absorbent resin powder which had been ground into JIS standard sieve less than 45 μm, a true density was measured. That is, 400 g of a pillar porcelain ball (diameter 13 mm, length 13 mm) was placed into a ball mill pot (porcelain ball mill pot model No. 90 manufactured by Teraoka Corporation, internal dimension: diameter 80 mm height 75 mm, external dimension: diameter 90 mm height 110 mm), relative to 15.0 g of a water absorbent resin powder, and this was purlverized to fine powder at 60 Hz for 2 hours using a ball mill. As a result, a water absorbent resin powder in which 70% by weight or more of a water absorbent resin powder is a JIS standard sieve 45 μm passed product, was obtained.

Regarding 6.0 g of a water absorbent resin powder of less than 45 μm obtained by further classification with a JIS standard sieve 45 μm, like the apparent density of (5-10), the powder was dried at 180° C. for 3 hours, thereafter, a dry density was measured, and this was adopted as a true density referred in the present invention.

(5-12) Ratio of Internal Gas Bubbles (Another Name; Ratio of Closed-Cell)

Using an apparent density (density ρ1 [g/cm$^3$]) measured by the method described in "(5-10) apparent density", and a true density (density ρ2 [g/cm$^3$]) measured by the method described in "(5-11) true density", a ratio of internal gas bubbles of a water absorbent resin powder was calculated according to the following Mathematic 5.

Ratio of internal gas bubbles [%]=(ρ2−ρ1)/ρ2×100 [Mathematic 5]

(5-13) Amount of Methoxyphenol

According to measurement of a extractables of ERT470.2-02, 1.000 g of a water absorbent resin powder is added to 200 ml of a 0.9 weight % aqueous sodium chloride solution, the mixture was stirred for 1 hour (stirring time is changed from 16 hours to 1 hour), thereafter, the filtrate is analyzed, thereby, an amount of methoxyphenol is obtained.

Specifically, by analyzing the filtrate obtained by analytical operation of ERT470.2-02 (provided that, stirring 1 hour) by high performance liquid chromatography, p-methoxyphenol (relative to water absorbent resin) can be obtained.

(5-14) Weather Resistance Promoting Test (Deterioration Rate)

According to the method described in PCT/JP2010/067086 (WO 2011/040530A1 as publication), weather resistance is defined as an amount of increase in a extractables due to UV irradiation to a 20-fold swollen gel.

A deterioration rate can be calculated from a difference in a 16 hours of extractables (%) between after the deterioration treatment and before the deterioration treatment. In addition, in the following Examples, individual extractables (% by weight) are not particularly described, but all were in a range of 15% by weight or less (10% by weight or less).

A deterioration rate can be calculated from a difference in extractables between the water-containing gel-like water-absorbing agent (after deterioration) and a water absorbent resin powder (before deterioration). In addition, in the following Examples, individual extractables (% by weight) are not particularly described, but all were in a range of 15% by weight or less (10% by weight or less).

(5-15) Content of Residual Ethylene Glycol (1) (Method of Patent Literature 37)

According to Patent Literature 37, after 2 g of a water absorbent resin powder was added to 2 ml of an aqueous methanol solution (mixing ratio of water:methanol=1:2) to allow to stand for 10 minutes, 48 ml of methanol was further added, and a water absorbent resin powder was rinsed while vibration was given using an ultrasound generating device. After rinsing, a methanol solution was separated by filtration, and 30 ml of the solution was evaporated to solidify with an evaporator. The resulting solidified product was dissolved again in 3 ml of an aqueous phosphoric acid carrier solution, to obtain a sample for measuring residual ethylene glycol. By analyzing the resulting measurement sample by liquid chromatography, a content of residual ethylene glycol was quantitated.

(5-16) Content of Residual Ethylene Glycol (2) and a Content of Other Polyhydric Alcohol As compared to Patent Literature 37, in the present application, a method of measuring ethylene glycol at a more precise level is defined below. That is, in Patent Literature 37, ethylene glycol on a surface of a powder resin is rinsed using methanol with which a water absorbent resin powder is not swollen, and this is measured, on the other hand, as a method of measuring ethylene glycol which has further permeated into a surface layer, hereinafter, the layer was swollen with a saline, and ethylene glycol was extracted with a saline.

That is, a 35 mm Teflon (registered trademark) rotor was placed into a 260 ml beaker made of polypropylene, 1 g of a weighed water absorbent resin powder and 100 g of a 0.9 mass % aqueous sodium chloride solution were added, and swollen gel particles (around about 1 mm) were stirred with a magnetic stirrer for 1 hour.

After stirring, the supernatant was sucked with a syringe made of polypropylene, and filtered with Chromatodisc (GL Chromatodisc 25A, manufactured by GL Sciences Inc.). The filtrate was analyzed by liquid chromatography to quantitate a content of residual ethylene glycol and other polyhydric alcohol.

In addition, since (5-15) a content of residual ethylene glycol (1) loses ethylene glycol upon evaporation and solidification in some cases, relative comparison between samples is approximately correct, but not quantitative. Then, as a content of residual ethylene glycol, a value of (5-16) a content of residual ethylene glycol (2) is adopted.

(5-17) Quantitation of Aluminum Cation Amount

A 35 mm Teflon (registered trademark) rotor was placed into a 260 ml beaker made of polypropylene, 1 g of a weighed water absorbent resin powder, 190 g of a 0.9 mass % aqueous sodium chloride solution, and 10 g of 2N hydrochloric acid were added, and the mixture was stirred for 5 minutes using a magnetic stirrer.

After stirring, the supernatant was sucked with a syringe made of polypropylene, and filtered with Chromatodisc (GL Chromatodisc 25A, manufactured by GL Sciences Inc.). The filtrate was analyzed by ICP (plasma emission spectrometry).

Production Example 1

As an apparatus for continuously producing a water absorbent resin powder (production capacity 1500 [kg/hr]), an apparatus composed of a polymerization step, a gel-crushing step, a drying step, a pulverizing step, a classifying step, a surface crosslinking step (spraying step, heat-treating step, cooling step), a second classification step and a transporting step connecting between respective steps was prepared. Under the operation condition of each step described below, the continuous preparation apparatus was operated, and continuous production of a water absorbent resin powder was started. In Production Example 1, up to production of a water absorbent resin particle (a) before surface crosslinking will be described.

First, as a polymerization step, 0.09 mole % (relative to monomer) of polyethylene glycol diacrylate (average n number is 9) as an internal crosslinking agent was added to an aqueous acrylic acid-partially neutralized sodium salt solution of a neutralization rate of 73 mole % (monomer concentration; 38% by weight) to obtain an aqueous monomer solution (a), and this solution was continuously supplied to a polymerization apparatus using a quantitative pump. Thereupon, a nitrogen gas was continuously blown so that an amount of dissolved oxygen in the aqueous monomer solution (a) was 0.5 [mg/L] or less. Subsequently, as a polymerization initiator, sodium persulfate 0.12 g/L-ascorbic acid 0.005 g (relative to 1 mole of monomer) were continuously supplied, respectively, using separate pipings, this was line-mixed, and supplied on a planar steel belt (polymerization apparatus) having a dam on both sides, so that a thickness of the aqueous solution was about 30 mm, and this was allowed to stand for 30 minutes, and aqueous solution polymerization was performed. By the operation, a water-containing gel-like crosslinked polymer (a) was obtained.

Subsequently, as a gel-crushing step, the water-containing gel-like crosslinked polymer (a) obtained in the polymerization step was supplied to a meat chopper having a pore diameter of 7 mm, and gel-crushed into particles having a particle diameter of about 2 mm to obtain a particulate water-containing gel-like crosslinked polymer (a).

Then, as a drying step, the particulate water-containing gel-like crosslinked polymer (a) was placed on a moving porous plate of a continuous ventilation band dryer by spreading, so that a thickness thereof was 50 mm, and dried at 185° C. for 30 minutes. Thereafter, this was cooled with the air outside to obtain a water absorbent resin dried product (a).

Further, as a pulverizing step, an all amount of a water absorbent resin dried product (a) which was obtained by the above operation was continuously supplied to a three-stage roll mill (roll gap; 1.0 mm/0.65 mm/0.42 mm from an upper side), and pulverized and, thereafter, as a classifying step, the product was continuously supplied to a sieve-classifying apparatus having a metal sieve net of a mesh size of 710 μm and 150 μm, and classified. By the aforementioned series of operations, an pulverized non-uniformly shaped water absorbent resin particle (a) was obtained. The resulting water absorbent resin particle (a) had a solid content of 97% by weight, a weight average particle diameter (D50) of 375 μm, a logarithmic standard deviation of a particle size distribution (σζ) of 0.38, and a ratio of internal gas bubbles (another name; ratio of closed-cell) of 0.9%. Various physical properties of the resulting water absorbent resin particle (a) are shown in Table 1.

Production Example 2

As in Production Example 1, as an apparatus for continuously producing a water absorbent resin powder (production capacity 1500 [kg/hr]), an apparatus composed of a polymerization step, a gel crushing step, a drying step, a pulverizing step, a classifying step, a surface crosslinking step (spraying step, heat-treating step, cooling step), a second classification step and a transporting step connecting between respective steps was prepared. Under the operation condition of each step described below, the continuous production apparatus was operated, and continuous production of a water absorbent resin powder was started. In addition, in Production Example 2, up to production of a water absorbent resin particle (b) before surface crosslinking will be described.

In Production Example 2, the same operation as that of Production Example 1 was performed except that the following conditions were changed. That is, the same operation as that of Production Example 1 was performed except that a use amount of polyethylene glycol diacrylate (average n number 9) as an internal crosslinking agent in the polymerization step was changed to 0.06 mole % (relative to monomer), a roll gap of three-stage roll mill in the pulverizing step was changed to 1.0 mm/0.65 mm/0.50 mm from an upper side and, further, a mesh size of a metal sieve net in the classifying step was changed to 850 μm and 150 μm, then a water absorbent resin particle (b) was obtained. The resulting water absorbent resin particle (b) had a solid content of 97% by weight, a weight average particle diameter (D50) of 448 μm, a logarithmic standard deviation of a particle size distribution ($\sigma\zeta$) of 0.41, and a ratio of internal gas bubbles (another name; ratio of closed-cell) of 1.1%. Various physical properties of the resulting water absorbent resin particle (b) are shown in Table 1.

Numbers of Examples

Hereinafter, when the water absorbent resin (a) of Production Example 1 (ratio of internal gas bubbles 0.9%) is used in surface crosslinking, this is called Example 1-X (number). Hereinafter, similarly, when the water absorbent resin (b) of Production Example 2 (the same 1.1%) is used, this is called Example 2-X (number), in the water absorbent resin (c) of Production Example 3 (the same 4.2%), this is called Example 3-X (number), and in the water absorbent resin (d) of Production Example 4 (the same 6.5%), this is called Example 4-X (number).

Example 1-1

(Melting and Storage of Ethylene Carbonate)

As an apparatus for melting ethylene carbonate, a double arm-type kneader of an internal volume 500 L, equipped with a jacket and a blade stirring axis which can flow a heat medium for heating was prepared.

After 300 kg of a solid flake-like (one side is a few mm) ethylene carbonate was placed into the double arm-type kneader, warm water at 80° C. was passed through the jacket and the blade stirring axis, a blade stirring wing was rotated at 10 rpm, and melting of solid ethylene carbonate was started.

At the time at which a temperature of melted ethylene carbonate reached 50° C., stirring was stopped, and ethylene carbonate was transported to an intermediate tank (raw material tank) in the melted (heated) state, and stored. The transport was performed using a transport piping and a pump, which were kept hot by hot water heat tracing at 50° C. A strainer was provided before the pump. And, the intermediate tank (raw material tank) is a tank made of SUS304 of an internal volume 10 $m^3$, and is provided with a heating coil for the purpose of heating or keeping hot a content, and a temperature of an external wall is kept hot for suppressing radiation of heat. Further, for preparing a surface crosslinking agent solution, the tank is connected to a step of producing a water absorbent resin with a pipeline. To control a liquid surface of ethylene carbonate stored in the melted state (liquid temperature about 45° C.), melting was repeatedly performed so as to be in a range of 2 $m^3$ through 8 $m^3$. In addition, in the above operation, ethylene carbonate was stable, and production of ethylene glycol (degradation product of ethylene carbonate) as a byproduct was not substantially recognized.

(Preparation of Surface Crosslinking Agent Solution)

Subsequently, in order to prepare a surface crosslinking agent solution (1-1), a transport piping provided with a mass flowmeter (e.g. corresponding to Coriolis-type mass flowmeter/manufactured by Endress Hauser) which can measure a flow rate and an integrated flow volume, and a control valve for adjusting the flow rate was prepared. A temperature of a piping for transporting ethylene carbonate was retained at 50° C. with hot water heat tracing.

Melted ethylene carbonate at 50° C. obtained above, propylene glycol and deionized water were line-mixed (static mixer etc.) while a flow rate was adjusted using the mass flowmeter so that a predetermined liquid composition (melted ethylene carbonate:propylene glycol:deionized water=0.129:0.194:1 (weight ratio)) was attained and, at the same time, an integrated flow volume was measured to prepare a total liquid amount of 300 kg of a surface crosslinking agent solution (1-1). After preparation of the surface crosslinking agent solution (1-1), a liquid composition thereof was confirmed, and an error was found to be within 0.1%.

(Production of Water Absorbent Resin Powder)

Employing the continuous production apparatus (production capacity 1500 [kg/hr]) prepared in Production Example 1, a water absorbent resin powder (1-1) was produced. In the present Example 1-1, subsequent to Production Example 1, a step of surface-crosslinking a water absorbent resin particle (a) and thereafter will be described.

The surface crosslinking agent solution (1-1) obtained by the above operation was sprayed to a water absorbent resin particle (a) obtained in Production Example 1 with 4.1 parts by weight relative to 100 parts by weight of the water absorbent resin particle (a) using a sprayer, and this was mixed using a high speed continuous mixing machine (Turbulizer; 1000 rpm). Subsequently, the mixture was continuously heat-treated with a heating paddle dryer at 200° C. for 40 minutes, and forcibly cooled to 60° C. with a cooling paddle dryer of the same specification.

An aqueous liquid (1-1) consisting of a 27 weight % (8% by weight in terms of aluminum oxide) aqueous aluminum sulfate solution at 0.80 part by weight, a 60 weight % aqueous sodium lactate solution at 0.134 part by weight and a propylene glycol at 0.016 part by weight was prepared relative to 100 parts by weight of a water absorbent resin particle (1-1) having a crosslinked surface, and uniformly sprayed and mixed in the aforementioned forced cooling.

Then, the mixture was classified with a sieve-classifying device having a metal sieve (JIS standard sieve) of a mesh size of 710 μm. A residual substance on the metal sieve of a mesh size of 710 μm was pulverized again, and mixed with a product which passed through a metal sieve of a mesh size of 710 μm. By the above operation, a classified water absorbent resin powder (1-1) in which a particle diameter of an all amount was less than 710 μm was obtained. Various physical properties of the resulting water absorbent resin powder (1-1) are shown in Table 1.

Example 2-1

After ethylene carbonate was melted and stored by the same method as that of Example 1-1, further, a surface crosslinking agent solution (2-1) was prepared by the same method as that of Example 1-1.

Then, employing the continuous production apparatus (production capacity 1500 [kg/hr]) prepared in Production Example 2, a water absorbent resin powder (2-1) was produced. In the present Example 2-1, subsequent to Production Example 2, a step of surface-crosslinking a water absorbent resin particle (b) and thereafter will be described.

The surface crosslinking agent solution (2-1) obtained in the above operation was sprayed to a water absorbent resin particle (b) obtained in Production Example 2 with 3.7 parts by weight relative to 100 parts by weight of the water absorbent resin particle (b) using a sprayer, this was mixed using a high speed continuous mixing machine (Turbulizer; 1000 rpm). Subsequently, the mixture was continuously heat-treated with a heating paddle dryer at 201° C. for 40 minutes, and forcibly cooled to 60° C. with a cooling paddle dryer of the same specification.

An aqueous liquid (2-1) consisting of a 27 weight % (8% by weight in terms of aluminum oxide) aqueous aluminum sulfate solution at 0.61 part by weight, a 60 weight % aqueous sodium lactate solution at 0.102 part by weight and a propylene glycol at 0.012 part by weight was prepared relative to 100 parts by weight of a water absorbent resin particle (2-1) having a crosslinked surface, and the liquid was uniformly sprayed, and mixed in the aforementioned forced cooling.

Then, the mixture was classified with a sieve classifying device having a metal sieve (JIS standard sieve) of a mesh size of 710 μm. A residual substance on the metal sieve of a mesh size of 710 μm was pulverized again, and mixed with a substance which passed through a metal sieve of a mesh size of 710 μm. By the above operation, a classified water absorbent resin powder (2-1) in which a particle diameter of an all amount was less than 710 μm was obtained. Various physical properties of the resulting water absorbent resin powder (2-1) are shown in Table 1.

Example 1-2

(Melting and Storage of 1,4-Butanediol)

1,4-Butanediol which had been delivered from a maker in the melted state at 40° C. was transported as it was to an intermediate tank (raw material tank) in the melted state, and stored. The transport was performed using a transport piping and a pump which was kept hot by hot water heat tracing at 40° C. A strainer was provided before a pump. And, the intermediate tank (raw material tank) is a tank made of SUS304 of an internal volume of 10 m³, and is provided with a heating coil for the purpose of heating and keeping hot a content, and an external wall is kept hot for suppressing radiation of heat. Further, in order to prepare a surface crosslinking agent solution, the tank is connected to a step of producing a water absorbent resin with a pipeline. To control a liquid surface of 1,4-butanediol (liquid temperature about 40° C.) stored in the melted state, transport was repeatedly performed so as to be in a range of 2 m³ through 8 m³.

(Preparation of Surface Crosslinking Agent Solution)

Subsequently, in order to prepare a surface crosslinking agent solution (1-2), a transport piping provided with a mass flowmeter (e.g. corresponding to Coriolis-type mass flowmeter/manufactured by Endress Hauser) which can measure a flow rate and an integrated flow volume, and a control valve for adjusting a flow rate was prepared. A transport piping for 1,4-butanediol is retained at 40° C. by hot water heat tracing.

Melted 1,4-butanediol at 40° C. obtained above, propylene glycol and deionized water were line-mixed (static mixer etc.) while a flow rate was adjusted using the mass flowmeter, so that a predetermined liquid composition (melted 1,4-butanediol:propylene glycol:deionized water=0.117:0.191:1 (weight ratio)) was attained and, at the same time, an integrated flow volume was measured to prepare a total liquid amount of 300 kg of a surface crosslinking agent solution (3). After preparation of the surface crosslinking agent solution (1-2), a liquid composition thereof was confirmed, and an error was found to be within 0.1%.

(Production of Water Absorbent Resin Powder)

The same operation as that of Example 1-1 was performed except that 4.0 parts by weight of a surface crosslinking agent solution (1-2) obtained by the above operation was used instead of the surface crosslinking agent solution (1-1) in Example 1-1, then a water absorbent resin powder (1-2) was obtained. Various physical properties of the resulting water absorbent resin powder (1-2) are shown in Table 1.

Example 2-2

After melting and storage of 1,4-butanediol were performed by the same method as that of Example 1-2, further, a surface crosslinking agent solution (2-2) was prepared by the same method as that of Example 1-3.

Then, using the continuous production apparatus (production capacity 1500 [kg/hr]) prepared in Production Example 2, a water absorbent resin powder (2-2) was produced. In the present Example 2-2, subsequent to Production Example 2, a step of surface-crosslinking a water absorbent resin particle (b) and thereafter will be described.

the surface crosslinking agent solution (2-2) obtained by the above schedule was sprayed to a water absorbent resin particle (b) obtained in Production Example 2 with 3.6 parts by weight relative to 100 parts by weight of the water absorbent resin particle (b) using a sprayer, and this was mixed using a high speed continuous mixing machine (Turbulizer; 1000 rpm). Subsequently, the mixture was continuously heat-treated with a heating paddle dryer at 201° C. for 40 minutes, and forcibly cooled to 60° C. with a cooling paddle dryer of the same specification.

An aqueous liquid (2-2) consisting of a 27 weight % (8 weight % in terms of aluminum oxide) aqueous aluminum sulfate solution at 0.61 parts by weight, a 60 weight % aqueous sodium lactate solution at 0.102 part by weight and propylene glycol at 0.012 part by weight was prepared relative to 100 parts by weight of a water absorbent resin particle (2-2) having a crosslinked surface, and this was uniformly sprayed, and mixed in the aforementioned forced cooling.

Then, the mixture was classified with a sieve classifying device having a metal sieve (JIS standard sieve) of a mesh size of 710 μm. A residual substance on a metal sieve of a mesh size of 710 μm was pulverized again, and mixed with a substance which had passed through a metal sieve of a mesh size of 710 μm. By the above operation, a classified water absorbent resin powder (2-2) in which a particle diameter of an all amount was less than 710 μm was obtained. Various physical properties of the resulting water absorbent resin powder (2-2) are shown in Table 1.

Example 1-3

After melting and storage of ethylene carbonate were performed by the same method as that of Example 1-1, a surface crosslinking agent solution (1-3) was prepared by the following method.

That is, the same operation as that of Example 1-1 was performed except that a 27 weight % aqueous aluminum sulfate solution was line-mixed (static mixer etc.) with the surface crosslinking agent solution (1-1) of Example 1-1 while a flow rate was adjusted using a mass flowmeter, so that a predetermined liquid composition (melted ethylene carbonate:propylene glycol:27 weight % aqueous aluminum sulfate solution:deionized water=0.178:0.297:0.5:1 (weight ratio)) was attained, a surface crosslinking agent solution (1-3) was obtained.

Thereafter, the same operation as that of Example 1-1 was performed except that 3.9 parts by weight of the surface crosslinking agent solution (1-3) obtained by the above operation was used in place of the surface crosslinking agent solution (1-1) in Example 1-1 and, further, nothing was added at forced cooling, a water absorbent resin powder (1-3) was obtained. Various physical properties of the resulting water absorbent resin powder (1-3) are shown in Table 1.

Example 2-3

After melting and storage of ethylene carbonate were performed by the same method as that of Example 2-1, a surface crosslinking agent solution (2-3) was prepared by the following method.

That is, the same operation as that of Example 2-1 was performed except that a 27 weight % aqueous aluminum sulfate solution was line-mixed (static mixer etc.) with the surface crosslinking agent solution (2-1) of Example 2-1 while a flow rate was adjusted using a mass flowmeter, so that a predetermined liquid composition (melted ethylene carbonate:propylene glycol:27 weight % aqueous aluminum sulfate solution:deionized water=0.178:0.297:0.5:1 (weight ratio)) was attained, a surface crosslinking agent solution (2-3) was obtained.

Thereafter, the same operation as that of Example 2-1 was performed except that 3.5 parts by weight of the surface crosslinking agent solution (2-3) obtained by the above operation was used in place of the surface crosslinking agent solution (2-1) in Example 2-1 and, further, nothing was added at forced cooling, a water absorbent resin powder (2-3) was obtained. Various physical properties of the resulting water absorbent resin powder (2-3) are shown in Table 1.

Example 5-1

As an apparatus for melting ethylene carbonate, a cylindrical tank of an internal volume of 1000 L, equipped with a jacket and a coil which can flow a heat medium for heating, and a stirring machine was prepared.

After 700 kg of solid ethylene carbonate was placed into the cylindrical tank, warm water at 80° C. was passed through the jacket and the coil, a stirring wing was rotated at 100 rpm, and melting of solid ethylene carbonate was started.

At the time at which a temperature of melted ethylene carbonate reached 50° C., stirring was stopped, and ethylene carbonate was transported to an intermediate tank (raw material tank) in the melted (heated) state. The transport was performed using a transport piping which was kept hot by hot water heat tracing at 50° C. and a pump. A strainer was provided before a pump. The intermediate tank (raw material tank) is a tank made of SUS304 of an internal volume of 10 m$^3$, and is provided with a heating coil for the purpose of heating and keeping hot a content, and an external wall is kept hot for suppressing radiation of heat. Further, in order to prepare a surface crosslinking agent solution, the tank is connected to a step of producing a water absorbent resin with a pipeline. To control a liquid surface of ethylene carbonate (liquid temperature about 45° C.) stored in the melted state, melting was repeatedly performed so as to be in a range of 2 m$^3$ through 8 m$^3$. In the above operation, ethylene carbonate was stable, and production of ethylene glycol (degradation product of ethylene carbonate) as a byproduct was not substantially recognized.

Example 5-2

As an apparatus for melting ethylene carbonate, a cylindrical tank of an internal volume of 500 L, equipped with a jacket which could flow a heat medium for heating, and a stirring wing was prepared.

After 300 L of deionized water at a normal temperature was placed into the cylindrical tank, warm water was passed at 50° C. through the jacket, a stirring wing was rotated at 10 rpm, and a temperature of deionized water was controlled at 40° C. Then, 45 kg of solid ethylene carbonate which had been stored in a cold dark place at 30° C. or lower was placed into the cylindrical tank to melt.

An aqueous ethylene carbonate solution obtained by the above operation was transported to an intermediate tank of an internal volume of 500 L, and transiently stored. In the above operation, ethylene carbonate was stable, and production of ethylene glycol (degradation product of ethylene carbonate) as a byproduct was not substantially recognized.

Example 5-3

Ethylene carbonate which had been delivered in the solid state by a container equipped with a jacket for heating was melted and stored by the following method. That is, a water steam or warm water at 50° C. or more was passed through the jacket of the container to completely melt solid ethylene carbonate.

At the time at which a temperature of melted ethylene carbonate reached 50° C., stirring was stopped, and ethylene carbonate was transported to an intermediate tank (raw material tank) in the melted (heated) state. The transport was performed using a transport piping which was kept hot by hot water heat tracing at 50° C., and a pump. A strainer was provided before the pump. And, the intermediate tank (raw material tank) is a tank made of SUS304 of an internal volume of 10 m$^3$, and is provided with a heating coil for the purpose of heating and keeping hot a content, and an external wall is kept hot for suppressing radiation of heat. Further, in order to prepare a surface crosslinking agent solution, the tank is connected to a step of producing water absorbent resin with a pipeline. To control a liquid surface of ethylene carbonate stored in the melted state, melting was repeatedly performed so as to be in a range of 2 m$^3$ through 8 m$^3$. In the above operation, ethylene carbonate was stable, and production of ethylene glycol (degradation product of ethylene carbonate) as a byproduct was not substantially recognized.

Example 5-4

Ethylene carbonate in the melted state at 50 to 60° C. was delivered, and was transported as it was to an intermediate tank (raw material tank) in the melted state. The transport was performed using a transport piping which was kept hot with hot water heat tracing at 50° C. and a pump. A strainer was provided before the pump. And, the intermediate tank (raw material tank) is a tank made of SUS304 of an internal volume of 10 m³, and is provided with a heating coil for the purpose of heating and keeping hot a content, and an external wall is kept hot for suppressing radiation of heat. Further, in order to prepare a surface crosslinking agent solution, the tank is connected to a step of preparing a water absorbent resin with a pipeline. To control a liquid surface of ethylene carbonate (liquid temperature about 45° C.) stored in the melted state, melting was repeatedly performed so as to be in a range of 2 m³ through 8 m³. In addition, in the above operation, ethylene carbonate was stable, and production of ethylene glycol (degradation product of ethylene carbonate) as a byproduct was not substantially recognized.

Comparative Example 5-1

Solid ethylene carbonate was stored as it was in an intermediate tank (raw material tank), and transported to a step of producing a water absorbent resin with a screw feeder in order to prepare a surface crosslinking agent solution of a water absorbent resin.

By influenced by an external air temperature, transporting property and storing property of ethylene carbonate varied. Particularly, in a summer season where a temperature of ethylene carbonate was a melting point or higher, those properties were greatly changed, and production of ethylene glycol as a byproduct was also recognized.

Example 5-5

In order to prepare a surface crosslinking agent solution of a water absorbent resin, a transport piping equipped with a mass flowmeter (e.g. corresponding to Coriolis-type mass flowmeter/manufactured by Eendress Houser) which could measure a flow rate and an integrated flow volume, and a control valve for adjusting a flow rate was prepared.

The aqueous ethylene carbonate solution obtained in Example 5-2, propylene glycol and deionized water were line-mixed (static mixer etc.) while a flow rate was adjusted using the mass flowmeter, so that a predetermined liquid composition (aqueous ethylene carbonate solution:propylene glycol:deionized water=3.649:0.797:1) was attained and, at the same time, an integrated flow volume was measured to prepare a total liquid amount of 300 kg of a surface crosslinking agent solution. After preparation of the surface crosslinking agent solution, a liquid composition thereof was checked, and an error was found to be within 0.1%.

Example 5-6

In order to prepare a surface crosslinking agent solution of a water absorbent resin, a transport piping equipped with a volume-type flowmeter (manufactured by OVAL Corporation) which could measure a flow rate and an integrated flow volume, and a control valve for adjusting a flow rate was prepared. A temperature of a transport piping for ethylene carbonate was retained at 50° C. by hot water heat tracing.

The melted ethylene carbonate at 45° C. obtained in Example 5-1, propylene glycol and deionized water were line-mixed (static mixer etc.) while a flow rate was adjusted using the volume flowmeter, so that a predetermined liquid composition (melted ethylene carbonate:propylene glycol: deionized water=0.114:0.191:1 (weight ratio)) was attained and, at the same time, an integrated flow volume was measured to prepare a total liquid amount of 300 kg of a surface crosslinking agent solution. In order to convert a volume flow rate into a mass flow rate, a density value at 45° C. of ethylene carbonate, and density values at 25° C. of propylene glycol and deionized water were used.

After preparation of the surface crosslinking agent solution, a liquid composition thereof was checked, and a desired liquid composition was not attained, such as melted ethylene carbonate:propylene glycol:deionized water=0.110:0.185:1 (weight ratio). It is thought that cause is the change in a density and a viscosity of each component due to change of the external air temperature (e.g. after mixing, a density was changed from 1.027 to 1.045 [g/cm³], and a viscosity was from 0.93 to 5.05 [mPa·s]) or an error of a set density value.

Comparative Example 5-2

In Example 1-1, solid ethylene carbonate of Comparative Example 5-1 was dissolved as an aqueous solution to prepare a surface crosslinking agent solution, but workability was bad and, further, stability of the mixing ratio was lowered due to change in the air temperature for one day or summer and winter.

Comparative Example 5-3

In Example 1-3, 1,4-butanediol was dissolved as an aqueous solution at room temperature to prepare a surface crosslinking agent solution, but workability was bad and, further, stability of the mixing ratio was reduced due to change of the air temperature for one day or summer and winter.

Example 5-7

In order to prepare a surface crosslinking agent solution of a water absorbent resin, a transport piping equipped with a mass flowmeter (e.g. corresponding to Coriolis-type mass flowmeter/manufactured by Endress Hauser) which could measure a flow rate and an integrated flow volume, and a control valve for adjusting a flow rate was prepared. A temperature of a transport piping for ethylene carbonate was retained at 50° C. by hot water heat tracing.

The melted ethylene carbonate at 45° C. obtained in Example 1-1, propylene glycol and deionized water were line-mixed (static mixer etc.) while a flow rate was adjusted using the mass flowmeter, so that a predetermined liquid composition (melted ethylene carbonate:propylene glycol: deionized water=0.114:0.191:1 (weight ratio)) was attained and, to continuously prepare a surface crosslinking agent solution at 100 [kg/hr]. At the same time, the solution was sent to a buffer tank which can store 50 kg while an integrated flow volume was measured.

After 30 minutes from the start of preparation of a surface crosslinking agent solution, the surface crosslinking agent solution was sent from a buffer tank in order to surface-crosslink a water absorbent resin particle, which was used at 100 [kg/hr]. An average retention time in the buffer tank was 30 minutes. Ethylene glycol in a sent surface crosslinking agent solution was 48 ppm.

Example 5-8

The same operation as that of Example 5-7 was performed except that the buffer tank of 50 kg was changed to 100 kg, and an average retention time of 30 minutes was extended to 60 minutes in Example 5-7. As a result, ethylene glycol in a sent surface crosslinking agent solution was 90 ppm.

Example 5-9

The same operation as that of Example 5-7 was performed except that the buffer tank of 50 kg was changed from to 500 kg, and an average retention time of 30 minutes was extended to 5 hours in Example 5-7. As a result, ethylene glycol in a sent surface crosslinking agent solution was 448 ppm.

TABLE 1

| | | CRC [g/g] | AAP [g/g] | SFC [$\times 10^{-7} \cdot cm^3 \cdot s \cdot g^{-1}$] |
|---|---|---|---|---|
| Production Example 1 | Water absorbent resin particle(a) | 33.9 | 8.5 | 0 |
| Production Example 2 | Water absorbent resin particle(b) | 39.2 | 7.2 | 0 |
| Example 1-1 | Water absorbent resin powder(1-1) | 27.2 | 23.3 | 103 |
| Example 2-1 | Water absorbent resin powder(2-1) | 30.1 | 24.4 | 51 |
| Example 1-2 | Water absorbent resin powder(1-2) | 27.1 | 23.4 | 102 |
| Example 2-2 | Water absorbent resin powder(2-2) | 29.9 | 24.5 | 53 |
| Example 1-3 | Water absorbent resin powder(1-3) | 27.0 | 23.1 | 90 |
| Example 2-3 | Water absorbent resin powder(2-3) | 30.2 | 23.8 | 45 |

(Summary)

As shown in Table 1 and Example 1-1 to Example 1-3 and Example 2-1 to Example 2-3, it is seen that a water absorbent resin powder which is high in a water absorbent capacity under load (AAP) and liquid permeability (SFC) is obtained by surface crosslinking with using alkylene carbonate heated at a melting point or higher, or using in combination with alkylene carbonate and a polyhydric alcohol and, further, using in combination with an ion binding surface crosslinking agent. Although not described in Table, the resulting ratios of internal gas bubbles (%) were substantially the same as that of a water absorbent resin particle (a) or (b) before surface crosslinking described in Production Example 1 or 2. And, residual ethylene glycol of a water absorbent resin powder obtained using the alkylene carbonate was 1000 ppm or less in all cases by the measurement method (2) of (5-16), and was substantially reduced.

Production Example 3

According to Example 2 of International Publication No. WO 2011/078298, a water absorbent resin particle (c) was prepared.

After 351.6 g of acrylic acid, 144.9 g of a 48.5 weight % aqueous sodium hydroxide solution, 2.17 g of polyethylene glycol diacrylate (molecular weight 523) as an internal crosslinking agent, 94.6 g of a 0.1 weight % diethylenetriamine pentaacetate•3 sodium aqueous solution as a chelating agent, 6.45 g of a 0.1 weight % polyoxyethylene (20) sorbitan monostearate aqueous solution (manufactured by Kao Corporation) as a surfactant, and 236.0 g of deionized water were placed into a container made of polypropylene of a volume of 2 L, the mixture was stirred to prepare an aqueous monomer solution (c'). Thereupon, a liquid temperature of the aqueous monomer solution (c') was elevated to 65° C. by neutralization heat generated by a neutralization reaction (first stage) between acrylic acid and sodium hydroxide. Very fine gas bubbles were generated by lowering in solubility of a gas accompanied with this temperature elevation, and the aqueous monomer solution (c') was clouded.

Then, the aqueous monomer solution (c') was cooled while stirring, and at the time at which a liquid temperature was 53° C., 148.9 g of a 48.5 weight % aqueous sodium hydroxide solution controlled at 30° C. was added to prepare an aqueous monomer solution (c). Thereupon, a liquid temperature of the aqueous monomer solution (c) elevated to 83.5° C. by neutralization heat generated by a neutralization reaction (second stage) of acrylic acid and sodium hydroxide. By lowering in solubility of a gas accompanied with this temperature elevation, very fine gas bubbles were further generated, and the aqueous monomer solution (c) was also clouded.

Subsequently, at the time at which a liquid temperature of the aqueous monomer solution (c) lowered to 83° C., 15.3 g of a 3.8 weight % aqueous sodium persulfate solution was added while the aqueous monomer solution (c) was stirred and, immediately, poured into a tray-type polymerization container made of a stainless steel in an atmospheric open state. The tray-type polymerization container made of a stainless steel was a container having a size of a bottom of 340 mm×340 mm, and a height 25 mm, in which Teflon (registered trademark) is attached to an internal surface, and a surface was heated to 40° C. using a hotplate (NEO HOTPLATE H1-1000/manufactured by IUCHI SEIEIDOU Corporation). And, an amount of dissolved oxygen in an aqueous monomer solution (c) before addition of an aqueous sodium persulfate solution was 6.53 [mg/L].

Fifteen seconds after the aqueous monomer solution (c) was poured into a tray-type polymerization container, polymerization started. The polymerization progressed by inflation and foaming in every direction towards above the tray-type polymerization container while a water steam was generated, thereafter, foaming was shrunk to a size slightly larger than a size of a bottom of the tray-type polymerization container. This polymerization (inflation and shrinking) finished in about one minute. After three minutes passed from polymerization start, a polymer was taken out as a water-containing gel-like crosslinked polymer (hereinafter, referred to as "hydrogel") (c). In addition, these series of operations were performed in an atmospheric open state, and a peak temperature of polymerization (maximum reaching temperature) was 108° C.

Then, the hydrogel (c) obtained in the polymerization step was gel-crushed using a meat chopper (MEAT-CHOPPER TYPE: 12VR-400KSOX/manufactured by Iizuka Industry Co., Ltd.; die pore diameter was 6.4 mm, pore number was 38, die thickness was 8 mm) to obtain a particulate hydrogel (c). A placement amount of the hydrogel (c) at the gel crushing step was 350 [g/minute], and deionized water controlled at 90° C. was added at 80 [g/minute], parallel with introduce of the hydrogel (c).

Subsequently, the particulate hydrogel (c) obtained in the gel crushing step was placed and spread on a metal net made of a stainless steel having a mesh size of 850 μm, and hot-air dried at 180° C. for 30 minutes. Then, after the gel was crushed using a roll mill (WML-type roll pulverizing machine/manufactured by Inoguchi Aiken Co., Ltd.), the crushed gel was classified using JIS standard sieves having a mesh size of 850 μm and 45 μm to obtain a pulverized non-uniformly shaped water absorbent resin particle (c). The resulting water absorbent resin particle (c) had a solid content of 97% by weight, a weight average particle diameter (D50) of 460 μm, a logarithmic standard deviation of a particle size distribution (σζ) of 0.40, and a ratio of internal gas bubbles of 4.2%. Various physical properties of the resulting water absorbent resin particle (c) are shown in Table 2.

Production Example 4

The same operation as that of Production Example 3 was performed except that, as a surfactant, a 1.0 weight % aqueous polyether-modified silicone (side chain-modified and OH end) solution (manufactured by Dow Corning Toray Co., Ltd.) was used in Production Example 3 in place of a 1.0 weight % polyoxyethylene(20)sorbitan monostearate solution (manufactured by Kao Corporation), then an aqueous monomer solution (d') was prepared. Thereupon, a liquid temperature of the aqueous monomer solution (d') elevated to 63° C. by neutralization heat generated by a neutralization reaction (first stage) between acrylic acid and sodium hydroxide.

Thereafter, the same operation as that of Production Example 3 was performed to obtain a pulverized non-uniformly shaped water absorbent resin particle (d). The resulting water absorbent resin particle (d) had a solid content of 97% by weight, a weight average particle diameter (D50) of 427 μm, a logarithmic standard deviation of a particle size distribution (σζ) of 0.39, and a ratio of internal gas bubbles of 6.5%. Various physical properties of the resulting water absorbent resin particle (d) are shown in Table 2.

Example 3-1

After 30 g of solid flake-like ethylene carbonate (melting point 34 to 37° C.) was placed into a container made of polypropylene having a volume of 120 mL, the container was immersed in a water bath at 50° C. to melt ethylene carbonate of the content. The melted ethylene carbonate was heated in the water bath, and stored in the melted state until use as a surface crosslinking agent solution.

Then, 15 g of a surface crosslinking agent solution (3-1) consisting of 0.47 part by weight of melted ethylene carbonate obtained by the above operation, 0.75 part by weight of propylene glycol and 4.0 parts by weight of deionized water was prepared.

Subsequently, after 300 g of the water absorbent resin particle (c) obtained in Production Example 3 was placed into a Loedige mixer (manufactured by Loedige) having a volume of 5 L, 12.3 g of the surface crosslinking agent solution (3-1) was uniformly sprayed while rotating at a high speed, and mixed. Thereafter, an all amount of the mixture was placed into a hot air dryer (hot air temperature; 180° C.), and heat-treated for 30 minutes. Then, pulverizing was performed until particles passed through a JIS standard sieve having a mesh size of 850 μm, to obtain a water absorbent resin particle (3-1) having a crosslinked surface.

Thereafter, an aqueous liquid (3-1) consisting of a 27 weight % (8 weight % in terms of aluminum oxide) of an aqueous aluminum sulfate solution as a polyvalent metal cation at 0.80 part by weight, a 60 weight % aqueous sodium lactate solution as α-hydroxycarboxylic acid at 0.134 part by weight and propylene glycol at 0.016 part by weight relative to 100 parts by weight of the water absorbent resin particle (3-1) having crosslinked surface obtained by the above operation was prepared. The aqueous liquid (7) was sprayed uniformly to the water absorbent resin particle (3-1) having crosslinked surface, and mixed, and dried at 60° C. for 1 hour under no wind condition. Then, the mixture was passed through a JIS standard sieve having a mesh size of 850 μm to obtain a water absorbent resin powder (3-1). Various physical properties of the resulting water absorbent resin powder (3-1) are shown in Table 2. In addition, an amount of residual ethylene carbonate was ND (detection limit or lower).

Example 4-1

A surface crosslinking agent solution (4-1) consisting of melted ethylene carbonate obtained in Example 3-1 at 0.47 part by weight, propylene glycol at 0.75 part by weight, polyoxyethylene(20)sorbitan monostearate (manufactured by Kao Corporation) at 0.001 part by weight (10 ppm relative to water absorbent resin particle (d)) and deionized water at 4.0 parts by weight relative to 100 parts by weight of the water absorbent resin particle (d) obtained in Production Example 4 was prepared.

Thereafter, the same operation as that of Example 3-1 was performed except that the surface crosslinking agent solution (4-1) was uniformly sprayed, and mixed, then a water absorbent resin powder (4-1) was obtained. Various physical properties of the resulting water absorbent resin powder (4-1) are shown in Table 2. In addition, an amount of residual ethylene carbonate was ND (detection limit or lower).

The water absorbent resin powder (4-1) obtained in the present Example 4-1 was such that 150 ppm of a surfactant was substantially uniformly present in the interior thereof and, further, a surface thereof was covered with 10 ppm of a surfactant, and a surface tension thereof was 67.1 [mN/m]

TABLE 2

|  |  | CRC [g/g] | FSR [g/g/s] | Bulk density [g/cm$^3$] | Surface tension [mN/m] | Whiteness degree [WB value] | Ratio of internal gas bubbles [%] |
|---|---|---|---|---|---|---|---|
| Production Example 3 | Water absorbent resin particle(c) | 35.2 | 0.38 | 0.63 | 68.2 | 69.18 | — |
| Production Example 4 | Water absorbent resin particle(d) | 34.0 | 0.45 | 0.58 | — | — | — |
| Example 3-1 | Water absorbent resin powder (3-1) | 27.2 | 0.37 | 0.65 | — | — | 3.93 |
| Example 4-1 | Water absorbent resin powder (4-1) | 26.8 | 0.39 | 0.62 | 67.4 | — | 6.42 |

(Summary)

As shown in Table 2, even in the case of dehydration surface crosslinking with alkylene carbonate in which a surface is easily hydrophobized, by controlling a ratio of internal gas bubbles, a water absorbent resin powder having a high free swelling rate (FSR) is obtained. And, residual ethylene glycol in the water absorbent resin powder was 800 ppm or less in all cases, and was sufficiently reduced, by the measurement method (2) of (5-16).

Example 3-2

After 30 g of propylene carbonate was placed into a container made of polypropylene having a volume of 120 mL, the container was immersed in a water bath at 30° C. to heat propylene carbonate of a content. The heated propylene carbonate was stored in the water bath in the heated state until use as a surface crosslinking agent solution.

Then, the same operation as that of Example 3-1 was performed except that, the surface crosslinking agent solution (3-1) of Example 3-1 was changed into a surface crosslinking solution (3-2) in which propylene carbonate (molecular weight; 102.09) at the same mole number obtained by the above operation was used in place of melted ethylene carbonate (0.47 part by weight/molecular weight; 88.06), then a water absorbent resin powder (3-2) was obtained. A composition (weight ratio) of the surface crosslinking agent solution (3-2) was propylene carbonate/propylene glycol/deionized water=0.54/0.75/4.0, and a use amount was 12.5 g. Results are shown in Table 3.

Example 3-3

After 30 g of glycerin carbonate was placed into a container made of polypropylene having a volume of 120 mL, the container was immersed in a water bath at 30° C. to heat glycerin carbonate of a content. The heated glycerin carbonate was stored in a water bath in the heated state until use as a surface crosslinking agent solution.

Then, the same operation as that of Example 3-1 was performed except that the surface crosslinking agent solution (3-1) of Example 3-1 was changed into a surface crosslinking agent solution (3-3) in which glycerin carbonate (molecular weight; 118.09) of the same mole number obtained by the operation was used in place of melted ethylene carbonate (0.47 part by weight/molecular weight; 88.06), then a water absorbent resin powder (3-3) was obtained. A composition (weight ratio) of the surface crosslinking agent solution (3-3) was glycerin carbonate/propylene glycol/deionized water=0.63/0.75/4.0, and a use amount was 12.7 g. Results are shown in Table 3.

Example 3-4

After 30 g of solid powder-like 1,6-hexanediol (melting point 42.8° C.) was placed into a container made of polypropylene having a volume of 120 mL, the container was immersed in a water bath at 60° C. to heat hexanediol of a content. The melted 1,6-hexanediol was heated in the water bath, and stored in the melted state until use as a surface crosslinking agent solution.

Then, the same operation as that of Example 3-1 was performed except that the surface crosslinking agent solution (3-1) of Example 3-1 was changed into a surface crosslinking agent solution (3-4) in which a surface crosslinking agent solution (3-4) of melted hexanediol (60° C.) (molecular weight; 118.17) of the same mole number obtained by the above operation was used in place of melted ethylene carbonate (0.47 part by weight/molecular weight; 88.06), then a water absorbent resin powder (3-4) was obtained. A composition (weight ratio) of the surface crosslinking agent solution (3-4) was hexanediol/propylene glycol/deionized water=0.63/0.75/4.0, and a use amount was 12.7 g. Results are shown in Table 3.

Example 3-5

After 30 g of solid powder-like sorbitol (melting point 96° C.) was placed into a container made of a stainless steel having a volume of 120 mL, the container was immersed in an oil bath at 100° C. to heat sorbitol of a content. The melted sorbitol was heated in the oil bath, and stored in the melted state until use as a surface crosslinking agent solution.

Then, the same operation as that of Example 3-1 was performed except that the surface crosslinking agent solution (3-1) of Example 3-1 was changed into a surface crosslinking agent solution (3-5) in which melted sorbitol (100° C.) (molecular weight; 182.17) of the same mole number obtained by the above operation was used in place of melted ethylene carbonate (0.47 part by weight/molecular weight; 88.06), then a water absorbent resin powder (3-5) was obtained. A composition (weight ratio) of the surface crosslinking agent solution (3-5) was sorbitol/propylene glycol/deionized water=0.97/0.75/4.0, and a use amount was 13.5 g. Results are shown in Table 3.

Example 3-6

After 30 g of solid neopentyl glycol (melting point 130° C.) was placed into a container made of a stainless steel having a volume of 120 mL, the container was immersed in an oil bath at 150° C. to heat neopentyl glycol of a content. The melted neopentyl glycol was heated in the oil bath, and stored in the melted state until use as a surface crosslinking agent solution.

Then, the same operation as that of Example 3-1 was performed except that the surface crosslinking agent solution (3-1) in Example 3-1 was changed into a surface crosslinking agent solution (3-6) in which a surface crosslinking agent solution (3-6) of melted neopentyl glycol (150° C.) (molecular weight; 104.15) of the same mole number obtained by the above operation was used in place of melted ethylene carbonate (0.47 part by weight/molecular weight; 88.06), then a water absorbent resin powder (3-6) was obtained. A composition (weight ratio) of the surface crosslinking agent (3-6) was neopentyl glycol/propylene glycol/deionized water=0.56/0.75/4.0, and a use amount was 12.5 g. Results are shown in Table 3.

Example 3-7

The same operation as that of Example 3-1 was performed except that the surface crosslinking agent solution (3-1) of Example 3-1 was changed into a surface crosslinking agent solution (3-7) in which melted ethylene carbonate of the same mole number as a total mole number was used in place of melted ethylene carbonate (0.47 part by weight/molecular weight; 88.06) and propylene glycol (0.75 part by weight/molecular weight; 76.09), then a water absorbent resin powder (3-7) was obtained. A composition (weight ratio) of the surface crosslinking agent solution (3-7) was melted ethylene glycol/deionized water=1.34/4.0, and a use amount was 13.0 g. Results are shown in Table 3.

Example 3-8

The same operation as that of Example 3-7 was performed except that, compared to Examples 3-7, a use amount of melted ethylene carbonate was increased to 1.52 parts by weight for the purpose of shortening a reaction time, then a water absorbent resin powder (3-8) was obtained. A composition (weight ratio) of a surface crosslinking agent solution (3-8) was melted ethylene glycol/deionized water=1.52/4.0, and a use amount was 13.0 g. Results are shown in Table 3.

Example 3-9

The same operation as that of Example 3-7 was performed except that, compared to Example 3-7, a use amount of deionized water was increased to 5.2 parts by weight for the purpose of shortening a reaction time, then water absorbent resin powder (3-9) was obtained. A composition (weight ratio) of the surface crosslinking agent solution (3-9) was melted ethylene glycol/deionized water=1.34/5.2, and a use amount was 15.4 g. Results are shown in Table 3.

Comparative Example 3-1

The same operation as that of Example 3-1 was performed, except that the surface crosslinking agent solution (3-1) of Example 3-1 was changed into a comparative surface crosslinking agent solution (3-1) in which a comparative surface crosslinking agent solution (3-1) of propylene glycol at the same mole number as a total mole number was used without melting and heating in place of melted ethylene carbonate (0.47 part by weight/molecular weight; 88.06) and propylene glycol (0.75 part by weight/molecular weight; 76.09), then a comparative water absorbent resin powder (3-1) was obtained. A composition (weight ratio) of the comparative surface crosslinking agent solution (3-1) was propylene glycol/deionized water=1.16/4.0, and a use amount was 12.2 g. Results are shown in Table 3.

Comparative Example 3-2

The same operation as that of Example 3-1 was performed, except that the surface crosslinking agent solution (3-1) in Example 3-1 was changed into a comparative water-surface crosslinking solution (3-2) in which glycerin (molecular weight; 92.09) of the same mole number was used in place of melted ethylene carbonate (0.47 part by weight/molecular weight; 88.06), then a comparative water absorbent resin powder (3-2) was obtained. A composition (weight ratio) of the comparative surface crosslinking agent solution (3-2) was glycerin/propylene glycol/deionized water=0.49/0.75/4.0, and a use amount was 12.3 g. Results are shown in Table 3. In addition, the glycerin was used without particular heating.

Comparative Example 3-3

The same operation as that of Example 3-1 was performed, except that the surface crosslinking agent solution (3-1) of Example 3-1 was changed into a comparative surface crosslinking agent solution (3-3) in which ethylene glycol (molecular weight; 62.07) of the same mole number was used in place of melted ethylene carbonate (0.47 part by weight/molecular weight; 88.06), then a comparative water absorbent resin powder (3-3) was obtained. A composition (weight ratio) of the comparative surface crosslinking agent solution (3-3) was ethylene glycol/propylene glycol/deionized water=0.33/0.75/4.0, and a use amount was 12.0 g. Results are shown in Table 3. In addition, the ethylene glycol was used without particular heating.

TABLE 3

| | Composition of surface crosslinking agent solution[part by weight] | | | | | | |
|---|---|---|---|---|---|---|---|
| | Non-polymerized organic composition | PG | W | Reaction time* [min] | Aggregate [wt %] | SFC** | Residual EG [wt %] |
| Example 3-1 | Melted EC | 0.47 | 0.75 | 4.0 | 40 | 8 | — | ND |
| Example 3-2 | Heated PC | 0.54 | 0.75 | 4.0 | 60 | 10 | 104 | — |
| Example 3-3 | Heated GC | 0.63 | 0.75 | 4.0 | 40 | 3 | 78 | — |
| Example 3-4 | Melted HD | 0.63 | 0.75 | 4.0 | 70 | 1 | 98 | — |
| Example 3-5 | Melted ST | 0.97 | 0.75 | 4.0 | 45 | 23 | — | — |
| Example 3-6 | Melted NPG | 0.56 | 0.75 | 4.0 | 45 | 17 | — | — |
| Example 3-7 | Melted EC | 1.34 | — | 4.0 | 50 | 9 | 98 | 0.01 |
| Example 3-8 | Melted EC | 1.52 | — | 4.0 | 45 | 9 | 93 | — |
| Example 3-9 | Melted EC | 1.34 | — | 5.2 | 40 | 16 | 93 | — |
| Comparative Example 3-1 | — | — | 1.16 | 4.0 | 60 | 21 | 98 | — |
| Comparative Example 3-2 | G | 0.49 | 0.75 | 4.0 | 40 | 19 | 78 | — |

TABLE 3-continued

| | | | | | | | | |
|---|---|---|---|---|---|---|---|---|
| Comparative Example 3-3 | EG | 0.33 | 0.80 | 4.0 | 55 | 23 | — | — |

| Abbreviation | M.W | Name |
|---|---|---|
| EC | 88.06 | Ethylene carbonate |
| PC | 102.09 | Propylene carbonate |
| GC | 118.09 | Glycerin carbonate |
| HD | 118.17 | Hexanediol |
| NPG | 104.15 | Neopentyl glycol |
| G | 92.09 | Glycerin |
| EG | 62.07 | Ethylene glycol |
| PG | 76.09 | Propylene glycol |
| ST | 182.17 | Sorbitol |

*A reaction time is a time to CRC = 27[g/g]. There is a tendency that increase of the time increases a residual monomer (5-10 ppm/10 min).
**Unit is [×$10^{-7} \cdot cm^3 \cdot s \cdot g^{-1}$].

(Summary)

From Table 3, use of alkylene carbonate and a polyhydric alcohol in combination, particularly, use in combination with ethylene carbonate, a reaction time can be shortened (improvement in productivity), and an amount of a residual surface crosslinking agent can be reduced. And, an aggregate is reduced, and mixability and physical properties (liquid permeability) of a surface crosslinking agent is also improved. Residual ethylene glycol was reduced to ND or 0.01 wt %, by the measuring method (1) of (5-15).

And, in preparation of a surface crosslinking agent solution, from a view point of workability and physical properties stability, it is preferable to heat and melt a non-polymerized organic compound having a melting point of 20 to 130° C., such as ethylene carbonate (melting point 36° C.), 1,4-butanediol (the same 20° C.), 1,6-hexanediol (the same 42.8° C.), sorbitol (the same 96° C.), neopentyl glycol (the same 130° C.) and the like, particularly, ethylene carbonate. By using in combination with these surface crosslinking agents with other polyhydric alcohol, particularly, propanediol or propylene glycol, a reaction time is shortened, physical properties is also improved, and a residual surface crosslinking agent and a byproduct thereof can be also reduced.

In addition, although not described in Table 3, heat treatment was performed under slightly reduced pressure (−10 mmH$_2$O), and β-hydroxypropionic acid in a water absorbent resin particle used was 200 ppm (liquid chromatography analysis).

Example 1-4 (Storage Temperature 50° C.)

In an intermediate tank (raw material tank) for storing melted ethylene carbonate in Example 1-1, an upper space thereof was filled with a dry air having a dew point of −15° C., and a temperature was kept hot by passing warm water at 50° C. through a heating coil under the conditions, ethylene carbonate was stored in the melted state for 30 days. Ethylene glycol as an impurity was contained at 0.012% by weight in ethylene carbonate before storage, and after 30 days passed, ethylene glycol was increased to 0.030% by weight. A color tone (Hazen Color Number) of melted ethylene carbonate after 30 days passed, was 5 (APHA).

Subsequently, using the melted ethylene carbonate stored for 30 days, respective components were quantitated with a Coriolis-type mass flowmeter, and mixed, so that a liquid composition of a surface crosslinking agent solution (1-4) was ethylene carbonate:propylene glycol:deionized water=1:1.7:8.7 (weight ratio), to prepare a surface crosslinking agent solution. Since the surface crosslinking agent solution (1-4) was a mixture of three kinds of liquids, liquids could be instantaneously mixed with a quantitative pump and a mass flowmeter.

Subsequently, the same operation as that of Example 1-1 was performed, except that 4.0 parts by weight of the surface crosslinking agent solution (1-4) obtained by the above operation was sprayed with a sprayer to 100 parts by weight of the water absorbent resin particle (a) obtained in Production Example 1, and they were mixed, and heat-treated at 200° C. for 30 minutes, then a water absorbent resin powder (1-4) was obtained. A color tone (Lab value) of the resulting water absorbent resin powder (1-4) is shown in Table 4. A color tone of a water absorbent resin powder was measured using LabScan XE manufactured by HunterLab.

Example 1-5 (Storage Temperature 100° C.)

The same operation as that of Example 1-4 was performed except that, for the intermediate tank (raw material tank) for storing melted ethylene carbonate in Example 1-4, a storage temperature was changed into 100° C., then a water absorbent resin powder (1-5) was obtained. In addition, change in a storage temperature was carried out by changing warm water passing through a heating coil to a water steam.

As a result, a content of ethylene glycol after 30 days passed, increased to 0.20% by weight. And, a color tone (Hazen Color Number) of melted ethylene carbonate after 30 days passed, was 140 (APHA). And, a color tone (Lab value) of the resulting water absorbent resin powder (1-6) is shown in Table 4.

Example 1-6 (Storage Temperature 140° C.)

The same operation as that of Example 1-5 was performed except that, for the intermediate tank (raw material tank) for storing melted ethylene carbonate in Example 1-4, a storage temperature was changed into 140° C., then a water absorbent resin powder (1-6) was obtained. Change in a storage temperature was carried out by changing warm water passing through a heating coil to a water steam.

As a result, a content of ethylene glycol after 30 days passed, increased to 2.0% by weight. And, a color tone (Hazen Color Number) of melted ethylene carbonate after 30 days passed, was 400 (APHA). A color tone (Lab value) of the resulting water absorbent resin powder (1-6) is shown in Table 4.

Comparative Example 1-1 (Storage Temperature 25° C.)

For the intermediate tank (raw material tank) for storing melted ethylene carbonate in Example 1-4, ethylene carbonate was stored at a normal temperature (25° C.) for 30 days without heating. In the present Comparative Example 1-1, since ethylene carbonate solidified in the intermediate tank (raw material tank), preparation of a surface crosslinking agent solution was very troublesome, and fluctuation of a mixing ratio was recognized.

TABLE 4

| | Storage condition of surface crosslinking agent (EC) | | Physical properties after 30 days passed EG | Color tone of water absorbent resin [Lab value] | | |
|---|---|---|---|---|---|---|
| | Temperature [° C.] | Storage time [days] | byproduct amount [wt %] | Color tone [APHA] | L a | b |
| Example 1-4 | 50 | 30 | 0.030 | 5 | 92 −1.3 | 7.4 |
| Example 1-5 | 100 | 30 | 0.20 | 140 | 91 −1.4 | 7.7 |
| Example 1-6 | 140 | 30 | 2.0 | 400 | 91 −1.4 | 8.1 |

(Summary)

As shown in Table 4, from Examples 1-5 to Examples 1-7 and Comparative Example 1-1, it is seen that workability is improved by storing a non-polymerized organic compound (particularly, ethylene carbonate) being a raw material of a water absorbent resin powder in the heated, or melted state. And, from a view point of coloration and production as a byproduct, it is preferable that a storage temperature is within a melting point+20° C., as in Example 1-4. Residual ethylene glycol in a water absorbent resin powder was 800 ppm or less in all cases, and was sufficiently reduced, by the measurement method (2) of (5-16).

Example 1-7 (Influence of Water)

In the intermediate tank (raw material tank) for storing melted ethylene carbonate in Example 1-1, an upper space was filled with a dry air having a dew point of −15° C., and warm water at 50° C. was passed through a heating coil to keep the space hot, under the conditions, ethylene carbonate was stored for 30 days in the melted state. In ethylene carbonate before storage, 0.08% by weight of ethylene glycol as impurities, and 0.001% by weight of water were contained.

Subsequently, using the melted ethylene carbonate which had been stored for 30 days, respective components were quantitated with a Coriolis-type mass flowmeter, and mixed, so that a liquid composition of a surface crosslinking agent solution (1-8) was ethylene carbonate:propylene glycol: deionized water:surfactant (polyoxyethylene sorbitan monostearate)=0.4:0.6:4.0:0.001 (weight ratio), to prepare a surface crosslinking agent solution.

Subsequently, the same operation as that of Example 1-1 was performed, except that 5 parts by weight of a surface crosslinking agent solution (1-7) obtained by the above operation was sprayed with a sprayer to 100 parts by weight of the water absorbent resin particle (a) obtained in Production Example 1, and they were mixed, and heat-treated at 200° C. for 30 minutes, then a water absorbent resin powder (1-7) was obtained. Table 5 shows an amount of ethylene glycol in the surface crosslinking agent solution (1-7).

Example 1-8 (Influence of Water)

The same operation as that of Example 1-7 was performed except that water was added so that water in ethylene carbonate was 0.02% by weight, compared to Example 1-7, then a water absorbent resin powder (1-8) was obtained. Table 5 shows an amount of ethylene glycol in the surface crosslinking agent solution (1-8).

Example 1-9 (Influence of Dew Point)

The same operation as that of Example 1-7 was performed except that the normal atmosphere (dew point 30° C. or higher) was filled into an upper space of the intermediate tank (raw material tank) of Example 1-7, then a water absorbent resin powder (1-9) was obtained. Table 5 shows an amount of ethylene glycol in the surface crosslinking agent (1-9).

TABLE 5

| | Dew point [° C.] | Water amount [wt %] | EG byproduct amount [wt %] |
|---|---|---|---|
| Example 1-7 | −15 | 0.001 | 0.005 |
| Example 1-8 | −15 | 0.03 | 0.13 |
| Example 1-9 | 30 (Atmosphere) | 0.001 | 0.03 |

(Summary)

As shown in Table 5, a byproduct (ethylene glycol) can be reduced by a dew point and an amount of water at storage.

Example 1-10

In Example 1-1, using melted ethylene carbonate which had been stored for 30 days, respective components were quantitated with a Coriolis-type mass flowmeter, and mixed so that a liquid composition of a surface crosslinking agent solution (1-10) was ethylene carbonate:propylene glycol: deionized water=1:1.7:8.7 (weight ratio), to prepare a surface crosslinking agent solution. The surface crosslinking agent solution (1-10) was stored at 25° C. for one week after preparation.

Subsequently, the same operation as that of Example 1-1 was performed except that 4.0 parts by weight of the surface crosslinking agent solution (1-10) obtained by the above operation was sprayed with a sprayer to 100 parts by weight of the water absorbent resin particle (a) obtained in Production Example 1, and they were mixed, and heat-treated at 200° C. for 30 minutes, a water absorbent resin powder (1-10) was obtained. Ethylene glycol which had been increased during storage as a surface crosslinking solution was 0.4 mole % relative to ethylene carbonate.

Example 1-11

The same operation as that of Example 1-10 was performed except that storage condition of the surface crosslinking agent solution was changed into 50° C. for one week in Example 1-10, then a water absorbent resin powder (1-11) was obtained. Ethylene glycol which had been increased during storage as the surface crosslinking agent solution was 1.4 mole % relative to ethylene carbonate.

Example 1-12

The same operation as that of Example 1-10 was performed except that propylene glycol was not used in the surface crosslinking agent solution in Example 1-10, then a water absorbent resin powder (1-12) was obtained. A liquid composition of the surface crosslinking agent solution (1-12) prepared in the present Example 1-12 was ethylene carbonate:deionized water=1:8.7 (weight ratio), and was 3.4 parts by weight relative to 100 parts by weight of a water absorbent resin. And, after the surface crosslinking agent solution (1-12) was stored at 25° C. for one week, increased ethylene glycol was 1.7 mole % relative to ethylene carbonate.

Example 1-13

The same operation as that of Example 1-10 was performed except that propylene glycol was not used in the surface crosslinking agent solution in Example 1-10, then a water absorbent resin powder (1-13) was obtained. A liquid composition of the surface crosslinking agent solution (1-13) prepared in Example 1-14 was ethylene carbonate:deionized water=1:8.7 (weight ratio), and was 3.4 parts by weight relative to 100 parts by weight of a water absorbent resin. And, after the surface crosslinking agent solution (1-13) was stored at 50° C. for one week, increased ethylene glycol was 8.0 mole % relative to ethylene carbonate.

TABLE 6

| | Surface crosslinking agent solution | | | EG |
|---|---|---|---|---|
| | PG use amount [% vs SAP] | Storage temperature [° C.] | Period [days] | byproduct amount [mol %] |
| Example 1-10 | 1.4 | 25 | 7 | 0.4 |
| Example 1-11 | 1.4 | 50 | 7 | 1.4 |
| Example 1-12 | 0 | 25 | 7 | 1.7 |
| Example 1-13 | 0 | 50 | 7 | 8.0 |

(Summary)

It is seen that by using in combination with a polyhydric alcohol and ethylene carbonate, preservation stability of a surface crosslinking agent solution is improved.

Example 1-14

The same operation as that of Example 1-1 was performed except that 0.001 part by weight of a surfactant (polyoxyethylene sorbitan monostearate) relative to 100 parts by weight of a water absorbent resin was further added to the surface crosslinking agent solution (1-1) in Example 1-1, then a water absorbent resin powder (1-14) was obtained. As a heat treating time, heat treatment was performed to the same degree of a water absorption capacity without load (CRC=27 [gig]) as that of Example 1-1. Physical properties of the resulting water absorbent resin powder (1-14) is shown in Table 7.

Example 2-4

The same operation as that of Example 2-1 was performed except that 0.001 part by weight of a surfactant (polyoxyethylene sorbitan monostearate) relative to 100 parts by weight of a water absorbent resin was further added to the surface crosslinking agent solution (2-1) in Example 2-1, then a water absorbent resin powder (2-4) was obtained. As a heat treatment time, heat treatment was performed to the same extent of a centrifuge retention capacity (CRC=27 [g/g]) that of Example 1-1. Physical properties of the resulting water absorbent resin powder (2-4) are shown in Table 7.

Example 1-15

The same operation as that of Example 1-2 was performed except that 0.001 part by weight of a surfactant (polyoxyethylene sorbitan monostearate) relative to 100 parts by weight of a water absorbent resin was further added to the surface crosslinking agent solution (1-2) in Example 1-2, then a water absorbent resin powder (1-15) was obtained. As a heat treatment time, heat treatment was performed to the same degree of a centrifuge retention capacity (CRC=27 [g/g]) as that of Example 1-2. Physical properties of the resulting water absorbent resin powder (1-15) are shown in Table 7.

TABLE 7

| | SFC after surface crosslinking [×10$^{-7}$ · cm$^3$ · s · g$^{-1}$] | Improvement in SFC |
|---|---|---|
| Example 1-14 | 112 | +9(relative to Example 1-1) |
| Example 2-4 | 56 | +5(relative to Example 2-1) |
| Example 1-15 | 110 | +8(relative to Example 1-2) |

(Summary)

It is seen that, under the operation condition of a real apparatus base (1500 [kg/hr]), by using a surfactant liquid permeability (SFC) is improved by 5 to 9 points. Such effect of a surfactant is seen not frequently in a scale of around a few tens of grams, but is remarkably exerted in continuous production at the 1 t/hr or more.

Example 1-16

In adjustment and mixing of the surface crosslinking agent solution of Example 1-1, for water which dissolves melted ethylene carbonate at 50° C., a temperature of deionized water was warmed to 40° C. in advance, and continuous mixing was performed in the same way. An aqueous surface crosslinking agent solution could be controlled at a constant temperature (41 to 44° C.) for a long term through summer and winter, day and night, and there is no precipitation of melted ethylene carbonate in a season including winter, and a mixing ratio could be further stabilized when melted ethylene carbonate was continuously added to a water absorbent resin using a Coriolis-type mass flowmeter.

Example 1-17

In Example 1-2, 1,4-butanediol which had been heated to 40 C to melt, was used as an internal crosslinking agent in polymerization of a water absorbent resin. That is, in polymerization of Production Example 1, in place of polyethylene glycol diacrylate (0.09 mole %), polyethylene glycol diacrylate (0.07 mole %), and 0.01 mole % (relative to monomer) of 1,4-butanediol which was further heated to 40° C. to melt were used in combination. Herein, for mixing the internal crosslinking agent, a Coriolis-type mass flowmeter was used. Results are shown in Table 8.

Example 1-18

In Example 1-1, in place of 0.95 part by weight of an aqueous aluminum sulfate solution as an ion binding crosslinking agent, an aqueous polyvinylamine solution was employed. Herein, for an aqueous polyvinylamine solution, 3 parts by weight of LeredurPR8097 (polyvinylamine, aqueous solution of about 10% of solid content, manufactured by BASF) was sprayed to 100 parts by weight of a water absorbent resin particle (1-1) having a crosslinked surface, then a water absorbent resin (1-18) was obtained. A Coriolis-type mass flowmeter was used for adjusting a mixing ratio. Results are shown in Table 8.

Example 1-19

In Example 1-1, in place of 0.95 part by weight of an aqueous aluminum sulfate solution as an ion binding crosslinking agent, iron chloride was employed. Herein, as an aqueous iron chloride solution, 2 parts by weight of a 50 weight % aqueous solution of iron (III) chloride hexahydrate was uniformly sprayed to 100 parts by weight of a water absorbent resin particle (1-1) having a crosslinked surface to mix, in the aforementioned forced cooling. Results are shown in Table 8.

Example 1-20

In Example 1-1, in place of 0.95 part by weight of an aqueous aluminum sulfate solution as an ion binding crosslinking agent, an aqueous zirconium solution was used. Herein, 2 parts by weight of Bacote20 (zirconium ammonium carbonate, 20 weight % aqueous solution in terms of zirconium oxide, manufactured by MELchemicals) was uniformly sprayed to 100 parts by weight of a water absorbent resin particle (1-1) having a crosslinked surface, and they were mixed. Results are shown in Table 8.

TABLE 8

| | | CRC [g/g] | AAP [g/g] | SFC [×10$^{-7}$ · cm$^3$ · s · g$^{-1}$] |
|---|---|---|---|---|
| Example 1-17 | Water absorbent resin powder(1-17) | 27.1 | 23.3 | 105 |
| Example 1-18 | Water absorbent resin powder(1-18) | 27.0 | 23.1 | 110 |
| Example 1-19 | Water absorbent resin powder(1-19) | 27.1 | 23.0 | 90 |
| Example 1-20 | Water absorbent resin powder(1-20) | 27.0 | 22.8 | 104 |

(Summary)

From Example 1-17, it is seen that heat-melted 1,4-butanediol can be also used as an internal crosslinking agent. From Example 1-18 to Example 1-20, it is seen that, in place of aluminum as an ion crosslinking agent, iron, zirconium, and a polyamine polymer can be also used, iron shows SFC slightly inferior to that of aluminum, and AAP is slightly inferior in zirconium, and a polyamine polymer.

Example 3-10

After 30 g of solid 2-oxazolidone (melting point 87° C.) was placed into a container made of a stainless steel having a volume of 120 mL, the container was immersed in an oil bath at 100° C. to heat 2-oxazolidone of a content. The melted 2-oxazolidone was heated in the oil bath, and stored in the melted state until use as a surface crosslinking agent solution. During this, degradation was not seen.

The same operation as that of Example 3-1 was performed except that the surface crosslinking agent solution (3-1) of Example 3-1 was changed into a surface crosslinking agent solution (3-10) in which melted 2-oxazolidone (molecular weight; 87.08) of the same mole number obtained by the above operation was used in place of melted ethylene carbonate (molecular weight; 88.06), ten a water absorbent resin powder (3-10) was obtained. A composition (weight ratio) of the surface crosslinking agent solution (3-10) was 2-oxazolidone/propylene glycol/deionized water= 0.46/0.75/4.0 (total 12.3 g). A heat treatment time until CRC was about 27 [g/g] was 30 minutes, and SFC was 102[×10$^{-7}$·cm$^3$·s·g$^{-1}$].

Example 3-11

The same operation as that of Example 3-1 was performed except that the surface crosslinking agent solution (3-1) of Example 3-1 was changed into a surface crosslinking agent solution (3-11) in which a composition (weight ratio) was ethylene glycol diglycidyl ether/propylene glycol/deionized water=0.1/0.75/4.0, and a use amount was 11.4 g, then a water absorbent resin powder (3-11) was obtained. Ethylene glycol diglycidyl ether was used without heating. A heating time was 30 minutes, and SFC was 90[×10$^{-7}$·cm$^3$·s·g$^{-1}$].

Example 3-12

In Example 3-1, in place of the aqueous liquid (3-1), 5 parts by weight of an aqueous solution of a partial hydrolysate of poly(N-vinylformamide) (solid content was 9% by weight, weight average molecular weight was about 400000, hydrolysis rate was about 50 mole %) (aqueous liquid 3-12) was added to 100 parts by weight of a water absorbent resin powder having a crosslinked surface, and this was heated at 90° C. for 1 hour under no wind condition. Then, the mixture was passed through a JIS standard sieve having a mesh size of 850 μm to obtain a water absorbent resin powder (3-12). SFC was 107[×10$^{-7}$·cm$^3$·s·g$^{-1}$].

Example 1-21

When a volume mass flowmeter was employed in place of a mass flowmeter, an error (variation width) was about 3% in a mixing ratio of the surface crosslinking agent in Example 1-1.

Example 1-22

When an eddy mass flowmeter was employed in place of a mass flowmeter, an error (variation width) was about 3%, in a mixing ratio of the surface crosslinking agent in Example 1-1.

Example 1-23 (Melting of Surface Covering Agent)

In Example 1, in place of a surface crosslinking agent ethylene carbonate (melting point 36° C.), stearyl alcohol (melting point 58.5° C.) was melted at 70° C.

0.1 Part of melted stearyl alcohol was dissolved in 10 parts of methanol, further, 100 parts of a water absorbent resin were covered with this, and further, this was dried to perform surface hydrophobization of a water absorbent resin.

Comparative Example 2 (Reproduction Test of Patent Literature 37)

According to Reference Example 1 and Example 2 of Patent Literature 37, surface crosslinking was performed.

That is, 3.5 parts by mass of an aqueous surface crosslinking agent solution consisting of 0.2 part by mass of ethylene carbonate, 0.3 part by mass of 1,3-propanediol, and 3 parts by mass of water was sprayed to 100 parts by mass of the water absorbent resin (a) obtained in Reference Example 1, and they were mixed. The mixture was heat-treated at a powder temperature of 195° C. for 45 minutes using a paddle-type mixing heat treatment machine while replacing a gas in an upper space thereof with an external air, to obtain a water absorbent resin (2) having a crosslinked surface. 2 parts by mass of an aqueous solution was sprayed to the resulting water absorbent resin (2) having a crosslinked surface so that diethylenetriamine sodium pentaacetate was 50 ppm relative to the water absorbent resin (2) having a crosslinked surface, and they were mixed. By curing the resulting mixture at 60° C. for 1 hour and, further, passing the mixture through a sieve having a mesh size of 710 μm, a particulate water absorbing agent (2) of Patent Literature 37 was obtained. CRC was 35, AAP was 21, and SFC was 9. Patent Literature 37 does not disclose melting of ethylene carbonate and, further, it is seen that in the method of the present invention using an ion crosslinking agent, SFC is high.

INDUSTRIAL APPLICABILITY

By using the process for producing a water absorbent resin of the present invention, a water absorbent resin having high physical properties can be produced stably and at good workability. When a water absorbent resin powder obtained by the present invention is used in a hygiene material such as a paper diaper and the like, since both of liquid permeability and a free swelling rate are improved, and impact resistance (damage resistance) and a whiteness degree are excellent, absorbing performance (free swelling rate) which is excellent as compared with the previous hygiene material can be provided.

EXPLANATION OF SYMBOLS

22 First tank
24 Second tank
26 Third tank
28 Line mixer
30 Fourth tank
32 First piping
34 Second piping
36 Third piping
38 Fourth piping
40 Fifth piping
42 Circulation line
8-1 Raw material introducing line
8-2 Jacket-based tank
8-3 Circulation line
8-4 Liquid sending line
8-5 Jacket
8-6 Heat medium inflow line
8-7 Heat medium discharge line
9-1 Raw material introducing line
9-2 Storage tank
9-3 Circulation line
9-4 Liquid sending line
9-5 Multitubular external heat exchanger

The invention claimed is:

1. A method for producing a polyacrylic acid (salt)-based water absorbent resin powder, comprising melt-heating a non-polymerized organic compound, where said non-polymerized organic compound is a surface crosslinking agent, mixing the non-polymerized organic compound in a heated-melted state with one or more of other compounds at a predetermined ratio to obtain a mixture, and mixing the resulting mixture with a polyacrylic acid (salt)-based water absorbent resin particle, wherein the polyacrylic acid (salt)-based water absorbent resin particle has a ratio of internal gas bubbles of 0.5 to 8.0%.

2. The method for producing a polyacrylic acid (salt)-based water absorbent resin powder according to claim 1, further comprising mixing a mixture of said non-polymerized organic compound and said one or more other compounds, the mixture being controlled at a predetermined ratio with a mass flowmeter, with a polyacrylic acid (salt)-based water absorbent resin particle.

3. The method according to claim 1, wherein a mass flowmeter is used for controlling a mixing ratio of the non-polymerized organic compound and the one or more other compounds, or, for controlling a mixing ratio of a mixture of the non-polymerized organic compound and the one or more other compounds, with a water absorbent resin.

4. The method according to claim 3, wherein the mass flowmeter is a Coriolis-type mass flowmeter.

5. The method according to claim 2, wherein the mass flowmeter is a Coriolis-type mass flowmeter.

6. The method according to claim 1, wherein the mixture obtained by mixing at a predetermined ratio is an aqueous solution.

7. The method according to claim 1, wherein the non-polymerized organic compound has a melting point of 10 to 100° C., and the heated-melted state is a state to be heated to a range exceeding a melting point by 100° C. or less and 30 to 90° C.

8. The method according to claim 1, wherein a temperature of the one or more other compounds is 30° C. to 100° C., or a temperature of the one or more other compounds is controlled so that a temperature of the mixture of the non-polymerized organic compound and the one or more other compounds before mixing into the water absorbent resin is 30° C. to 100° C.

9. The method according to claim 1, wherein an amount of water of the non-polymerized organic compound is 1.0% by weight or less.

10. The method according to claim 1, wherein the non-polymerized organic compound is one or a plurality of dehydration reactive surface crosslinking agent of the water absorbent resin powder.

11. The method according to claim 1, further comprising a step of mixing a polyvalent metal compound into a water absorbent resin simultaneously with, or separately from the mixture, and/or, a step of mixing at least one selected from a surfactant and a hydroxycarboxylic acid compound, into a water absorbent resin simultaneously, or separately from the mixture.

12. The method according to claim 1, wherein the water absorbent resin particle to be mixed with the mixture has been heated to 35° C. or higher in advance.

13. The method according to claim 1, wherein β-hydroxypropionic acid (salt) in the water absorbent resin particle before mixed with the mixture is 1000 ppm or less.

14. The method according to claim 1, wherein the water absorbent resin powder is continuously produced at 1 ton or more per 1 hour.

15. The method according to claim 1, wherein a strainer is used in a step of transporting the non-polymerized organic compound.

16. The method according to claim 1, wherein an atmospheric dew point is 20° C. or lower in storage of the non-polymerized organic compound.

17. The method according to claim 1, wherein a temperature of the mixture is controlled at 50° C. or lower and, the mixture is mixed into the water absorbent resin particle within 10 days from the time of mixing.

18. The method according to claim 1, wherein the mixture consists of 3 or more components.

19. The method of claim 1, wherein said surface crosslinking agent is an alkylene carbonate.

20. The method of claim 19, wherein said alkylene carbonate is ethylene carbonate.

21. The method of claim 1, wherein the resulting mixture of said surface crosslinking agent and said one or more other compounds is an aqueous solution including 10 to 30% by weight of said surface crosslinking agent.

22. The method of claim 1, wherein said one or more other compounds is selected from the group consisting of water, a polyhydric alcohol, and a polyvalent metal salt.

* * * * *